US012682723B2

(12) United States Patent
Cotter

(10) Patent No.: US 12,682,723 B2
(45) Date of Patent: Jul. 14, 2026

(54) SYSTEM AND METHOD FOR PERFORMING A COMPUTER-IMPLEMENTED GAME WITH A TRIGGER VIA A STATE MACHINE

(71) Applicant: Games Global Operations Limited, Douglas (IM)

(72) Inventor: Shane Cotter, Sliema (MT)

(73) Assignee: Games Global Operations Limited, Douglas (IM)

( * ) Notice: Subject to any disclaimer, the term of this patent is extended or adjusted under 35 U.S.C. 154(b) by 182 days.

(21) Appl. No.: 18/314,540

(22) Filed: May 9, 2023

(65) Prior Publication Data

US 2024/0378965 A1 Nov. 14, 2024

(51) Int. Cl.
*G07F 17/32* (2006.01)

(52) U.S. Cl.
CPC ...... *G07F 17/3267* (2013.01); *G07F 17/3286* (2013.01)

(58) Field of Classification Search
CPC ............. G07F 17/3267; G07F 17/3223; G07F 17/3227; G07F 17/326; G07F 17/3258; G07F 17/3269; G07F 17/3286; G07F 17/3244
See application file for complete search history.

(56) References Cited

U.S. PATENT DOCUMENTS 6,186,894 B1 * 2/2001 Mayeroff ................ G07F 17/34 463/16
9,600,974 B2 3/2017 Yee et al.
10,769,893 B1 9/2020 Chinn
2002/0167126 A1 11/2002 Herman De Raedt et al.
2004/0061285 A1 4/2004 Hughes-Watts
2004/0077398 A1 4/2004 Jarvis et al.
2005/0153767 A1 * 7/2005 Gauselmann ........... G07F 17/32 463/16

(Continued)

OTHER PUBLICATIONS onlineroulettesites.com, "Roulette Games with a Bonus Round", Jun. 27, 2022, <https://web.archive.org/web/20220627075534/https://www.onlineroulettesites.org.uk/features/bonus-rounds/> (Year: 2022).*

(Continued)

*Primary Examiner* — Justin L Myhr
(74) *Attorney, Agent, or Firm* — McDonnell Boehnen Hulbert & Berghoff LLP

(57) ABSTRACT

Systems, methods, and memory devices for setting a state machine to a first or second state that indicates whether a first or second computer-implemented game is selected. A counter indicates a quantity of performances of the first game in which a bonus trigger number matches a game-selected number during performance of instance(s) of the first game. Example implementations can perform an instance of the first game while the state machine is in the first state, after determining whether the first game-selected number matches a bonus trigger number, determine whether to set the state machine to the second state based on a comparison of the counter and a threshold number, set the state machine to the second state when the counter equals the threshold number, perform instance(s) of a second game after the state machine is set to the second state, and set the state machine back to the first state.

20 Claims, 29 Drawing Sheets

(56) References Cited

U.S. PATENT DOCUMENTS

| | | | | |
|---|---|---|---|---|
| 2005/0266912 | A1* | 12/2005 | Sekiguchi | G07F 17/3267 463/16 |
| 2005/0282608 | A1* | 12/2005 | O'Halloran | G07F 17/3288 463/16 |
| 2006/0055109 | A1 | 3/2006 | Yokota et al. | |
| 2006/0157928 | A1 | 7/2006 | O'Halloran | |
| 2008/0076507 | A1 | 3/2008 | Wertheimer | |
| 2008/0200255 | A1* | 8/2008 | Eisele | G07F 17/32 463/42 |
| 2012/0172102 | A1 | 7/2012 | Gurule | |
| 2012/0172103 | A1 | 7/2012 | Gurule | |
| 2012/0172107 | A1* | 7/2012 | Acres | G07F 17/34 463/16 |
| 2012/0238343 | A1 | 9/2012 | Perrone et al. | |
| 2012/0309487 | A1 | 12/2012 | Yoshikawa et al. | |
| 2013/0059638 | A1 | 3/2013 | Nicely | |
| 2013/0059647 | A1 | 3/2013 | Nicely | |
| 2014/0315618 | A1* | 10/2014 | Fujisawa | G07F 17/3211 463/20 |
| 2017/0316653 | A1* | 11/2017 | Cranford | G07F 17/3255 |
| 2019/0096156 | A1 | 3/2019 | Kato et al. | |
| 2022/0406123 | A1* | 12/2022 | Casey | G07F 17/3246 |

OTHER PUBLICATIONS

Screen shots of three second video displayed by inventor in connection with International Casino Exhibition (ICE) trade show, London, England, Feb. 7, 2023.

* cited by examiner

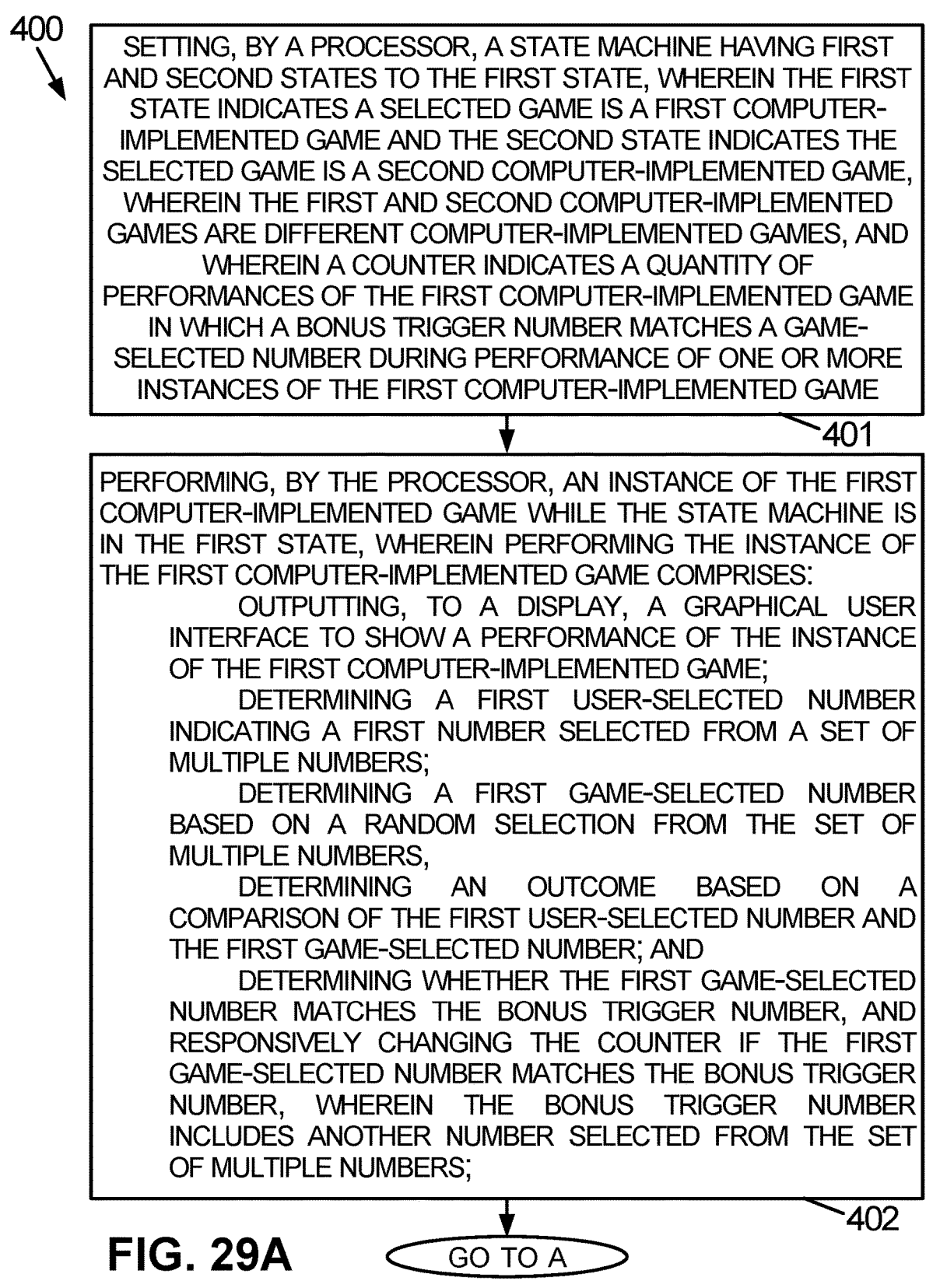

400

SETTING, BY A PROCESSOR, A STATE MACHINE HAVING FIRST AND SECOND STATES TO THE FIRST STATE, WHEREIN THE FIRST STATE INDICATES A SELECTED GAME IS A FIRST COMPUTER-IMPLEMENTED GAME AND THE SECOND STATE INDICATES THE SELECTED GAME IS A SECOND COMPUTER-IMPLEMENTED GAME, WHEREIN THE FIRST AND SECOND COMPUTER-IMPLEMENTED GAMES ARE DIFFERENT COMPUTER-IMPLEMENTED GAMES, AND WHEREIN A COUNTER INDICATES A QUANTITY OF PERFORMANCES OF THE FIRST COMPUTER-IMPLEMENTED GAME IN WHICH A BONUS TRIGGER NUMBER MATCHES A GAME-SELECTED NUMBER DURING PERFORMANCE OF ONE OR MORE INSTANCES OF THE FIRST COMPUTER-IMPLEMENTED GAME

401

PERFORMING, BY THE PROCESSOR, AN INSTANCE OF THE FIRST COMPUTER-IMPLEMENTED GAME WHILE THE STATE MACHINE IS IN THE FIRST STATE, WHEREIN PERFORMING THE INSTANCE OF THE FIRST COMPUTER-IMPLEMENTED GAME COMPRISES:

OUTPUTTING, TO A DISPLAY, A GRAPHICAL USER INTERFACE TO SHOW A PERFORMANCE OF THE INSTANCE OF THE FIRST COMPUTER-IMPLEMENTED GAME;

DETERMINING A FIRST USER-SELECTED NUMBER INDICATING A FIRST NUMBER SELECTED FROM A SET OF MULTIPLE NUMBERS;

DETERMINING A FIRST GAME-SELECTED NUMBER BASED ON A RANDOM SELECTION FROM THE SET OF MULTIPLE NUMBERS,

DETERMINING AN OUTCOME BASED ON A COMPARISON OF THE FIRST USER-SELECTED NUMBER AND THE FIRST GAME-SELECTED NUMBER; AND

DETERMINING WHETHER THE FIRST GAME-SELECTED NUMBER MATCHES THE BONUS TRIGGER NUMBER, AND RESPONSIVELY CHANGING THE COUNTER IF THE FIRST GAME-SELECTED NUMBER MATCHES THE BONUS TRIGGER NUMBER, WHEREIN THE BONUS TRIGGER NUMBER INCLUDES ANOTHER NUMBER SELECTED FROM THE SET OF MULTIPLE NUMBERS;

402

GO TO A

FIG. 29A

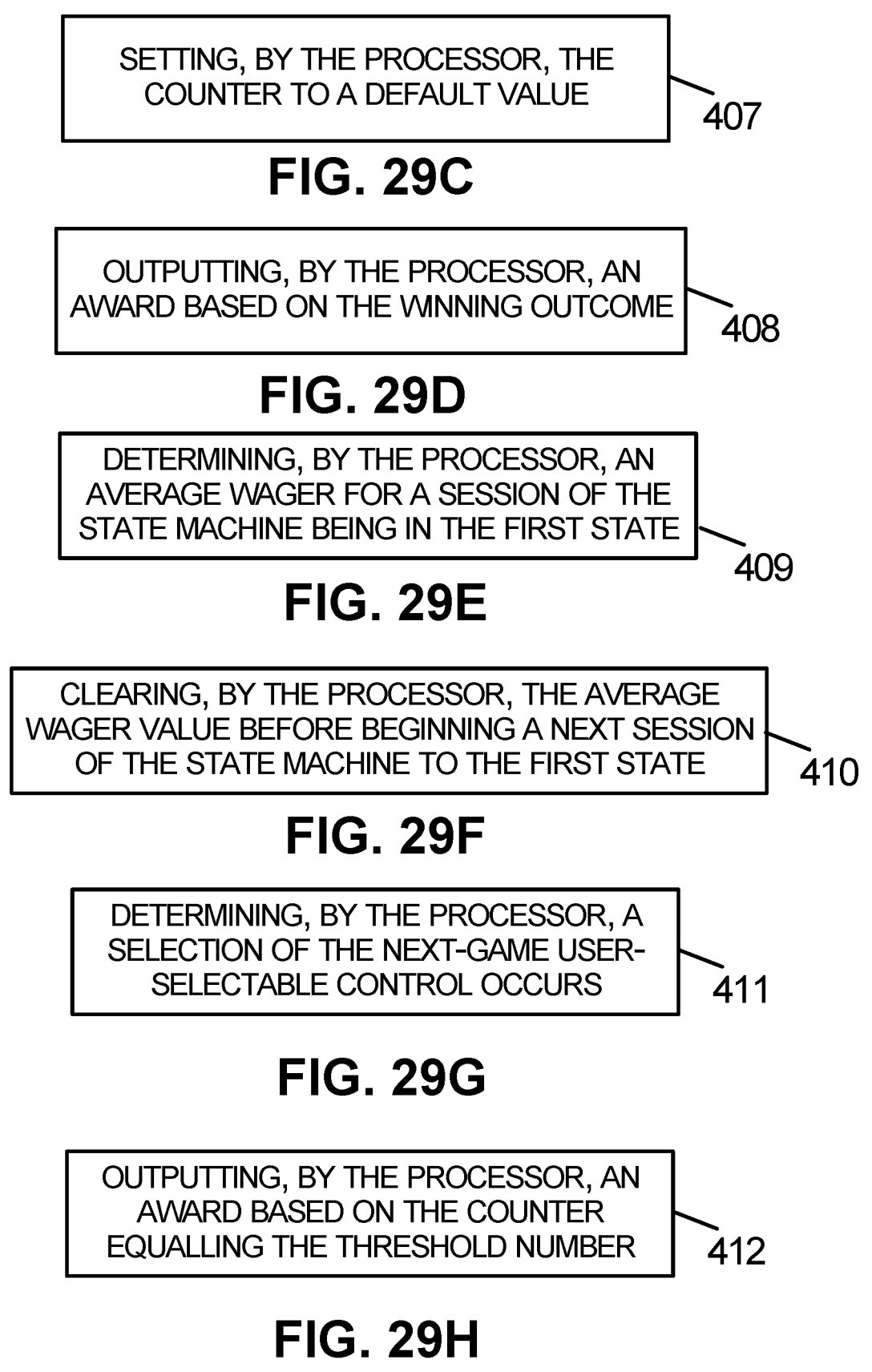

SETTING, BY THE PROCESSOR, THE COUNTER TO A DEFAULT VALUE

407

FIG. 29C

OUTPUTTING, BY THE PROCESSOR, AN AWARD BASED ON THE WINNING OUTCOME

408

FIG. 29D

DETERMINING, BY THE PROCESSOR, AN AVERAGE WAGER FOR A SESSION OF THE STATE MACHINE BEING IN THE FIRST STATE

409

FIG. 29E

CLEARING, BY THE PROCESSOR, THE AVERAGE WAGER VALUE BEFORE BEGINNING A NEXT SESSION OF THE STATE MACHINE TO THE FIRST STATE

410

FIG. 29F

DETERMINING, BY THE PROCESSOR, A SELECTION OF THE NEXT-GAME USER-SELECTABLE CONTROL OCCURS

411

FIG. 29G

OUTPUTTING, BY THE PROCESSOR, AN AWARD BASED ON THE COUNTER EQUALLING THE THRESHOLD NUMBER

412

FIG. 29H

SYSTEM AND METHOD FOR PERFORMING A COMPUTER-IMPLEMENTED GAME WITH A TRIGGER VIA A STATE MACHINE

FIELD

This disclosure relates to computer-implemented gaming machines.

BACKGROUND

There is a need for bonus games to be incorporated into computer-implemented table games (such as roulette, poker, baccarat, etc.). Bonus games are found in computer-implemented slot games, but finding a way in which to trigger and activate such bonus games during computer-implemented table game play is difficult, as the gameplay differs significantly from that of general slot game play. As a result, implementing slot game-style triggers into table game play is not straightforward, or even possible.

OVERVIEW

The present application discloses embodiments including and/or related to systems, methods, and apparatus that provide improvements in computer-implemented technology by including a trigger feature for switching a state machine from a first state in which a computer-implemented game is performed to a second state.

In a first aspect, a method is provided. The method comprises setting, by a processor, a state machine having first and second states to the first state. The first state indicates a selected game is a first computer-implemented game and the second state indicates the selected game is a second computer-implemented game. The first and second computer-implemented games are different computer-implemented games. A counter indicates a quantity of performances of the first computer-implemented game in which a bonus trigger number matches a game-selected number during performance of one or more instances of the first computer-implemented game. The method further comprises performing, by the processor, an instance of the first computer-implemented game while the state machine is in the first state. Performing the instance of the first computer-implemented game comprises: outputting, to a display, a graphical user interface to show a performance of the instance of the first computer-implemented game; determining a first user-selected number indicating a first number selected from a set of multiple numbers; determining a first game-selected number based on a random selection from the set of multiple numbers; determining an outcome based on a comparison of the first user-selected number and the first game-selected number; and determining whether the first game-selected number matches the bonus trigger number, and responsively changing the counter if the first game-selected number matches the bonus trigger number, wherein the bonus trigger number includes another number selected from the set of multiple numbers. The method further comprises after determining whether the first game-selected number matches the bonus trigger number, determining whether to set the state machine to the second state based on a comparison of the counter and a threshold number. Additionally, the method comprises setting the state machine to the second state when the counter equals the threshold number, wherein the counter equals the threshold number based on performing the instance of the first computer-implemented game or a subsequent instance of the first computer-implemented game. Furthermore, the method further comprises performing, by the processor, one or more instances of a second computer-implemented game after the state machine is set to the second state. Furthermore still, the method further comprises setting, by the processor, the state machine to the first state after performing the one or more instances of the second computer-implemented game.

In a second aspect, a computing system is provided. The computing system comprises a processor and a non-transitory computer-readable memory containing executable instructions. Execution of the executable instructions by the processor causes the computing to perform functions comprising: setting a state machine having first and second states to the first state. The first state indicates a selected game is a first computer-implemented game and the second state indicates the selected game is a second computer-implemented game. The first and second computer-implemented games are different computer-implemented games. A counter indicates a quantity of performances of the first computer-implemented game in which a bonus trigger number matches a game-selected number during performance of one or more instances of the first computer-implemented game. The functions further comprise performing an instance of the first computer-implemented game while the state machine is in the first state. Performing the instance of the first computer-implemented game comprises: outputting, to a display, a graphical user interface to show a performance of the instance of the first computer-implemented game; determining a first user-selected number indicating a first number selected from a set of multiple numbers; determining a first game-selected number based on a random selection from the set of multiple numbers; determining an outcome based on a comparison of the first user-selected number and the first game-selected number; and determining whether the first game-selected number matches the bonus trigger number, and responsively changing the counter if the first game-selected number matches the bonus trigger number. The bonus trigger number includes another number selected from the set of multiple numbers. The functions further include after determining whether the first game-selected number matches the bonus trigger number, determining whether to set the state machine to the second state based on a comparison of the counter and a threshold number. The functions also include setting the state machine to the second state when the counter equals the threshold number, wherein the counter equals the threshold number based on performing the instance of the first computer-implemented game or a subsequent instance of the first computer-implemented game. Furthermore, the functions include performing one or more instances of a second computer-implemented game after the state machine is set to the second state. Furthermore, the functions include setting the state machine to the first state after performing the one or more instances of the second computer-implemented game.

In a third implementation, a non-transitory computer-readable memory is provided. The non-transitory computer-readable memory having stored therein instructions executable by a processor to cause a computing system to perform functions comprising: setting a state machine having first and second states to the first state. The first state indicates a selected game is a first computer-implemented game and the second state indicates the selected game is a second computer-implemented game. The first and second computer-implemented games are different computer-implemented games. A counter indicates a quantity of performances of the first computer-implemented game in which a bonus trigger number matches a game-selected number during performance of one or more instances of the first computer-implemented game. The functions also include performing an instance of the first computer-implemented game while the state machine is in the first state. Performing the instance of the first computer-implemented game comprises: outputting, to a display, a graphical user interface to show a performance of the instance of the first computer-implemented game; determining a first user-selected number indicating a first number selected from a set of multiple numbers; determining a first game-selected number based on a random selection from the set of multiple numbers; determining an outcome based on a comparison of the first user-selected number and the first game-selected number; and determining whether the first game-selected number matches the bonus trigger number, and responsively changing the counter if the first game-selected number matches the bonus trigger number. The bonus trigger number includes another number selected from the set of multiple numbers. The functions also include, after determining whether the first game-selected number matches the bonus trigger number, determining whether to set the state machine to the second state based on a comparison of the counter and a threshold number. The functions further include setting the state machine to the second state when the counter equals the threshold number. The counter equals the threshold number based on performing the instance of the first computer-implemented game or a subsequent instance of the first computer-implemented game. Furthermore, the functions further include performing one or more instances of a second computer-implemented game after the state machine is set to the second state. Furthermore still, the functions include setting the state machine to the first state after performing the one or more instances of the second computer-implemented game.

In a fourth aspect, a method is provided. The method comprises setting, by a processor, a state machine having first and second states to the first state. The first state indicates a computer-implemented game is selected to be performed. A counter indicates a quantity of performances of the computer-implemented game in which a bonus trigger number matches a game-selected number during performance of one or more instances of the computer-implemented game. The method includes performing, by the processor, an instance of the computer-implemented game while the state machine is in the first state. Performing the instance of the computer-implemented game comprises: (i) outputting, to a display, a graphical user interface to show a performance of the instance of the computer-implemented game, (ii) determining a first user-selected number indicating a first number selected from a set of multiple numbers, (iii) determining a first game-selected number based on a random selection from the set of multiple numbers, (iv) determining an outcome based on a comparison of the first user-selected number and the first game-selected number, and (v) determining whether the first game-selected number matches the bonus trigger number, and responsively changing the counter if the first game-selected number matches the bonus trigger number. The bonus trigger number includes another number selected from the set of multiple numbers. The method further includes, after determining whether the first game-selected number matches the bonus trigger number, determining whether to set the state machine to the second state based on a comparison of the counter and a threshold number greater than one. The method further includes setting the state machine to the second state when the counter equals the threshold number. The counter equals the threshold number based on performing the instance of the computer-implemented game or a subsequent instance of the computer-implemented game. Furthermore, the method includes outputting, by the processor, an award based on the counter equaling the threshold number. Furthermore still, the method includes setting, by the processor, the state machine to the first state after outputting the award.

In a fifth aspect, a computing system is provided. The computing system comprises a processor and a non-transitory computer-readable memory containing executable instructions. Execution of the executable instructions by the processor causes the computing to perform functions comprising: setting, by a processor, a state machine having first and second states to the first state. The first state indicates a computer-implemented game is selected to be performed. A counter indicates a quantity of performances of the computer-implemented game in which a bonus trigger number matches a game-selected number during performance of one or more instances of the computer-implemented game. The functions include performing, by the processor, an instance of the computer-implemented game while the state machine is in the first state. Performing the instance of the computer-implemented game comprises: (i) outputting, to a display, a graphical user interface to show a performance of the instance of the computer-implemented game, (ii) determining a first user-selected number indicating a first number selected from a set of multiple numbers, (iii) determining a first game-selected number based on a random selection from the set of multiple numbers, (iv) determining an outcome based on a comparison of the first user-selected number and the first game-selected number, and (v) determining whether the first game-selected number matches the bonus trigger number, and responsively changing the counter if the first game-selected number matches the bonus trigger number. The bonus trigger number includes another number selected from the set of multiple numbers. The functions further include, after determining whether the first game-selected number matches the bonus trigger number, determining whether to set the state machine to the second state based on a comparison of the counter and a threshold number greater than one. The functions further include setting the state machine to the second state when the counter equals the threshold number. The counter equals the threshold number based on performing the instance of the computer-implemented game or a subsequent instance of the computer-implemented game. Furthermore, the functions include outputting, by the processor, an award based on the counter equaling the threshold number. Furthermore still, the functions include setting, by the processor, the state machine to the first state after outputting the award.

In a fifth aspect, a computing system is provided. The computing system comprises a processor and a non-transitory computer-readable memory containing executable instructions. Execution of the executable instructions by the processor causes the computing to perform functions comprising: setting, by a processor, a state machine having first and second states to the first state. The first state indicates a computer-implemented game is selected to be performed. A counter indicates a quantity of performances of the computer-implemented game in which a bonus trigger number matches a game-selected number during performance of one or more instances of the computer-implemented game. The functions include performing, by the processor, an instance of the computer-implemented game while the state machine is in the first state. Performing the instance of the computer-implemented game comprises: (i) outputting, to a display, a graphical user interface to show a performance of the instance of the computer-implemented game, (ii) determining a first user-selected number indicating a first number selected from a set of multiple numbers, (iii) determining a first game-selected number based on a random selection from the set of multiple numbers, (iv) determining an outcome based on a comparison of the first user-selected number and the first game-selected number, and (v) determining whether the first game-selected number matches the bonus trigger number, and responsively changing the counter if the first game-selected number matches the bonus trigger number. The bonus trigger number includes another number selected from the set of multiple numbers. The functions further include, after determining whether the first game-selected number matches the bonus trigger number, determining whether to set the state machine to the second state based on a comparison of the counter and a threshold number greater than one. The functions further include setting the state machine to the second state when the counter equals the threshold number. The counter equals the threshold number based on performing the instance of the computer-implemented game or a subsequent instance of the computer-implemented game. Furthermore, the functions include outputting, by the processor, an award based on the counter equaling the threshold number. Furthermore still, the functions include setting, by the processor, the state machine to the first state after outputting the award.

These aspects, as well as other embodiments, aspects, advantages, and alternatives will become apparent to those of ordinary skill in the art by reading the following detailed description, with reference where appropriate to the accompanying drawings. Further, this overview and other descriptions and figures provided herein are intended to illustrate embodiments using examples only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE FIGURES

The above, as well as additional, features will be better understood through the following illustrative and non-limiting detailed description of example embodiments, with reference to the appended drawings.

FIG. 29A and FIG. 29B is a flowchart showing a set of functions in accordance with the example embodiments.

FIG. 29C, FIG. 29D, FIG. 29E, FIG. 29F, FIG. 29G, and FIG. 29H show additional functions corresponding to the functions shown in FIG. 29A and FIG. 29B.

Figure 1:
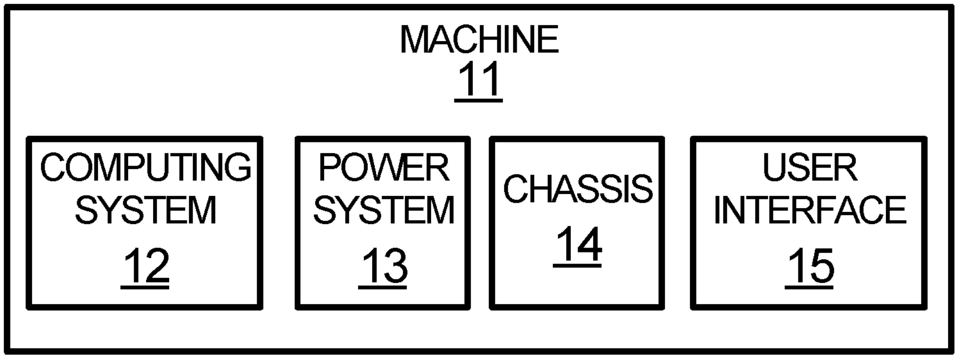
FIG. 1 is a block diagram of a machine in accordance with the example embodiments.

All the figures are schematic, not necessarily to scale, and generally only show parts which are necessary to explain example embodiments, wherein other parts can be omitted or merely suggested.

DETAILED DESCRIPTION

I. Introduction

In this detailed description, several example embodiments are disclosed including, but not limited to, embodiments pertaining to performing aspects of a computer-implemented game (e.g., a digital, electronic game) with a trigger feature (i.e., a trigger). In at least some embodiments, the trigger can be achieved via the performance of multiple instances of a first computer-implemented game during a session of performances. The computer-implemented game can be performed using a computing system (e.g., a server and/or a client computing system), a user device and/or a machine. The user device and/or the machine can be configured as and/or include a computing system. For purposes of this description, unless the context dictates otherwise, a user device or machine can include and/or be embodied as a computing system.

In at least some embodiments, the trigger includes a multi-stage trigger and the trigger leads to performance of a second computer-implemented bonus game and/or for outputting an award based, at least in part, on performance(s) of the first computer-implemented games during which the multi-stage trigger is achieved. As an example, the number of stages in the multi-stage trigger can be two, three, four, five or some number greater than five. In at least some other embodiments, the trigger includes a single stage. Once the computing system has passed through all stage(s), a bonus event or an award can be triggered and performed via the computing system.

The trigger feature can provide a means for integrating a bonus round into a roulette game. The trigger feature can function in a manner that does not interfere with normal gameplay. Even more, the trigger feature can provide an additional gameplay experience. In at least some embodiments, the trigger feature can allow a user to select additional numbers, at no additional cost, that could provide the user with additional returns. In other words, choosing a bonus trigger number allows a user to not only experience excitement based on a normal number wagered on, but also experience excitement associated with landing the bonus trigger number. This adds to the user's excitement, leading to an improved playing experience.

In at least some embodiments, the computer-implemented game includes a computer-implemented roulette game. In such games, a roulette ball can be dropped onto a roulette wheel and subsequently land in a roulette wheel pocket corresponding to a number on the roulette wheel. A bonus trigger number (BTN) (i.e., one or more bonus trigger numbers (BTNs)) can be selected with respect to performing the roulette game. The selection of the BTN(s) can be made by a user of the computing system and/or by the computing system performing the roulette game. For example, BTN(s) can be automatically selected by a game server or an operator of the roulette game (e.g., by a random number generator (RNG)). If the roulette ball lands in a roulette wheel pocket corresponding to a number that matches any BTN, the computing system/player can then progress through some portion (e.g., a complete portion) of a stage of the single or multi-stage trigger.

In at least some implementations, the number of BTNs used for a computer-implemented game is identical for all stages of a multi-stage trigger, whereas in some other implementations, the number of BTNs used for a computer-implemented game differs for two or more stages of a multi-stage trigger. For example, the multi-stage trigger can include five stages and three BTNs are used for the first two stages, two BTNs are used for the third and fourth stages, and one BTN for the fifth (and final) stage. In accordance with this example, a likelihood of a roulette ball landing in a roulette wheel pocket corresponding to a number that matches a BTN is reduced as the computing system/player progresses through the stages.

In at least some embodiments, a computing system allows a user to place a wager with respect to computer-implemented roulette games. As an example, the wager can include a selection of one or more numbers corresponding to the wheel pockets on a roulette wheel. In at least some implementations, the BTN(s) can function independently from a wager placed on a roulette game (i.e., a user need not wager on a BTN, but may do so if they wish to). In at least some embodiments, the roulette wheel is not spun and a roulette ball is not dropped onto the roulette wheel until a wager has been entered.

If a wager is placed on a BTN and the roulette ball lands in a roulette wheel pocket corresponding to a number matching the BTN, the computing system can pay out an award based on the wager and an odds table. Additionally, action(s) for advancing within the trigger stage(s) are performed. If no wager was placed on the BTN and the roulette ball lands in the roulette wheel pocket corresponding to the number matching the BTN, no award is paid out, but the action(s) for advancing within the trigger stage(s) are performed. If a wager is entered for a number that is not a BTN and the roulette ball lands in a roulette wheel pocket corresponding to the wagered number, then the computing system can pay out an award based on the wager and the odds table.

In at least some embodiments, after a roulette ball lands in a roulette wheel pocket corresponding to a number matching the BTN, the computing system: automatically generates one or more new BTNs, requires a user to choose one or more BTNs for a next stage, and/or eliminates the BTN that has landed from being available as a BTN for the next stage (or until the trigger sequence is completed).

In at least some embodiments, a computing system is used to place a wager on various wager options on a roulette game. As an example, the wager can include outside bet(s) (e.g., red/black, odd/even, high/low, columns, dozens), and/or inside bet(s) (e.g., straight up, split, street, corner, line, five-number bet, basket, snake bet) or the like. The wagers can be conditioned on the type of roulette wheel used in the computer-implemented game (e.g., a European roulette wheel and table, a French roulette wheel and table, a double-zero roulette wheel and table, or a single-zero roulette wheel and table).

In at least some embodiments, a bonus round is funded by wagers entered during performance of the roulette game. For example, a pay-out for straight-up wins can be reduced, to 24 to 1 (instead of, for example, 35 to 1 on European roulette). This difference is used to fund any awards paid out during the bonus round. However, other types of funding can also be used, such as a side wager that funds the bonus round, or the like.

In at least some embodiments, the bonus round includes a spinning wheel (often called a "prize wheel," a "money wheel," or a "wheel of fortune"), with multiple prizes spaced about the periphery of the wheel. In at least some of those embodiments, each position on the spinning wheel includes a multiplier value that can be used to determine an award (e.g., an award including a multiple of a "weighted average wager value"). In at least some embodiments, the bonus round based on achieving a trigger can be performed without a spinning wheel.

The average value of wagers placed during a session can be continuously calculated, in order to award a user with a multiple of that value. Each type of bet that a user places during the roulette game can add a variable value to the "average wager value" for a particular session during which the trigger may be achieved (e.g., unlocked). The odds of winning a particular wager, and the potential return, impact the weighted average wager value. For example, if a user places a straight bet of $10 on a particular number, the user's average wager is $10. If they place another straight wager of $10, the average wager would still be $10, and the average across the two wagers is still $10. Should the user place a $10 split bet wager, the contribution of that wager would be 49% of the full wager value. An average across the three wagers would then be $8.30 [($10+$10+$4.90)/3]. Other examples of a coefficient used to determine a contribution of a split wager other than 49% are also possible.

In at least some embodiments, during performance of the computer-implemented games with a multi-stage trigger, a running average wager can be recorded (e.g., stored in a computer memory) to represent a "weighted average bet value" entered into the computing system. The weighted average bet value can be used in awarding a prize won during a bonus round entered after the trigger sequence is completed. The determination of the weighted average wager value can restart when a new session of the computer-implemented game is initiated, or when a new sequence of the trigger starts.

It can be statistically expected that the bonus round trigger will be achieved once every 100 or so spins. Using the weighted average wager value ensures that a user is awarded in line with their average wager, and potential return on the wagers placed (i.e., the user is awarded in line with the risk of the wagers they have placed).

In at least some embodiments, each type of bet can contribute a different value to a personal prize pool, and such pool can form part of calculating the user's prize in a bonus round. Different type of bonus rounds can, however, use other methods to calculate a user's prize.

In addition, a user's progression via the various stages of the trigger can be linked to a particular playing session (e.g., the trigger always restarts at the start of a playing session), or can be linked to a user's account and recorded when the player stops or interrupts gameplay (e.g., the position of the trigger is recorded when gameplay is stopped, and a user can continue at the same position when they restart a session at a later time). A user's weighted average wager value or prize pool can be linked to a playing session, or to the user's account.

Figure 4:
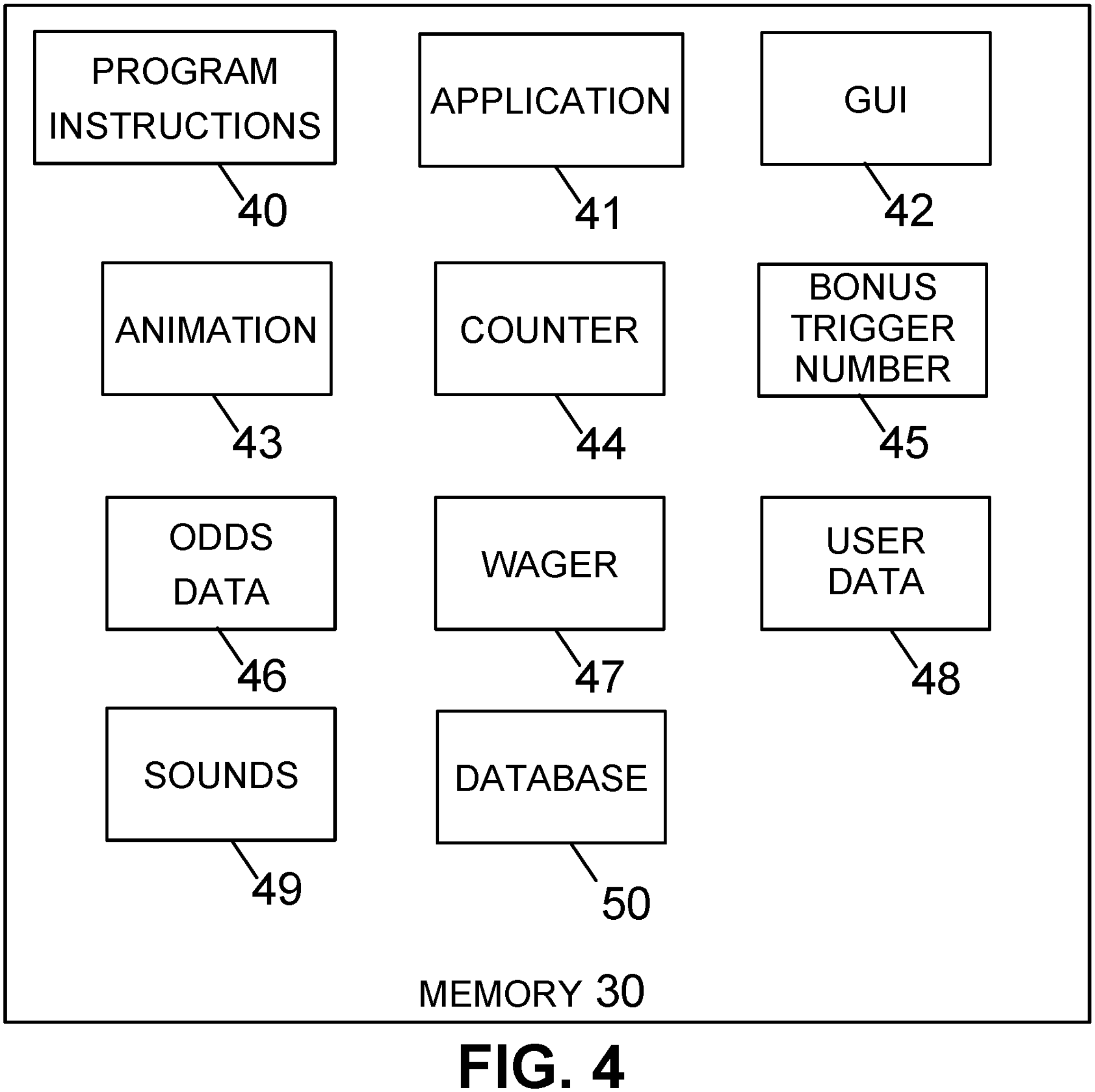
FIG. 4 and FIG. 5 show data that can be stored in a memory in accordance with the example embodiments.

In at least some embodiments, a user's progression through a multi-stage roulette game session towards achieving a trigger is recorded where it may be linked to their account (e.g., stored in user data 48 within a memory 30 shown in FIG. 4). Then, when a user stops playing roulette game when they have achieved (e.g., unlocked), say, 3 of 5 stages, the user can continue playing the roulette game in the future, for example on a subsequent day, and then the user can continue playing with the roulette game having 3 of its 5 stages unlocked. In such embodiments, the user may not feel like they are losing out on an "investment" made during gameplay.

In accordance with the aforementioned embodiments or other embodiments, a computing system can track an average wager value (e.g., a weighted average wager value) with respect to the user's progression through the multi-stage session. As an example, the weighted average wager value can be determined and stored in a memory (e.g., in user data 48 within a memory 30 shown in FIG. 4) for continued use at a later stage in the multi-stage session, even if the user stops the session and resumes the session at a later date.

In at least some other embodiments, every time that a user starts (e.g., loads up) a multi-stage roulette game, the counter(s) tracking progress towards achieving any or all stages of the multiple stages are reset (e.g., set to zero in the case of using count-up counters). In other words, the trigger to switch a state machine from a first state to a second state starts with zero of the multiple stages (e.g., five stages) unlocked. If the user ends a gameplay session (e.g., closes a game), their progress through the stages will be lost. This may drive player retention, urging users to continue playing until they have triggered the bonus stage of performed after the state machine changes to the second state, and so that they do not "loose" the progress made. In at least some embodiments, the counter(s) can be reset in response to the session ending before its completion and prior to the user starting a new session.

In accordance with the aforementioned embodiments or other embodiments, a computing system resets the weighted average wager value and begins recalculating the weighted average wager value when a gaming session starts, and the trigger starts with 0 stages unlocked and/or the counter(s) tracking progress towards achieving any or all stages of the multiple stages are reset. In at least some embodiments, the value of the average wager (e.g., the weighted average wager) may always be recalculated after a trigger of the bonus round, given that the bonus round may have been funded by previously placed wagers.

In at least some embodiments, an RNG can be used to determine an outcome of the computer-implemented game. Such computer-implemented game can be referred to as an "RNG" game.

In at least some embodiments, the computer-implemented game can be implemented for performance by a single player. Additionally and/or alternatively, in at least some embodiments, the computer-implemented game can be implemented in a pseudo-live dealer version (e.g., with pre-recoded video clips, presented to a user to simulate a live dealer game), in a live dealer environment (where multiple players wager on a single roulette wheel result), and/or in a physical casino. In a live-dealer or casino environment, all players can use the same BTNs, or each player can be allowed to select their own BTNs. If all players select their own numbers, players can be allocated a bonus round independent of other players.

Throughout this description, the articles "a" or "an" are used to introduce elements of the example embodiments. Any reference to "a" or "an" refers to "at least one" or "one or more," and any reference to "the" refers to "the at least one" or "the one or more," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures can be used in combination with one another. Thus, the figures should be generally viewed as component aspects of one or more overall embodiments, with the understanding that not all illustrated features are necessary for each embodiment.

II. Example Architecture

FIG. 1 is a block diagram of a machine 11 in accordance with the example embodiments. The machine 11 includes a computing system 12, a power system 13, a chassis 14, and/or a user interface 15. The machine 11 can be configured to perform a method or at least some functions of a method according to the example embodiments. In at least some embodiments, the computing system 12 can include at least a portion of one or more from among: the power system 13, the chassis 14, or the user interface 15.

The computing system 12 can include a processor and a memory storing program instructions executable by the processor to perform a method or at least some functions of a method according to the example embodiments. As an example, the computing system 12 can be arranged as and/or include components of any computing system described in this description and/or shown in the drawings. In particular, the computing system 12 can be arranged as and/or include components of a computing system 20 shown in FIG. 2, a computing system 20*a* shown in FIG. 3, a computing system 20*b* shown in FIG. 3, or a computing system 300 shown in FIG. 28.

The power system 13 includes means for powering some portion(s) of the machine 11, such as the computing system 12 and/or the user interface 15. The power system 13 can include a power supply, such as a battery, a generator, a fuel cell, or a solar cell, or some other type of power supply instead or in addition. The power system 13 can include a power circuit for distributing electrical power throughout the machine 11 where needed. The power system 13 can include a connector and/or connection for connecting to another power system, such as a power system within a building and/or a power system of an electrical utility company.

The chassis 14 includes means for supporting and/or protecting other aspects of the machine 11. As an example, the chassis 14 can include a rack for supporting at least portions of the computing system 12, the power system 13, and/or the user interface 15. As another example, the chassis 14 can include a housing in which at least portions of the computing system 12, the power system 13, and/or the user interface 15 reside.

The user interface 15 can include one or more user interface input components configured to receive and/or produce content (e.g., a signal, data, and/or information) based on some action of a user. That content can be provided to the computing system 12. The user interface 15 can include one or more user interface output components for outputting content. That content can be provided by the computing system 12. The user action can occur by use of the user interface 15.

In at least some embodiments, the user interface 15 includes a mechanical user interface input component, such as a switch button located on a portion of the chassis 14. As an example, the mechanical user interface input component can be configured to input a spin request (e.g., a request to spin a wheel (e.g., a roulette wheel or a prize wheel) to the computing system 12.

In at least some embodiments, the user interface 15 includes an acceptor, such as a paper money acceptor, a coin acceptor, a token acceptor, a validator, and/or a card reader.

In at least some embodiments, the computing system 12 includes at least a portion of the user interface 15. As an example, in embodiments in which the computing system 12 is arranged like the computing system 20, the computing system 20*a*, or the computing system 20*b*, the user interface 15 can be arranged like the user interface 22, the user interface 22*a*, or the user interface 22*b*, respectively.

Figure 2:
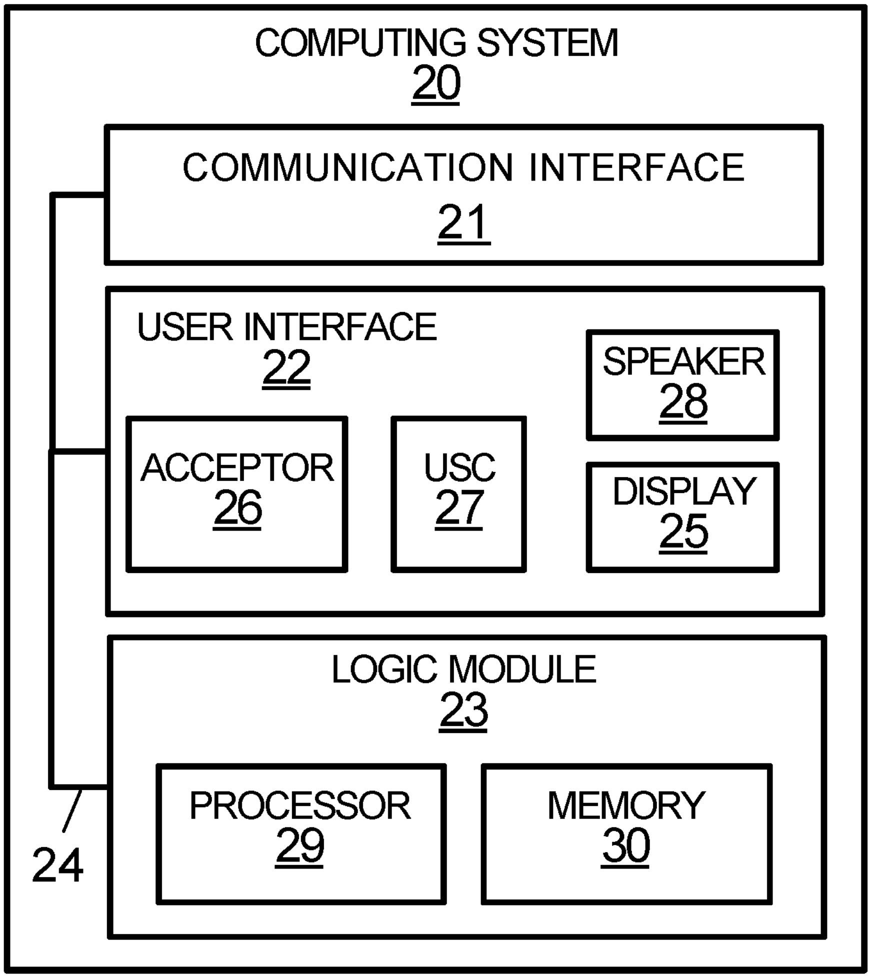
FIG. 2 is a block diagram of a computing system in accordance with the example embodiments.

Next, FIG. 2 is a block diagram of a computing system 20 in accordance with the example embodiments. The computing system 20 can be arranged as and/or include a stand-alone computing system, a distributed computing system, a personal computer, a server computing system, a client computing system, a portable computing system, a mobile phone, a smartphone, a tablet device, and/or some other computing device. The computing system 20 can be referred to as a user device.

The computing system 20 can include a communication interface 21, a user interface 22, and a logic module 23, two or more of which can be coupled together by a connection mechanism 24 (e.g., a system bus or network). The communication interface 21 can include a wired or wireless network communication interface. For purposes of this description, any data described as being provided, sent, or transmitted by the computing system 20 can include data sent by the communication interface 21 over a communication network. In addition, for purposes of this description, any data described as being received by the computing system 20 can include data sent to communication interface 21 over a communication network.

The user interface 22 includes components that can facilitate interaction with a user of the computing system 20. For example, the user interface 22 can include user interface output components, such as a display 25 and/or a speaker 28. As another example, the user interface can include user interface input components, such as an acceptor 26, a user-selectable control 27 (e.g., a keypad, a keyboard, or a mouse), or a touch-sensitive screen. The touch-sensitive screen can be part of the display 25, such that the display 25 is operable as both a user interface input component and a user interface output component. The user-selectable control 27 can include one or more user-selectable controls, one or more of which can be implemented on the touch sensitive screen (which can also be referred to as a touch pad).

The speaker 28 can output sound waves, such as sound waves corresponding to a performance of a computer-implemented game. As an example, the sound waves can represent sound waves produced by a roulette wheel spinning in a casino. As another example, the sound waves can include sounds waves produced by a person speaking or a musical instrument. As another example, the sound waves can include audible sounds corresponding to an animation showing portion(s) of a computer-implemented game performance.

The display 25 is configured to display (i.e., visually present and/or show) content. As an example, the content can correspond to a performance of a computer-implemented game, such as a spinnable wheel, a wager amount, a previous result, an award, an instruction, and/or a user-selectable control (e.g., a button). As another example, the content can include text, a graphic, a GUI, an animation, a video, or some other content as well or instead. As yet another example, the content can include content shown in and/or described with respect to any of FIG. 4 to FIG. 29H. The display 25 can include a display screen (e.g., a display panel or a graphical display unit) including a quantity of pixels (e.g., 786,432 pixels in an array of pixels that is 1,024 pixels by 768 pixels). Other examples of an array of pixels are possible.

Additionally, the display 25 and/or the display screen can include and/or be arranged as a liquid crystal display (LCD), a light emitting diode (LED) display, an organic LED (OLED) display, a plasma display or some other type of display. Furthermore, the display 25 can embody the touch sensitive screen noted above such that the display 25 and/or display screen includes and/or is arranged as a touch screen display.

The logic module 23 can include and/or be arranged as a processor 29 and/or a memory 30. The processor 29 can include one or more processors. The processor 29 can include a general-purpose processor (e.g., a microprocessor) or a special-purpose processor (e.g., a graphics process, a digital signal processor or an application specific integrated circuit) and can be integrated in whole or in part with the communication interface 21 or the user interface 22. Any memory discussed in this description or shown in the drawings can be referred to as a computer-readable memory, data storage, computer-readable data storage, among other names.

The memory 30 can include volatile or non-volatile storage components and can be integrated in whole or in part with the processor 29. The memory 30 can take the form of a non-transitory computer-readable medium and can include software program instructions, that when executed by the processor 29, cause the computing system 20 to perform one or more of the functions described herein. Any software program instructions discussed in this description or shown in the drawings can be referred to as computer-readable program instructions, or more simply, program instructions, or a software application. A set of program instructions (e.g., a portion of a software application) can be referred to as a module or a logic module.

As an example, the program instructions can be executable by the processor 29 to perform a method, such as a method including one or more of the functions shown in FIG. 29A to FIG. 29H.

As another example, the program instructions can be executable by the processor 29 to determine a payment has been received by the user interface 22 (e.g., by the acceptor 26) and thereafter allow a performance of a computer-implemented game to be output in response to an input entered via the user interface 22.

The memory 30 can also include operating system software on which the computing system 20 can operate. For example, the computing system 20 can operate on a Windows®-based operating system available from the Microsoft® Corporation of Redmond, Wash. Other examples of an operating system are possible.

The memory 30 can include a database. As an example, the memory 30 can include a credit account database containing data related to performing an outcome event by a computing system, as well as adjusting account balances (e.g., quantities of credits) associated with client computing systems. The processor 29 can write data into the database and read data within the database.

Figure 3:
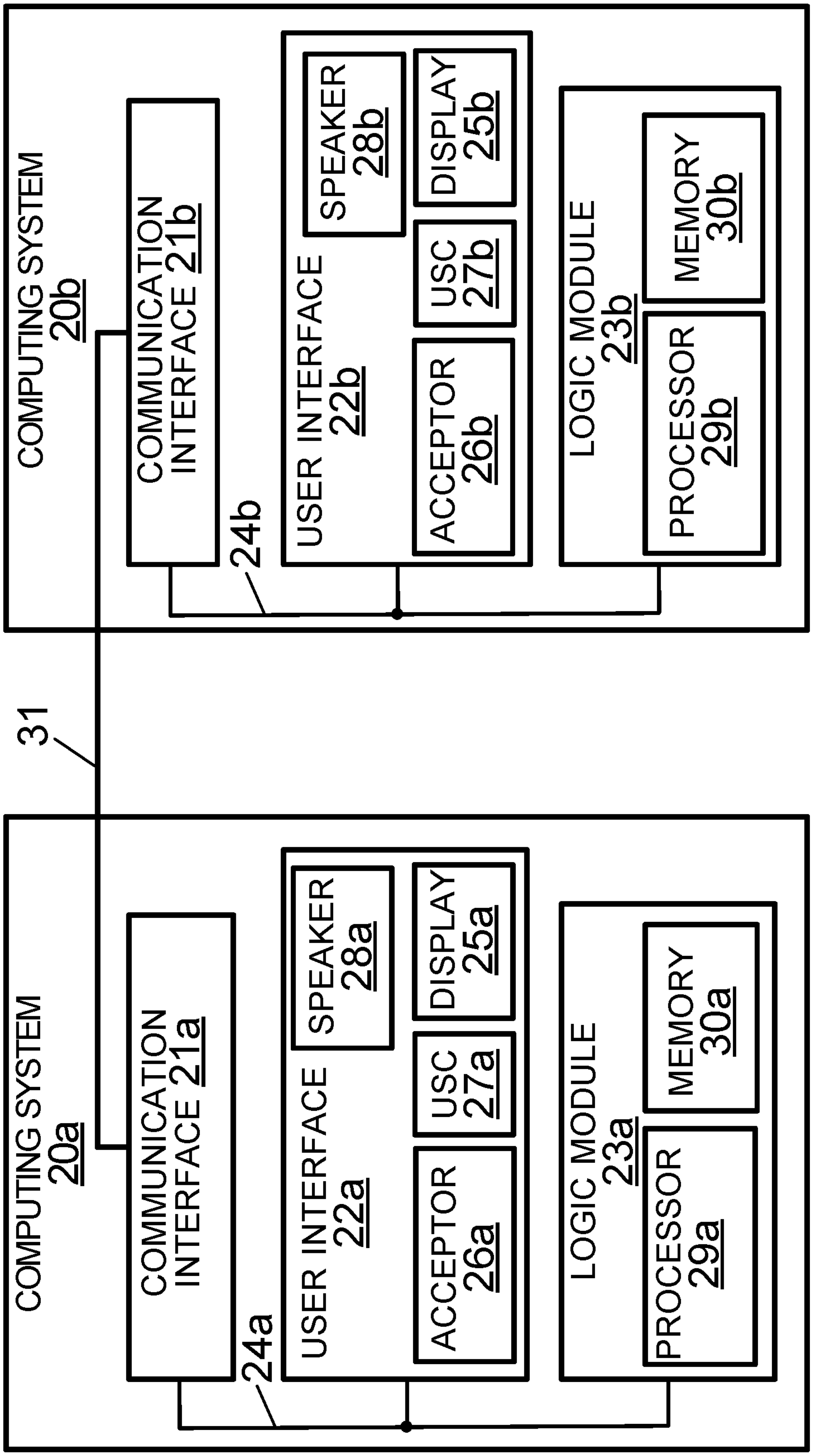
FIG. 3 is a block diagram of two computing systems connected to one another via a computer network in accordance with the example embodiments.

FIG. 3 is a block diagram of a computing system 20*a* connected to a computing system 20*b* over a communication network 31. A configuration of elements including the computing system 20*a* and the computing system 20*b* can be referred to as a server-client based configuration.

The components of the computing system 20*a* and the computing system 20*b* are shown with corresponding "a" and "b" reference numerals (i.e., based on the computing system 20). For example, the computing system 20*a* includes a communication interface 21*a*, a user interface 22*a* (which includes a display 25*a*, an acceptor 26*a*, a user-selectable control 27*a*, and/or a speaker 28*a*), a logic module 23*a* (which includes a processor 29*a* and/or a memory 30*a*), and a connection mechanism 24*a*. Likewise, the computing system 20*b* includes a communication interface 21*b*, a user interface 22*b* (which includes a display 25*b*, an acceptor 26*b*, a user-selectable control 27*b*, and/or a speaker 28*b*), a logic module 23*b* (which includes a processor 29*b* and/or a memory 30*b*), and a connection mechanism 24*b*. In at least some embodiments, the acceptor 26*a* includes a validator, and the acceptor 26*b* includes a paper money acceptor, a coin acceptor, a validator, and/or a card reader.

The computing system 20*a* is configured to communicate with the computing system 20*b* over the communication network 31 (via the communication interface 21*a* and the communication interface 21*b*). Likewise, the computing system 20*b* is configured to communicate with the computing system 20*a* over the communication network 31. For purposes of this description, any data described as being sent or transmitted by the computing system 20*a* can include data sent by the communication interface 21*a* over the communication network 31. Similarly, any data described as being sent or transmitted by the computing system 20*b* can include data sent by the communication interface 21*b* over the communication network 31. Furthermore, for purposes of this description, any data described as being received by the computing system 20*a* can include data the computing system 20*a* receives from the communication network 31 using communication interface 21*a*. Similarly, any data described as being received by the computing system 20*b* can include data the computing system 20*b* receives from the communication network 31 using the communication interface 21*b*.

In at least some embodiments, the communication network 31 includes a local area network (LAN), such as a LAN located at least partially within a casino. In accordance with those embodiments, multiple instances of the computing system 20*b* dispersed throughout the casino can communicate with the computing system 20*a*. In some cases, the computing system 20*a* can be located within the casino. In some other cases, the computing system 20*a* can be located away from the casino.

In another example, the communication network 31 can include a wide-area network (WAN), such as an Internet network or a network of the World Wide Web. In such a configuration, the computing system 20*b* can communicate with the computing system 20*a* via a website portal (for a virtual casino) hosted on the computing system 20*a*. The data described herein as being transmitted by the computing system 20*a* to the computing system 20*b* or by the computing system 20*b* to the computing system 20*a* can be transmitted as datagrams according to the user datagram protocol (UDP), the transmission control protocol (TCP), or another protocol, and/or a file (e.g., a hypertext transfer protocol file) or some other type of file or communication.

The communication network 31 can include any of a variety of network topologies and network devices. The communication network 31 can include a wireless and/or wired network topology and network devices operable on one or both of those network topologies. As an example, the communication network 31 can include a public switched telephone network, a cable network, a cellular wireless network, a wide area network (WAN), a local area network, an IEEE® 802.11 standard for wireless local area networks (wireless LAN) (which is sometimes referred to as a WI-FIR standard) (e.g., 802.11a, 802.11b, 802.11 g, 802.11n, or 802.11p), and/or a network operating according to a BLUETOOTH® standard (e.g., the BLUETOOTH® standard 5.3) developed by the Bluetooth Special Interest Group (SIG) of Kirkland, Washington.

As noted, the computing system 20 can include the acceptor 26. In at least some embodiments, the acceptor 26 includes an acceptor of a physical item associated with a monetary value, such as a paper money acceptor, a coin acceptor, or a card reader. The acceptor 26 can include a validator configured to identify the physical item, and determine whether the physical item is suitable as payment to the computing system 20. A coin acceptor can be configured to accept and identify a coin distributed by a geo-political body or a token generated for an organization other than a geo-political body, such as a casino. A card reader can be configured to read a bank card (e.g., a credit or debit card) or a customer card (e.g., a casino loyalty card).

In at least some embodiments, the computing system 20 can also physically dispense a corresponding award or payout (e.g., cash), or otherwise facilitate the payout (by adding funds to an electronic account associated with a customer card). Such an activity can be triggered by a cash out button either on the display 25 or elsewhere on the computing system 20. Additionally or alternatively to determining the payout amount, the computing system 20 can perform other actions to award the user. For instance, the computing system 20 can display an indication of a tangible prize. Other types of awards can be used as well.

For purposes of this description, a function that can be performed by the computing system 20, the computing system 20*a*, or the computing system 20*b* can be performed, at least in part, by a processor of that computing system executing program instructions and/or a software application. Those program instructions and/or software application can be stored within the memory 30, 30*a*, or 30*b*, respectively.

A memory can include one or more memories. For example, a memory can include the memory 30. As another example, a memory can include the memory 30*a* and the memory 30*b*. In accordance with this latter example, a memory can be arranged as a distributed memory. One or more processors can be operatively coupled to a memory. For example, the processor 29 is operatively coupled to the memory 30. As another example, the processor 29*a* is operatively coupled to the memory 30*a*, and the processor 29*b* is operatively coupled to the memory 30*b*. In accordance with this latter example, a processor can be arranged as a distributed processor.

Next, FIG. 4 shows data that can be stored in the memory 30 in accordance with the example embodiments. The memory 30*a* and/or the memory 30*b* can include some or all of the content shown in FIG. 4. A memory 330 shown in FIG. 28 can include some or all of the content shown in and/or discussed with respect to FIG. 4. The description of the memory 30 refers to the processor 29. A person having ordinary skill in the art will understand that a different processor (e.g., the processor 29*a*, 29*b*, 329) can read and/or write to a memory (e.g., the memory 30*a*, 30*b*, 330) including content shown and/or described with respect to FIG. 4.

In at least some embodiments, at least a portion of the content shown in FIG. 4 is embodied as a data register within a processor.

As shown in FIG. 4, the memory includes program instructions 40, an application 41, a GUI 42, an animation 43, a counter 44, a bonus trigger number 45, odds data 46, a wager 47, user data 48, sounds 49, and/or a database 50.

The program instructions 40 can include computer-readable program instructions (e.g., machine-readable instructions) executable by one or more processors. The program instructions 40 can be executable to cause a computing system or a component of the computing system to perform any function(s) described in this description.

As an example, the program instructions 40 can include program instructions configured as a random number generator (RNG). As another example, the program instructions 40 can include program instructions configured as a state machine. The state machine can include multiple states, such as a first state that indicates a selected game is a first computer-implemented game (e.g., a computer-implemented roulette game), and a second state. In at least some embodiments, the second state indicates a selected game is a second computer-implemented game (e.g., a wheel of fortune game). In at least some other embodiments, the second state is a state in which an award is output based on achieving certain results during a session of performing the first computer-implemented game multiple times while the state machine is in the first state.

As yet another example, the program instructions 40 can include program instructions configured to cause a processor to read processor inputs, such as inputs from the communication interface 21, the connection mechanism 24, or the user interface 22. As still yet another example, the program instructions 40 can include program instructions configured to cause a processor to output data and/or signal via output pin(s) of the processor. As another example, the program instructions 40 can include program instructions to perform any function of the set 400 of functions shown in FIG. 29A and FIG. 29B or a function shown in any one or more of FIG. 29C to FIG. 29H. As yet another example, the program instructions 40 can include any or all of the machine-readable instructions 303 shown in FIG. 28.

The application 41 can include one or more applications. The program instructions 40 or a portion of the program instructions 40 can be embodied in the application 41. The application 41 can include any software application discussed in this description. Additionally or alternatively, the application 41 can include an operating system, such as any operating system described in this description.

The GUI 42 includes one or more GUIs. As an example, the GUI 42 can include a GUI shown in any of FIG. 6 to FIG. 27. As another example, the GUI 42 can include a GUI that can be output on a display (e.g., the display 25, 25*a*, 25*b*). As yet another example, the GUI 42 can include a template that specifies a particular animation of the animation 43 to be shown while the GUI is output on the display. The GUI 42 can include a GUI embodied with a USC. The GUI 42 can include a GUI having character(s) or icon(s) corresponding to a hardware USC embodied with a user interface (e.g., the interface 22, 22*a*, 22*b*).

The animation 43 can include one or more animations. The animation 43 can include computer-readable files containing animations for outputting on a display, such as the display 25, 25*a*, 25*b*, and/or with a GUI of the GUI 42. As an example, the animation 43 can include animation files, such as an animation file with one of the following file name extensions: GIF, PNG, MPEG, JPEG, SVG, or some other file name extension. Each animation in the animation 43 can correspond to an index value such that the processor 29*a* can provide the processor 29*b* with an instruction including a particular index value so that the processor 29*b* outputs via the display 25*b* an animation file corresponding to the particular index value. Accordingly, the processor 29*a* does not have to transmit the animation file to the processor 29*b* each time the animation file is to be output via the display 25*b*.

As an example, the animation 43 can include an animation that shows a roulette ball (pill) landing on a spinning roulette wheel and the roulette ball moving on the roulette wheel in a direction opposite of the spinning roulette wheel, the roulette ball dropping into a roulette wheel pocket, and the roulette wheel stopping. An animation can show the roulette wheel spinning clockwise or counter-clockwise.

As another example, the animation 43 can include an animation that shows a casino chip or chips being placed on the roulette table to designate the number(s) being selected for a wager. The animation can represent multiple casino chips as a stack of casino chips. The animation of casino chip placement can be based on movement of a computer mouse of the user interface 22, 22*a*, 22*b*.

As yet another example, the animation 43 can include an animation that shows a prize wheel spinning and then stopping with a particular multiplier value disposed adjacent to a pointer.

The counter 44 can include one or more counters. In at least some implementations, a counter is contained in a call stack of the program instructions 40.

Figure 5:
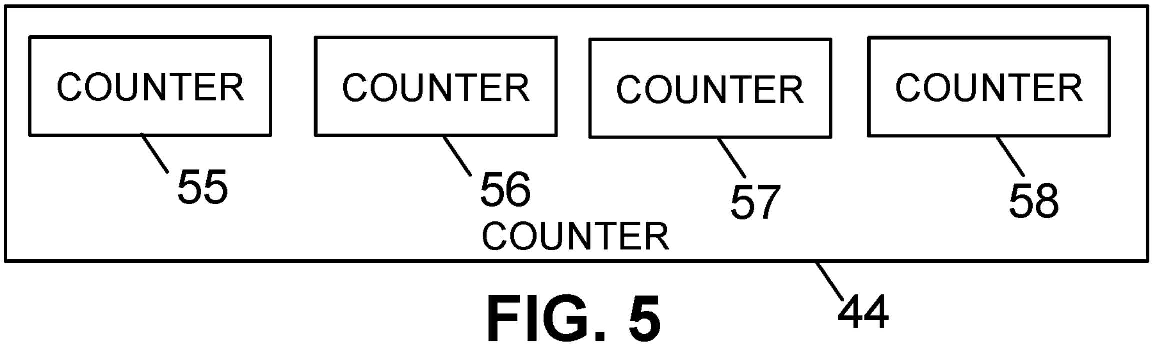

FIG. 5 shows an example in which the counter 44 includes a counter 55, 56, 57, 58. In accordance with at least some of the example embodiments, the counter 55 can count which stage (e.g., level) is a current stage of a multi-stage session. Table A shows an example of the counter 55 having five different values. The five different values correspond to five different stages of the multi-stage session. Table A also shows a match threshold corresponding to each stage of the multi-stage session. The match threshold can indicate how many times a match must occur during the stage before the session advances to a next stage. For a session of computer-implemented roulette games, a match can be the matching of a bonus trigger number show on a GUI and a number on the roulette wheel corresponding to a roulette wheel pocket in which the roulette ball landed. As an example, the counter 56 can count a quantity of matches achieved during each stage indicated by the counter 55. In at least some embodiments, the match threshold for each stage is one.

TABLE A

| Counter 55 | Match threshold | BTN Selection | BTN fixed/ stage | BTN quantity |
|---|---|---|---|---|
| 1 | 3 | Random | Yes | 3 |
| 2 | 3 | Random | Yes | 3 |
| 3 | 2 | Random | Yes | 2 |
| 4 | 2 | Random | Yes | 2 |
| 5 | 1 | Random | Yes | 1 |

Table A also includes data that indicates the bonus trigger number(s) for each stage are selected randomly and the bonus trigger number(s) are fixed for each stage. Table A also shows a quantity of bonus trigger number(s) used for each stage.

Table B shows an example of the counter 55 having three different values. The three different values correspond to three different stages of the multi-stage session. Table B also shows a match threshold corresponding to each stage of the multi-stage session.

TABLE B

| Counter 55 | Match threshold | BTN Selection | BTN fixed/ stage | BTN quantity |
|---|---|---|---|---|
| 1 | 3 | User | No | 3 |
| 2 | 2 | User | No | 2 |
| 3 | 1 | User | No | 1 |

Table B also includes data that indicates the bonus trigger number(s) for each stage are selected by a user of the computing system and the bonus trigger number(s) are not fixed for each stage. Accordingly, in some embodiments, a user may select bonus trigger number(s) for each performance of the computer-implemented game while the state machine is in the first state. Table B also shows a quantity of bonus trigger number(s) used for each stage.

Table C shows another example of the counter 55 having five different values. The five different values correspond to five different stages of the multi-stage session. Table C also shows a match threshold corresponding to each stage of the multi-stage session.

TABLE C

| Counter 55 | Match threshold | BTN Selection | BTN fixed/ stage | BTN quantity |
|---|---|---|---|---|
| 1 | 5 | User (random) | No | 3 |
| 2 | 4 | User (random) | No | 3 |
| 3 | 3 | User (random) | No | 3 |
| 4 | 2 | User (random) | No | 3 |
| 5 | 1 | User (random) | No | 3 |

Table C also includes data that indicates the bonus trigger number(s) for each stage are selected by a user of the computing system or randomly and the bonus trigger number(s) are not fixed for each stage. Table C also shows a quantity of bonus trigger number(s) used for each stage.

The counter 57 can indicate a quantity of wager entered during a session of performing the computer-implemented game. In at least some embodiments, the counter 57 can be reset to zero when a new session is started.

The counter 58 can include a counter to track a selected quantity of auto-play performances of the first computer-implemented game. As an example, the quantify of auto-play performances can be selected via a USC 99, 111 shown in FIG. 8. The counter 44 can include other counter(s) in addition to or an alternative to the counter 55, 56, 57, 58.

Figure 9:
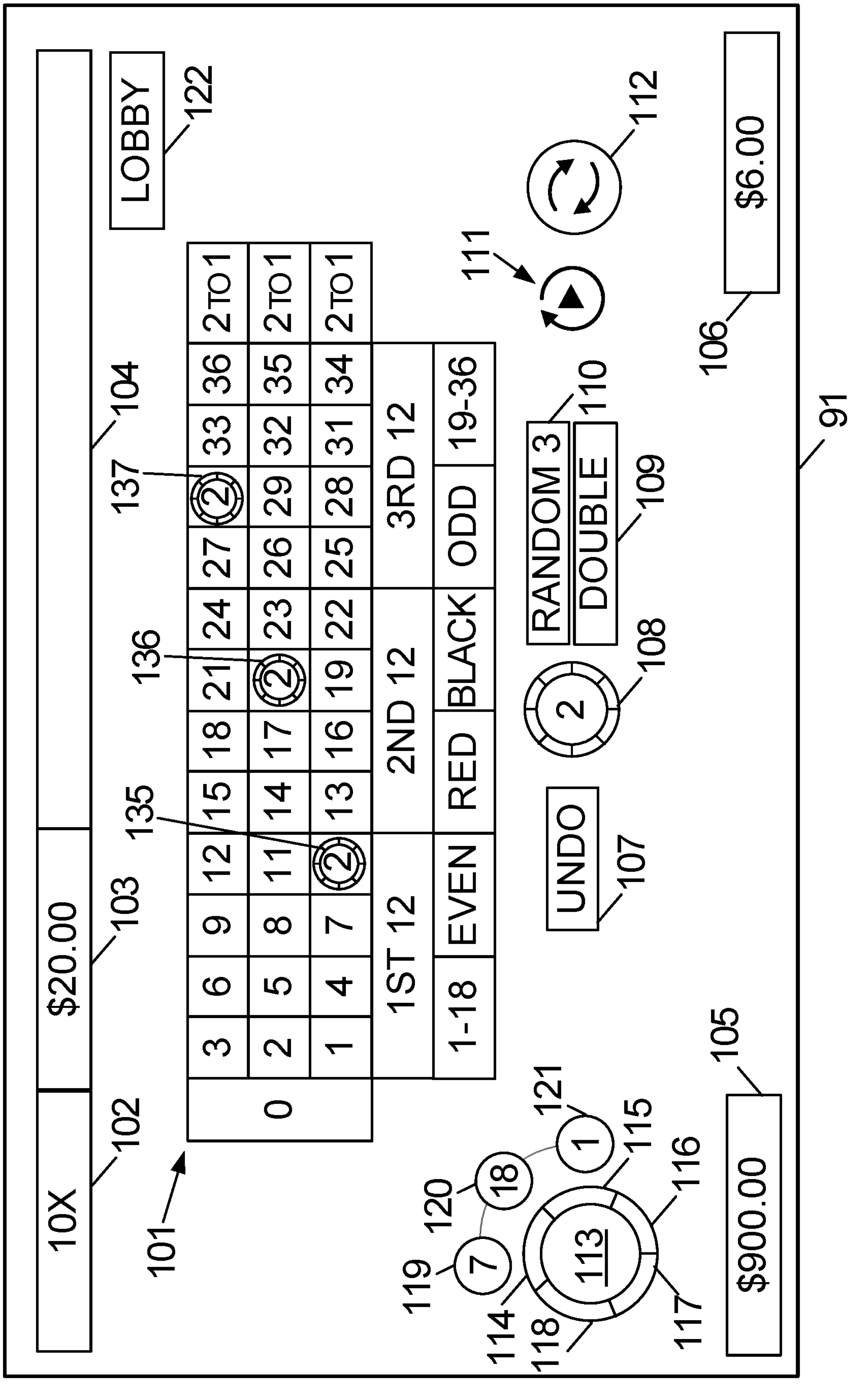

Returning to FIG. 4, the bonus trigger number 45 includes one or more bonus trigger numbers selected for comparison to a number selected during a computer-implemented game, such as a number selected using a random-number generator and revealed to a user of the computing system 20 via an animation showing a roulette wheel and roulette ball. The bonus trigger numbers can be output on a GUI. For example, bonus trigger numbers can be output on a GUI in a bonus trigger number indicator 119, 120, 121, as shown in FIG. 9.

The odds data 46 can include odds and payout data for a computer-implemented game. As an example, the odds data 46 can include odds and payout data for a computer-implemented roulette game performed while a state machine on a computing system operates in a first state. In accordance with at least some embodiments that include such odds data, the odds data can be reduced (i.e., reduced payout) as compared to standard odds data (i.e., std. payout) available for a roulette game. An example of the typical odds data is shown in Table D. For instance, a straight bet on a roulette wheel with thirty-seven numbers is 2.7% and the payout is 35:1, but the payout data could be reduced to 24:1. The difference in payouts for the roulette game can fund awards provided while the computing system operates in a second state. In at least some other embodiments, the odds data for the computer-implemented roulette game performed while the state machine on the computing system operates in the first state can be the odds and standard (Std.) and reduced payout data as shown in Table D.

TABLE D

| Wager type | Odds (38 Nos.) | Odds (37 Nos.) | Std. payout | Reduced payout |
|---|---|---|---|---|
| Straight wager | 2.6% | 2.7% | 35:1 | 24:1 |
| Low wager | 47.37% | 48.65% | 1:1 | 0.7:1 |
| High wager | 47.37% | 48.65% | 1:1 | 0.7:1 |
| Color wager | 47.37% | 48.65% | 1:1 | 0.7:1 |
| Dozen wager | 32.4% | 31.6% | 2:1 | 1.4:1 |
| Column wager | 32.4% | 31.6% | 2:1 | 1.4:1 |
| Even wager | 47.37% | 48.65% | 1:1 | 0.7:1 |
| Odd wager | 47.37% | 48.65% | 1:1 | 0.7:1 |
| Split wager | 5.3% | 5.4% | 17:1 | 6:1 |
| Street wager | 7.9% | 8.1% | 11:1 | 7.3:1 |
| Snake wager | 32.4% | 31.6% | 2:1 | 1.4:1 |
| Corner wager | 10.5% | 10.8% | 8:1 | 5.3:1 |
| Line wager | 7.9% | 8.1% | 11:1 | 9:1 |
| Five number wager | 13.2% | 13.5% | 6:1 | 4:1 |
| Four number wager | 10.5% | 10.8% | 8:1 | 5.3:1 |

In at least some implementations, the standard payout odds can be used. In those embodiments, the bonus round can be funded by the input of side wagers (e.g., a particular side wager for each bonus trigger number selected for each performance of the roulette game) Other examples of the odds and payout data are also possible.

The wager 47 can include wager data for one or more wagers (i.e., one or more bets). The one or more wagers can include a wager for a computer-implemented game. Each wager of the wagers 47 can indicate a quantity of credits (e.g., a quantity of tokens or a quantity of currency) and one or more numbers on a roulette wheel. In at least some embodiments, the currency can include crypto currency or currency of a geo-political country (e.g., the United States).

The wager for the computer-implemented game can include a wager for a computer-implemented roulette game. As another example, the wager for the roulette game can include a number selection. As another example, the wager for the roulette game can include an outside wager. Examples of an outside wager include a low wager (e.g., the numbers 1-18), a high wager (e.g., the numbers 19-36), a color wager (e.g., the numbers shown on a roulette table in red squares or the numbers shown on a roulette table in black squares), a dozen wager (e.g., the numbers 1-12, the numbers 13-24, or the numbers 25-36), a column wager (e.g., twelve numbers shown in a single column of red or black squares on a roulette table), an even wager (i.e., all the even numbers in a red or black square on the roulette table), or an odd wager (i.e., all the odd numbers in a red or black square on the roulette table). Other examples of an outside wager are possible.

As another example, the wager for a roulette game can include an inside wager. Examples of an inside wager include a straight up wager (i.e., a single number on the roulette table), a split wager (i.e., two adjacent numbers), a street wager (i.e., three numbers on one line across three columns of the roulette table), a snake wager (e.g., a twelve number wager, such as the numbers 1, 5, 9, 12, 14, 16, 19, 23, 27, 30, 32, 34), a corner wager (i.e., four number in a square, such as the numbers 2, 3, 5, 6), a line wager (i.e., six numbers in two lines across three columns of the roulette table, such as the numbers 13, 14, 15, 16, 17, 18), a five number wager (also known as, a basket wager) on an American roulette table (i.e., the numbers 0, 00, 1, 2, 3), a four-number wager on a European or Roulette table (i.e., the numbers 0, 1, 2, 3).

The wager 47 can include coefficient information corresponding to various types of wagers. Table E shows example coefficients and wager types. The even-money type wager can include a color wager, an even wager, an odd wager, a low wager, or a high wager.

TABLE E

| Wager type | Coefficient |
|---|---|
| Straight up | 100% |
| Split | 49% |
| Street | 46.35% |
| Square | 43.60% |
| Line | 27.25% |
| Dozen | 21.8% |
| Column | 21.8% |

TABLE E-continued

| Wager type | Coefficient |
|---|---|
| Even-money | 16.35% |

The wager 47 can include an average wager determined by a processor after each wager is entered for a multi-stage session. Referring to the wager data indicated in Table I and the GUIs shown in FIG. 8 to FIG. 21, the average wager values for that wager data can be as follows (event #, cumulative # of wagers, cumulative amount of wagers, average wager value): (1, 3, $6.00, $2.00); (2, 6, $12,00 $2.00); (3, 9, $24.00, $2.67); (4, 12, $30.00, $2.50); (5, 15, $36.00, $2.40); (6, 18, $42.00, $2.33); (7, 21, $48.00, $2.29); (8, 24, $54.00, $2.25); (9, 27, $60.00, $2.22); (10, 30, $66.00, $2.20); (11, 33, $72.00, $2.18); and (12, 36, $78.00, $2.17). Alternatively, the average wager for that wager data can be as follows (event #, cumulative amount of wagers, average wager per performance): (1, $6.00, $6.00); (2, $12.00, $6.00); (3, $24.00 $8.00); (4, $30.00, $7.50); (5, $36.00, $7.20); (6, $42.00, $7.00); (7, $48.00, $6.86); (8, $54.00, $6.75); (9, $60.00, $6.67); (10, $66.00, $6.60); (11, $72.00, $6.55; and (12, $78.00, $6.50). The event # can be referred to as a performance #.

The wager 47 can include an average wager based on the type of wager and its corresponding coefficient. As an example, the wagers indicated in Table I can be straight up type wagers such as the coefficient of each wager indicated in Table I is 100%. In accordance with that example, the average value for each event is the same as discussed in the previous paragraph.

Table F shows average wagers determined using coefficients defined for different types of wagers. Table F further shows a cumulative average wager based on the determined adjusted wagers.

Equation A – Adjusted wager = wager amount * wage type coefficient

TABLE F

| Event # | Wager amount | Wager Sum/No. of wagers | Wager type | Coefficient | Adjusted wager | Cumulative Ave. wager |
|---|---|---|---|---|---|---|
| 1 | $2.00 | $2.00/1 | Straight up | 100% | $2.00 | $2.00 |
| 2 | $2.00 | See below | Line | 27.25% | $0.55 | See below |
| 2 | $2.00 | $6.00/3 | Dozen | 21.8% | $0.44 | $1.00 |
| 3 | $2.00 | $8.00/4 | Even-money | 16.35% | $0.33 | $0.83 |
| 4 | $2.00 | See below | Straight up | 100% | $2.00 | See below |
| 4 | $2.00 | See below | Line | 27.25% | $0.55 | See below |
| 4 | $2.00 | $14.00/7 | Dozen | 21.8% | $0.44 | $0.90 |
| 5 | $2.00 | See below | Straight up | 100% | $2.00 | See below |
| 5 | $2.00 | See below | Split | 49% | $0.98 | See below |
| 5 | $2.00 | $20.00/10 | Street | 46.35% | $0.93 | $1.02 |

Table G shows average wagers determined using coefficients defined for different types of wagers and scaling factors defined for different stages of a multi-stage computer-implemented game. Table G further shows a cumulative average wager based on the adjusted wagers determined based on the coefficient and the scaling factor.

Equation B – Adjusted wager! = adjusted wager * scaling factor

TABLE G

| Event # | Wager amount | Wager type | Coefficient | Adjusted wager | Scaling factor | Adjusted wager! | Cumulative Ave. wager |
|---|---|---|---|---|---|---|---|
| 1 | $2.00 | Straight up | 100% | $2.00 | 80% | $1.60 | $1.60 |
| 2 | $2.00 | Line | 27.25% | $0.55 | 80% | $0.44 | See below |
| 2 | $2.00 | Dozen | 21.8% | $0.44 | 80% | $0.35 | $0.80 |
| 3 | $2.00 | Even-money | 16.35% | $0.33 | 90% | $0.30 | $0.67 |
| 4 | $2.00 | Straight up | 100% | $2.00 | 90% | $1.80 | See below |
| 4 | $2.00 | Line | 27.25% | $0.55 | 90% | $0.50 | See below |

TABLE G-continued

| Event # | Wager amount | Wager type | Coefficient | Adjusted wager | Scaling factor | Adjusted wager! | Cumulative Ave. wager |
|---|---|---|---|---|---|---|---|
| 4 | $2.00 | Dozen | 21.8% | $0.44 | 90% | $0.40 | $0.77 |
| 5 | $2.00 | Straight up | 100% | $2.00 | 100% | $2.00 | See below |
| 5 | $2.00 | Split | 49% | $0.98 | 100% | $0.98 | See below |
| 5 | $2.00 | Street | 46.35% | $0.93 | 100% | $0.93 | $0.93 |

The user data 48 can include data regarding one or more users of the computing system 20. As an example, the user data 48 can include data regarding a current user of the computing system 20. Table H shows data for two example users based on a multi-staged session discussed with respect to Table A. Referring to Table H, a prior user of the computing system can be user #2. That user can log onto the computing system 20 using the User ID #2 and the password PW #2. The user can continue the multi-staged session in the third stage, needing to still match two bonus trigger numbers before advancing to the fourth stage. The user data 48 can include data indicating the quantity of wagers each user has performed in a multi-stage session and an average wager for each instance of the user performing a computer-implemented game during the multi-stage session.

TABLE H

| User | User ID | Password | Counter 55/56 | Wagers | Ave. Wager | Credits |
|---|---|---|---|---|---|---|
| User #1 | User ID #1 | PW #1 | 2/2 | 12 | $1.25 | $1,200 |
| User #2 | User ID #2 | PW #2 | 3/0 | 18 | $3.10 | $ 497.50 |

Table H includes data showing a quantity of credits attributed to each user. The quantity of credits can be referred to as a credit value. If the credits are stored in the memory 30*b*, the credits can include a number of credits available for a user of the computing system 20*b*. If the credits are stored in the memory 30*a*, the credits can include a respective number of credits available for a user of a respective computing system arranged like the computing system 20*b*. A processor can update the credits available for each user based on payments entered at a computing system by that user, awards earned by use of the computing system by that user, and/or by use of an acceptor and/or validator. The credit value can be output on the display 25, 25*a*, 25*b*. The credit value can be based upon a quantity of coins, tokens, and/or bills entered using an acceptor.

The sounds 49 include audio files (e.g., an audio clip) that a processor 29 can output to a speaker (e.g., the speaker 28). Outputting an audio file can include outputting a signal that produces a particular sound due to the signal passing through a speaker. As an example, the particular sound can include a first particular sound to play when a roulette wheel is spinning on the display 25, a second particular sound to play when an award is earned during performance of a computer-implemented game, and/or a third particular sound to play when a prize wheel is spinning while a state machine of the computing system is in a second state (as described in this description). As another example, the sounds 49 can include an audio file, such as an audio file with one of the following file name extensions: WAV, MP3, MP4, WMA, or some other file name extension.

Each sound in the sounds 49 can correspond to an index value such that the processor 29*a* can provide the processor 29*b* with an instruction including a particular index value so that the processor 29*b* outputs via the speaker 28*b* an audio file corresponding to the particular index value. Accordingly, the processor 29*a* does not have to transmit the audio file to the processor 29*b* each time the audio file is to be output via the speaker 28*b*.

The database 50 can include one or more databases. A database of the database 50 can include content shown in FIG. 4. For example, the database 50 can include a data containing the user data for one or more users of the computing system 20. As another example, the database 50 can include previous results determined during a multi-stage session of roulette games. For instance, the database 50 can store previous result data corresponding to the previous result number 70 to the previous result number 79 shown in FIG. 19.

III. Example GUI

Next, FIG. 6 to FIG. 27 show GUIs in accordance with the example embodiments. A processor (e.g., the processor 29, 29*a*, 29*b*) of a computing system (e.g., the computing system 20, 20*a*, 20*b*) can output a GUI shown in FIG. 6 to FIG. 27 on a display (e.g., the display 25, 25*a*, 25*b*).

Figure 6:
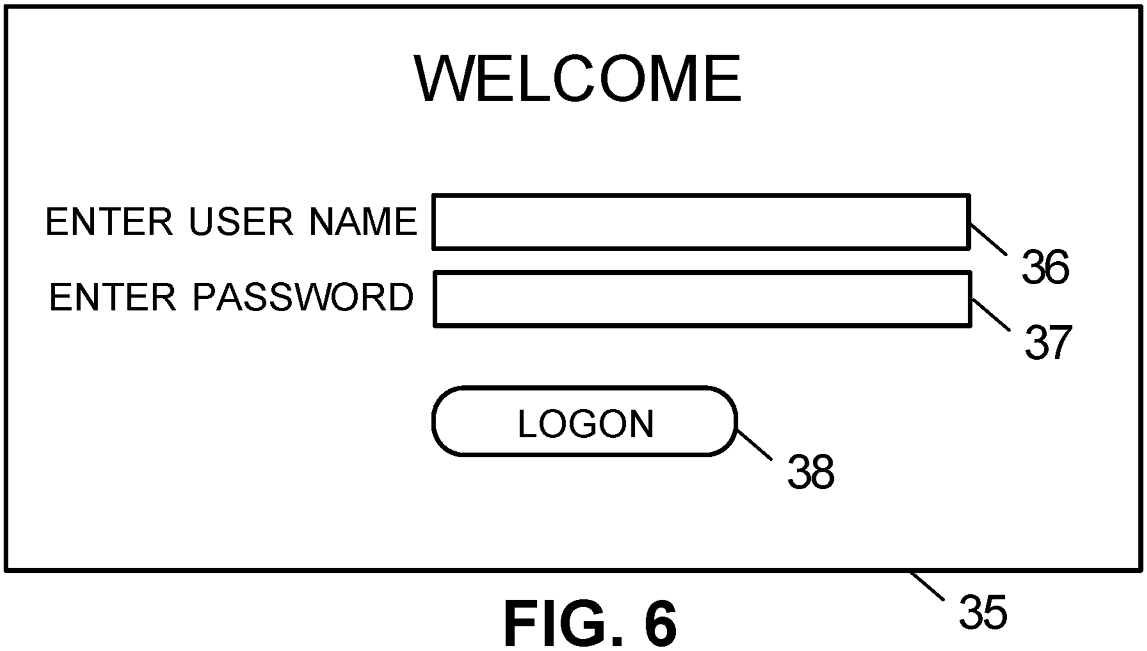
FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, and FIG. 27 show graphical user interfaces in accordance with the example embodiments.

FIG. 6 shows a GUI 35 for logging onto a computing system. The GUI 35 includes a field 36 for entering a user name and a field 37 for entering a password. The GUI 38 includes a USC 38. Selection of the USC 38 after entering a user name and corresponding password, the processor can log onto the computing system.

Figure 7:
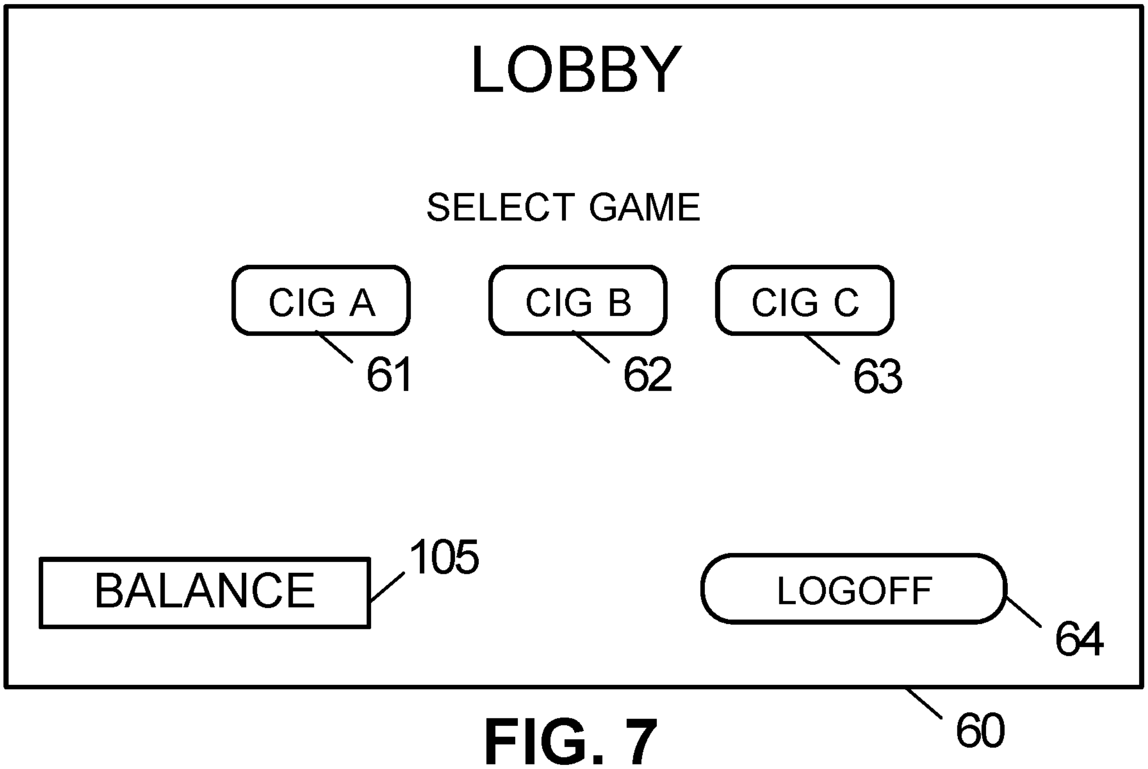

Next, FIG. 7 shows a GUI 60 corresponding to a lobby screen (e.g., a main menu and/or an initial menu). In some embodiments, the GUI 60 can be output on the display after the USC 38 shown in FIG. 6 is selected. In at least some other embodiments, the GUI 60 can be output on the display in response to the computing system being powered on. Additionally, in at least some embodiments, the GUI 60 can be output on the display in response to a selection of a USC 122 shown in other GUIs.

The GUI 60 includes a USC 61, 62, 63, 64. The USC 61, 62, 63 is selectable to cause the processor to cause the display to display a GUI (e.g., the GUI 90 shown in FIG. 8) for performing a computer-implemented game (CIG) corresponding to the USC 61, the USC 62, or the USC 63. The USC 64 is selectable to allow a user to log off from the computing system. The GUI 60 also includes a balance indicator 105 which indicates a quantity of credits corresponding to a user of the computing system (e.g., the user that logs onto the computing system) that outputs a GUI including the balance indicator 105.

FIG. 8, FIG. 9, FIG. 11, FIG. 13, FIG. 16, FIG. 17, FIG. 18, and FIG. 19 show a GUI 90, 91, 92, 93, 94, 95, 96, and 97, respectively. The GUI 90, 91, 92, 93, 94, 95, 96, 97 includes a roulette table layout 101 and other aspects with like reference numbers. The other aspects with like numbers in the GUI 90, 91, 92, 93, 94, 95, 96, 97 are like aspects, although some of the like aspects shown in the GUI 90, 91, 92, 93, 94, 95, 96, 97 show different content, positions, or values.

FIG. 10, FIG. 12, FIG. 14, and FIG. 20 show a GUI 140, 141, 142, and 143, respectively. The GUI 140, 141, 142, 143 includes a roulette wheel 151 and a roulette table layout 152 and other aspects with like reference numbers. The other aspects with like numbers in the GUI 140, 141, 142, 143 are like aspects, although some of the like aspects shown in the GUI 140, 141, 142, 143 show different content, positions, or values. The roulette wheel 151 includes the roulette wheel numbers “0” to “36” spaced around the roulette wheel and thirty-seven roulette wheel pockets, one roulette wheel pocket for each roulette wheel number “0” to “36.” The roulette wheel 151 is shown stopped at the same position in each of FIG. 10, FIG. 12, FIG. 14, FIG. 20 (e.g., the roulette wheel numbers “35” and “14” are shown at the top side of the GUI as shown in those drawings. A person having ordinary skill in the art will understand that the roulette wheel 151 can stop at different positions as well.

Figure 15:
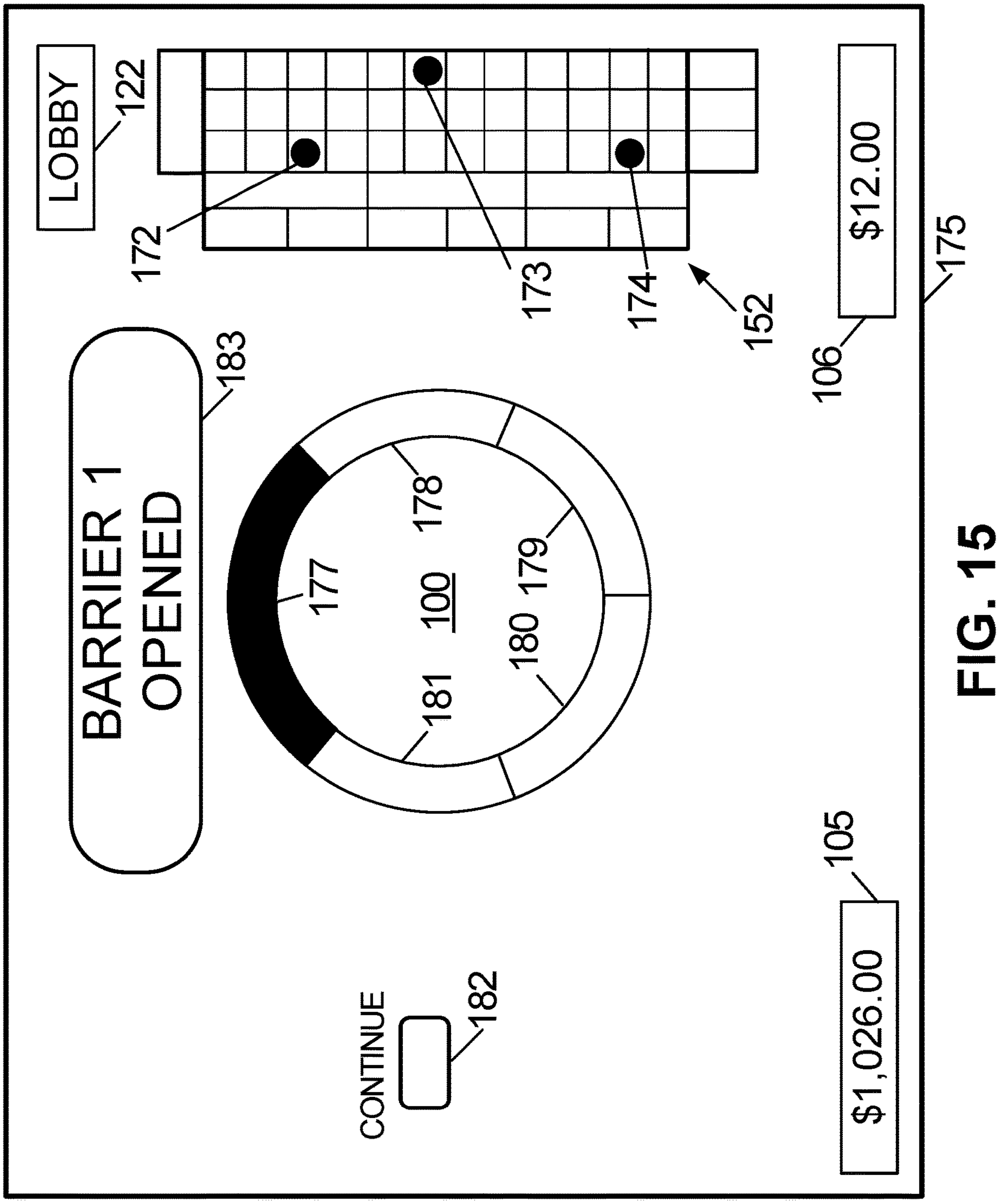
Figure 21:
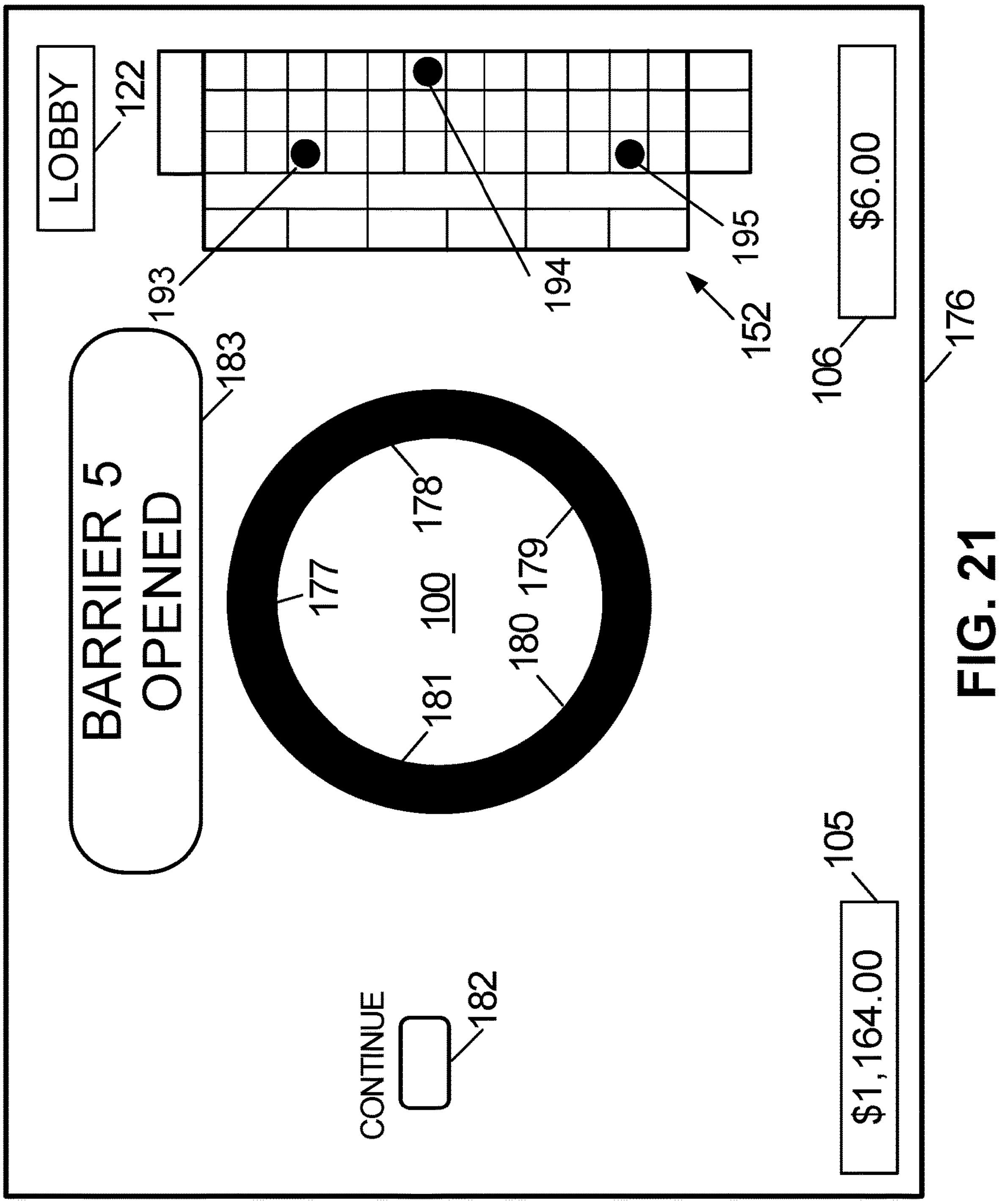

FIG. 15 and FIG. 21 show a GUI 175 and a GUI 176, respectively. The GUI 175, 176 includes a status indicator 100 and the roulette table layout 152 and other aspects with like reference numbers. The other aspects with like numbers in the GUI 175, 176 are like aspects, although some of the like aspects shown in the GUI 175, 176 show different content, positions, or values.

Figure 8:
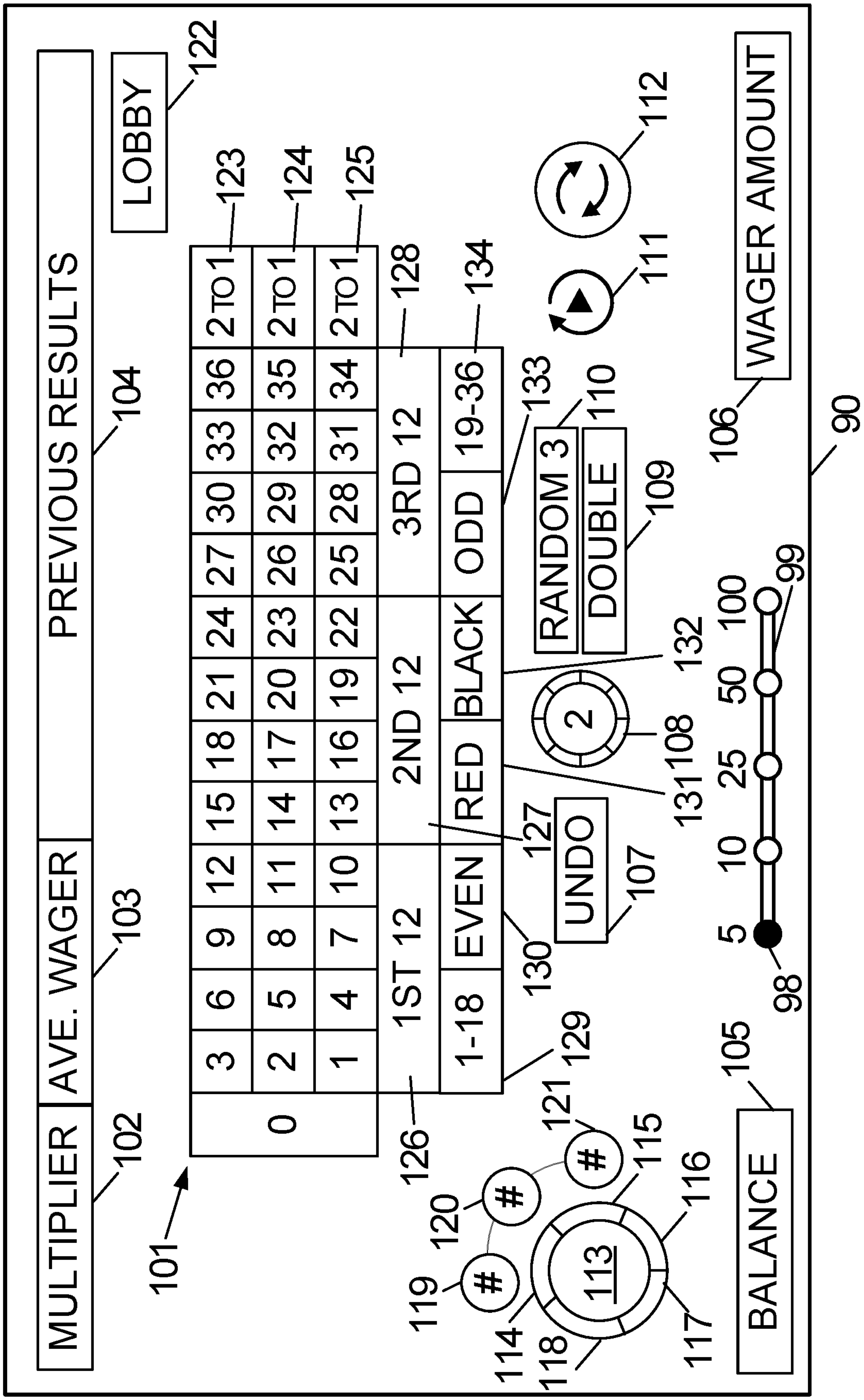

Turning to FIG. 8, the GUI 90 includes the roulette table layout 101, a multiplier indicator 102, a teaser bonus indicator 103, a previous result indicator 104, a balance indicator 105, a wager amount indicator 106, a user-selectable control (USC) 107, 108, 109, 110, 111, 112, a status indicator 113, a bonus trigger number indicator 119, 120, 121, and a USC 122. The description of FIG. 8 and other GUIs shown in the drawings, refer to a casino chip and a roulette game. The casino chip can be referred to as a virtual casino chip and the roulette game can be referred to as a computer-implemented roulette game. Moreover, for purposes of describing the example embodiments, a virtual casino chip can be referred to more simply as a casino chip, and a computer-implemented roulette game can be referred to more simply as a roulette game.

Figure 10:
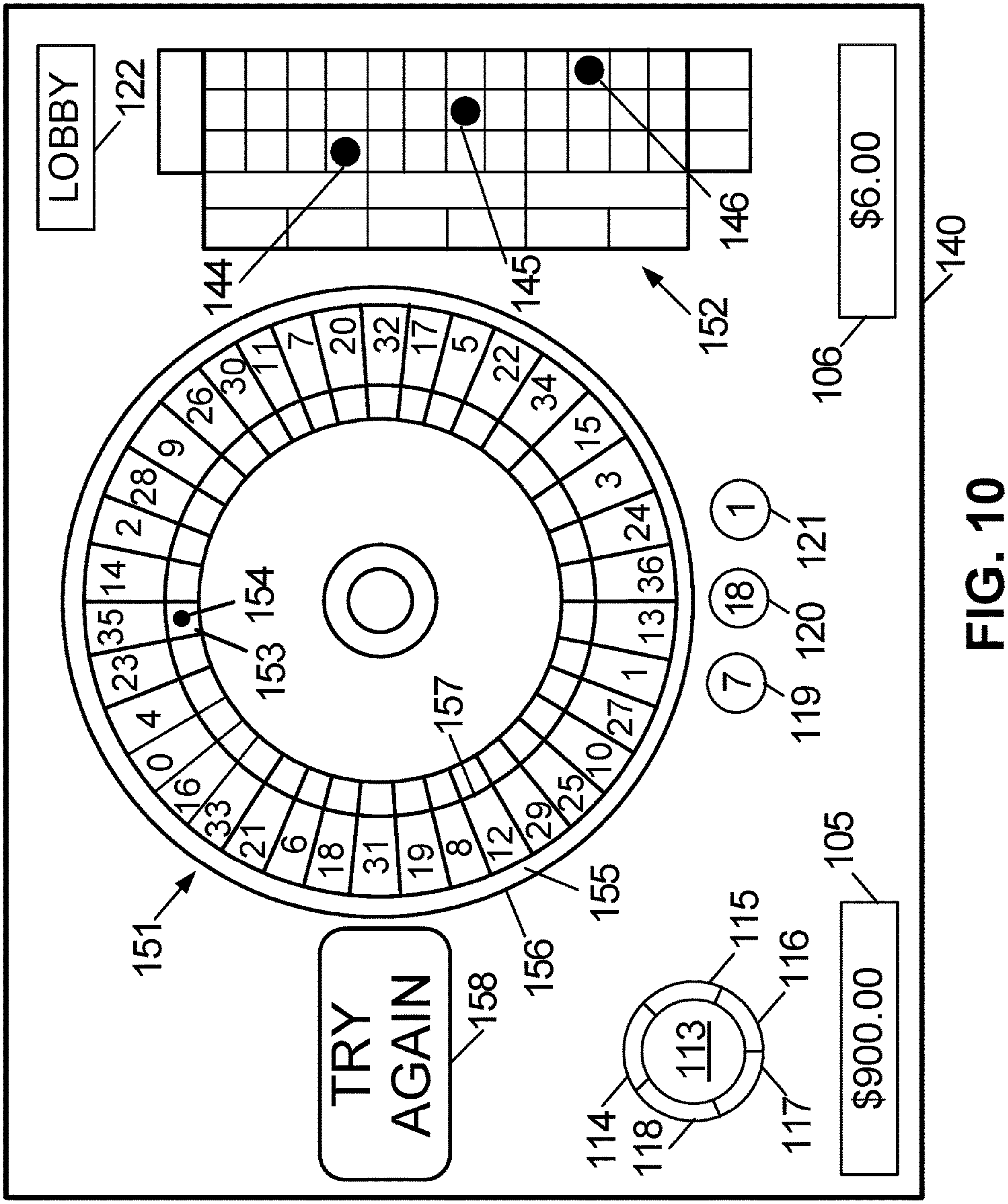

The roulette table layout 101 includes a set of numbers represented on the roulette wheel 151 (shown, for example, in FIG. 10). In the implementations based on FIG. 8, each number of the set of numbers is contained within a rectangle (e.g., a square). The lines surrounding those numbers can be used to indicate multiple numbers are selected for a wager by placement of a casino chip on one or more of the lines. The roulette table layout 101 also includes segments including wager identifiers based on a selection of multiple numbers within the roulette table layout 101, such as a segment 123 for a column of twelve numbers starting with three and ending with thirty-six, a segment 124 for a column of twelve numbers starting at two and ending with thirty-five, a segment 125 for a column of twelve numbers starting with one and ending with thirty-four, a segment 126 for the first twelve numbers, a segment 127 for the second twelve numbers, a segment 128 for the third twelve numbers, a segment 129 for the lowest eighteen numbers, a segment 130 for the even numbers, a segment 131 for the numbers corresponding to red positions on the roulette wheel, a segment 132 for the numbers corresponding to black positions on the roulette wheel, a segment 133 for the odd numbers, a segment 134 for the greatest eighteen numbers.

The multiplier indicator 102 can indicate a multiplier number that would be awarded to a player if a processor (e.g., the processor 29, 29*a*, 29*b*) indicates a current performance of the roulette game results in a computing system (e.g., the computing system 20, 20*a*, 20*b*) switching the state machine to the second state. As an example, the multiplier number can include a 10×, 20×, 25×, 100× multiplier number or some other multiplier number. In at least some implementations, a multiplier number within the multiplier indicator 102 indicates that some multiplier number would be awarded if the current performance of the roulette game results in a computing system switching the state machine to the second state, but not necessarily the actual multiplier number that would be awarded.

The teaser bonus indicator 103 indicates an award that the computing system would output, based on a current average wager value, should the state machine change to the second state to perform the second computer-implemented game and receive the multiplier shown by the multiplier indicator 102. The multiplier indicator 102 and the teaser bonus indicator 103 act as a sort of “teaser,” showing a player what they could win. In at least some embodiments, a process used to determine a prize amount on a spinnable wheel 200 shown in FIG. 22 can be used to determine a multiplier value in the multiplier indicator 102. The processor can determine an average wager value for a current session of performing the computer-implemented game as described elsewhere in this description. The average wager value can be a valued stored in the wager data 47. Examples of an average wager value are discussed throughout this description. The average wager value indicated by the teaser bonus indicator 103 can be used to determine an award after the state machine of the computing system changes to the second state.

The previous result indicator 104 can indicate game-selected numbers selected by the processor for previous performances of the roulette game. The previous result indicator 104 can be arranged in an order in which the previous performances occurred. For example, the order can be from the earliest previous performance to the latest previous performance and the ordered previous results can be displayed in the previous result indicator 104 from left to right.

The balance indicator 105 can indicate a quantity of credits corresponding to a user of the computing system that outputs a GUI including the balance indicator 105. The processor can output a value contained in the user data 48 that indicates the quantity of credits. The processor can modify the quantity of credits. For example, the processor can deduct a quantity of credits based on a quantity of credits indicated by the wager amount indicator 106, add a quantity of credits based on an award during use of the computing system, add a quantity of credits based on the user transferring additional credits into the user’s credits account, or deduct a quantity of credits in response to the user cashing out his or her credits. In at least some embodiments, the quantity of credits can be specified as an amount of currency (e.g., United States dollars).

The wager amount indicator 106 indicates a wager amount. As an example, the wager amount can be a sum of wagers corresponding to the placement of one or more casino chips onto the roulette table layout 101 via the USC 108. As an example, the wager amount can represent a quantity of credits or an amount of currency (e.g., United States dollars).

The USC 107 includes a USC for undoing (e.g., clearing) wagers entered via a GUI including the USC 107 before performing the roulette game. As an example, the USC 107 can be used to clear a wager in which a quantity casino chips were positioned on the roulette table layout 101 such that the most-recently entered casino chip remaining on the roulette table layout 101 is removed from the roulette table layout 101 or all of the casino chips are removed from the roulette table layout 101. The processor can update the wager amount indicator 106 in response to use of the USC 107. The USC 107 can be referred to as an undo USC.

The USC 108 includes a USC for selecting which number (s) on the roulette table layout 101 are selected for a wager corresponding to a performance of the roulette game. As an example, the processor can output an animation showing a casino chip moving from the position of the USC 108 to a position on the roulette table layout 101. FIG. 9 shows a casino chip 135, 136, 137 positioned on the roulette table layout 101 (in particular, on numbers ten, twenty, and thirty, respectively). Multiple numbers can be selected by placement of a casino chip on the roulette table layout 101. The USC 108 can be referred to as a chip placement USC.

The USC 109 includes a USC selectable to double a wager. As an example, the processor can double a value of one or more casino chips placed on the roulette table layout 101. As another example, the processor can double a value of a casino chip indicated by the USC 108. The processor can alter a wager amount indicated by the wager amount indicator 106. The USC 109 can be referred to as a double wager USC.

The USC 110 includes a USC selectable to cause the processor to select three numbers on the roulette table layout 101 using a random selection. In at least some implementation, the three numbers randomly selected are three numbers on which a casino chip is not currently positioned. In at least some implementations, the USC 110 can randomly select a quantity of numbers on the roulette table layout 101 other than three numbers. The USC 110 can be referred to as a random chip placement USC.

The USC 111 includes a USC selectable to cause the processor to output a USC 99 from which a quantity of automatic performances of the computer-implemented game. The USC 111 can be referred to as an auto-play USC. In at least some embodiments, the USC 99 includes an auto-play indicator 98 which can be moved along the USC 99 to select a desires quantity of performances (e.g., 10, 25, 50 or 100 performances or a quantity of performances between 5 and 10, between 10 and 25, between 25 and 50, or between 50 and 100. In at least some embodiments, after selecting a quantity of auto-play performances and entering one or more wagers, the automatic performances of the selected quantity of auto-play performances can begin in response to selecting the USC 112. In accordance with at least some embodiments, changing a state machine from a first state to a second state to perform a second computer-implemented game can be deferred until after all of the selected quantity of auto-play performances have been performed. In accordance with at least some other embodiments, performance of the selected quantity of auto-play performances can be interrupted in response to achieving the conditions to switch the state machine to the second state and perform the second computer-implemented game, and then switch the state machine back to the first state to continue auto-play performances of the first computer-implemented game if any remain.

The USC 112 includes a USC selectable to start performance of a roulette game. In at least some implementations, performance of the roulette game in response to a selection of the USC 112 is conditioned on a wager having been entered for the roulette game. The USC 112 can be referred to as a start USC. In at least some implementations, action(s) taken using the GUI 90 before selection of the USC 112 can be referred to as roulette game setup actions.

The status indicator 113 includes a stage indicator 114, 115, 116, 117, 118. The status indicator 113 can be used in implementations in which a computing system (e.g., the computing system 20, 20*a*, 20*b*) is configured with a state machine to perform multiple stages of roulette games. The stage indicator 114, 115, 116, 117, 118 can indicate first, second, third, fourth, and fifth stages, respectively. In at least some implementations, a state machine can include multiple stages having a quantity of stages other than five stages.

The bonus trigger number indicator 119, 120, 121 indicates a respective bonus trigger number (shown in FIG. 8 as "#") for an instance of performing the roulette game via a GUI including one or more of the bonus trigger number indicator 119, 120, 121 (e.g., the GUI 90). The quantity of bonus trigger number indicators shown in a GUI can include a quantity other than three. The quantity of bonus trigger number indicators shown on a GUI can be based on a stage of multiple stages of playing roulette using a computing system in accordance with the example implementations. Other drawings show examples of bonus trigger numbers within the bonus trigger number indicator 119, 120, 121.

In accordance with the example implementations, in response to a selection of the USC 122, the processor can be configured to display a different GUI, such as a GUI with a menu including a USC selectable to cause the processor to output a GUI including the USC 122 (e.g., the GUI 90). The USC 122 can be referred to as a lobby USC.

Next, FIG. 9 shows the GUI 91. The GUI 91 can be a different view of the GUI 90. As shown in FIG. 9, the balance indicator 105 indicates an amount of currency (i.e., $900.00). The amount of currency can indicate an amount of currency within the user data 48 for a user operating a computing system outputting a GUI including the balance indicator 105. As shown in FIG. 9, the wager amount indicator 106 indicates an amount of currency (i.e., $6.00). The amount of currency can indicate an amount of currency corresponding to a wager entered using the USC 108, the USC 109, and/or the USC 110. As an example, the wager amount indicator 106 (shown in FIG. 9) can be based on the casino chip 135, 136, 137 (e.g., two dollar casino chips) disposed on the roulette table layout 101.

As shown in FIG. 9, the bonus trigger number indicator 119, 120, 121 includes a bonus trigger number "7", "18", and "1", respectively. As shown in FIG. 9, the multiplier indicator 102 indicates a 10× multiplier value. As shown in FIG. 9, the teaser bonus indicator 103 indicates a value of $20.00. The processor can determine that value based on the 10× multiplier value and a $2.00 average wager value.

In FIG. 9, the previous result indicator 104 does not include any previous result. Accordingly, the instance of performing a roulette game via the GUI 90 is a first instance of performing the roulette game in a series of multiple instances of performing the roulette game to cause the computing system to enter a second state of a state machine. In at least some implementations, the instance of performing the roulette game via the GUI 90 can be an instance of performing the roulette game immediately after the computing system switches back to the first state of the state machine from the second state of the state machine.

Next, FIG. 10 shows the GUI 140. In accordance with at least some embodiments, the GUI 140 shown in FIG. 10 can be output on the display in response to a selection of the USC 112 shown in FIG. 9. The aspects shown in FIG. 9 and FIG. 10 can pertain to a single performance of a roulette game (e.g., event #1 in Table I).

The GUI 140 includes the roulette wheel 151, the roulette table layout 152, a roulette wheel pocket 153, a roulette ball 154 disposed within the roulette wheel pocket 153, a ring 155, and a USC 158. The GUI 140 includes the balance indicator 105, the wager amount indicator 106, the status indicator 113, and the USC 122. As shown in FIG. 10, the stage indicator 114, 115, 116, 117, 118 is not active (e.g., inactive or locked). The roulette wheel pocket 153 corresponds to a roulette wheel number "35." The roulette table layout 152 shows a casino chip 144, 145, 146 which corresponds to the casino chip 135, 136, 137 shown in FIG. 9, respectively.

In accordance with at least some implementations, the GUI 140 can be a different view of the GUI 91 after modifying the GUI 91 to include the roulette wheel 151, the roulette wheel pocket 153, the roulette ball 154, and the USC 158. Modifying the GUI 91 can include rotating the roulette table layout 101 to be arranged as the roulette table layout 152. Modifying the GUI 91 can include displaying the bonus trigger number indicator 119, 120, 121 at different positions (as compared to the positions the bonus trigger number indicator 119, 120, 121 are shown in the GUI 91), such as a position below the roulette wheel 151. The roulette wheel 151 can include a ring 155 extending from an outer ring edge 156 to an inner ring edge 157. An animation that shows the roulette wheel 151 spinning, can further show the roulette ball 154 rolling within the ring 155 until the roulette ball 154 drops into a roulette wheel pocket (e.g., the roulette wheel pocket 153) of the roulette wheel 151.

The USC 158 can include a USC selectable to generate a signal to notify the processor that performing a next event of the roulette game is desired. The USC 158 can be referred to as a "next-game USC" and/or a "continue USC".

Figure 11:
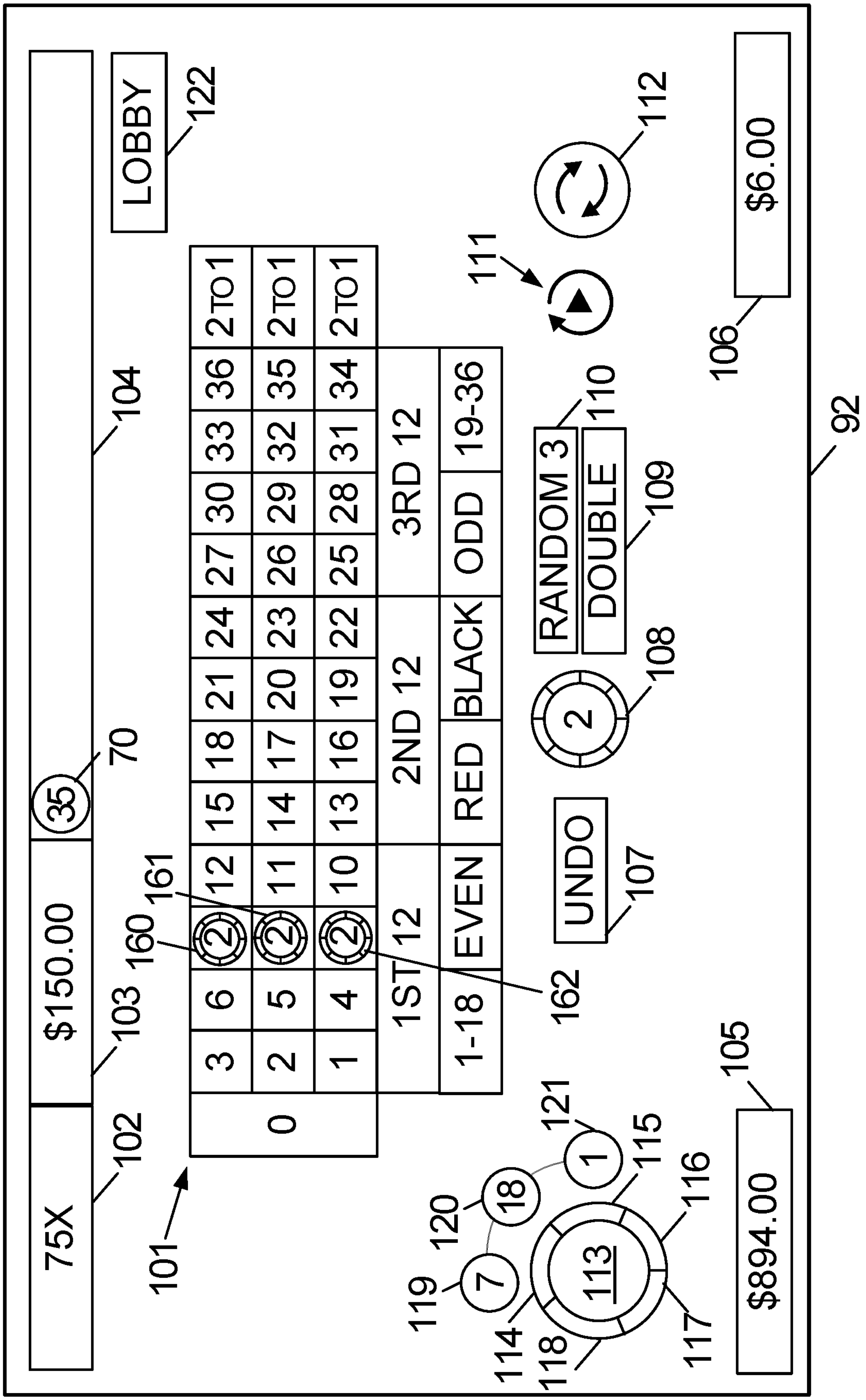

Next, FIG. 11 shows the GUI 92. In accordance with at least some embodiments, the GUI 92 can be output on the display in response to a selection of the USC 158 shown in FIG. 10. The GUI 92 can include a modified view of the GUI 91, based at least in part on the GUI 92 showing aspects for performing a subsequent instance of the roulette game. As shown in FIG. 11, the previous result indicator 104 includes a previous result number 70 (i.e., "35") that corresponds to the roulette ball 154 landing in the roulette wheel pocket 153 as shown in FIG. 10. Accordingly, a performance based on the wagers shown in FIG. 11 would be a second performance of the current session.

The balance indicator 105 indicates a quantity of credits that takes into account the quantity of credits in the balance indicator 105 as shown in FIG. 9 and the wager amount shown in the wager amount indicator 106 as shown in FIG. 11 (i.e., $900.00−$6.00=$894.00). The wager amount shown in the wager amount indicator 106 in FIG. 11 can be based on the casino chip 160, 161, 162 (e.g., two dollar casino chips) disposed on the roulette table layout 101. As shown in FIG. 11, the stage indicator 114, 115, 116, 117, 118 is not active.

As shown in FIG. 11, the multiplier indicator 102 indicates a 75× multiplier value. As shown in FIG. 11, the teaser bonus indicator 103 indicates a value of $150.00. The processor can determine that value based on the 75× multiplier value and a $2.00 average wager value as described elsewhere in this description.

Figure 12:
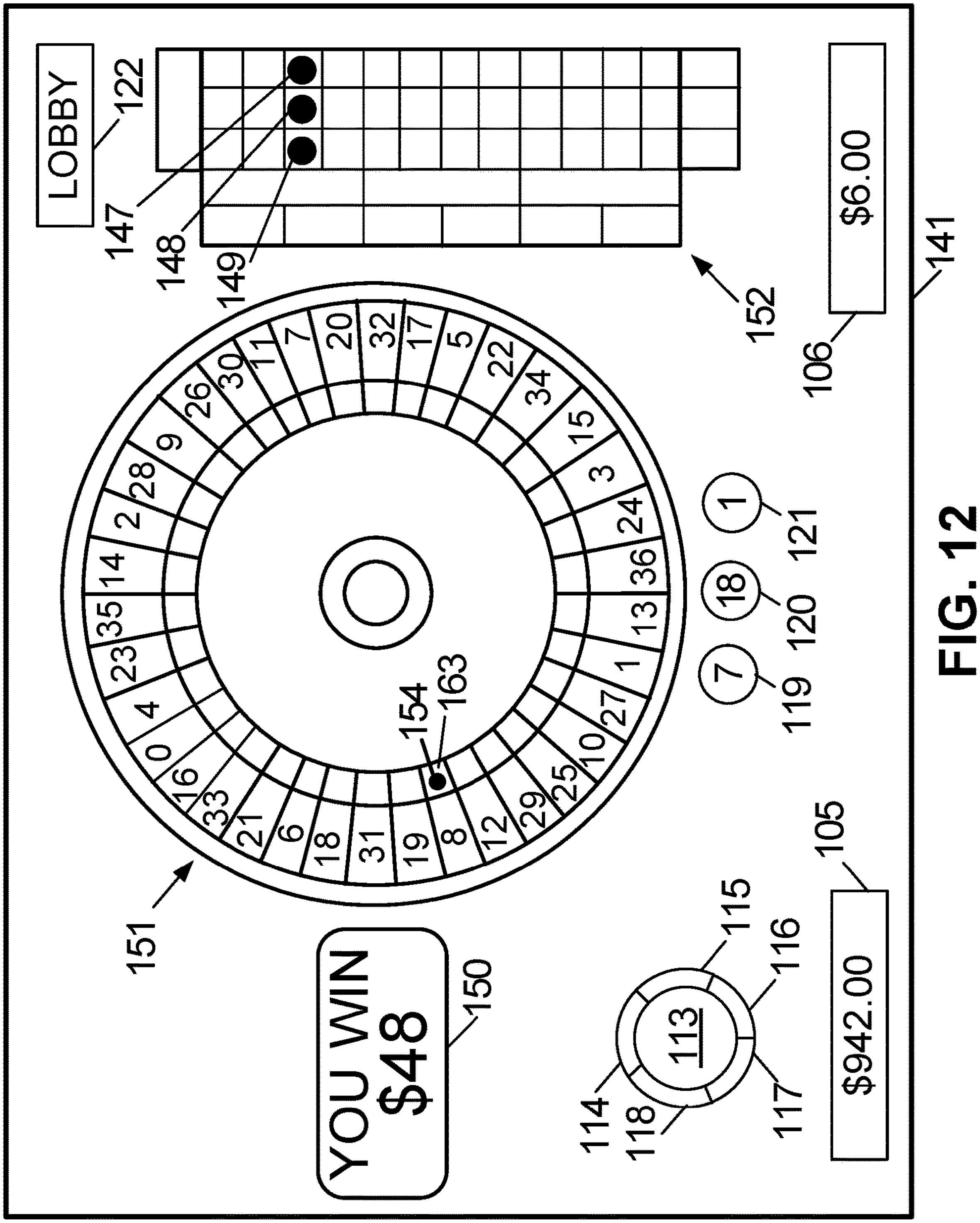

Next, FIG. 12 shows the GUI 141. In accordance with at least some embodiments, the GUI 141 shown in FIG. 12 can be output on a display in response to a selection of the USC 112 shown in FIG. 11. The aspects shown in FIG. 11 and FIG. 12 can be output on the display during a performance of the same instance of a roulette game (e.g., event #2 in Table I).

The GUI 141 includes the roulette wheel 151, the roulette table layout 152, the roulette wheel pocket 163, the roulette ball 154 disposed within the roulette wheel pocket 163, and a USC 150. The roulette wheel pocket 163 corresponds to a roulette wheel number "8."

The GUI 141 includes the balance indicator 105, the wager amount indicator 106, the status indicator 113, and the USC 122. As shown in FIG. 12, the stage indicator 114, 115, 116, 117, 118 is not active. The GUI 141 includes the bonus trigger number indicator 119, 120, 121. The numbers within the bonus trigger number indicator 119, 120, 121 shown in FIG. 12 are the same numbers as shown within the bonus trigger number indicator 119, 120, 121 in FIG. 9 to FIG. 11. In at least implementations, the bonus trigger number(s) is/are selected anew for each instance of performing the roulette game.

As shown in FIG. 12, the balance indicator 105 indicates a quantity of credits that takes into account the quantity of credits in the balance indicator 105 as shown in FIG. 11 and an award amount shown in the USC 150 as shown in FIG. 12 (i.e., $894.00+$48.00=$942.00). The wager amount shown in the wager amount indicator 106 in FIG. 12 can be based on the two dollar casino chip 147, 148, 149 disposed on the roulette table layout 152, which correspond to casino chip 160, 161, 162 in FIG. 11, respectively.

The USC 150 can include a USC selectable to generate a signal to notify the processor that performing a next event of the roulette game session is desired. In accordance with at least some implementations, the USC 150 can indicate an amount awarded during a performance of the roulette game, such as the performance that resulted in the roulette ball 154 dropping into the roulette wheel pocket 163, as shown in FIG. 12. As an example, the $48 award can be based on the $2.00 wager entered on number "8" and the 24:1 reduced payout for a straight wager in accordance with Table D.

Figure 13:
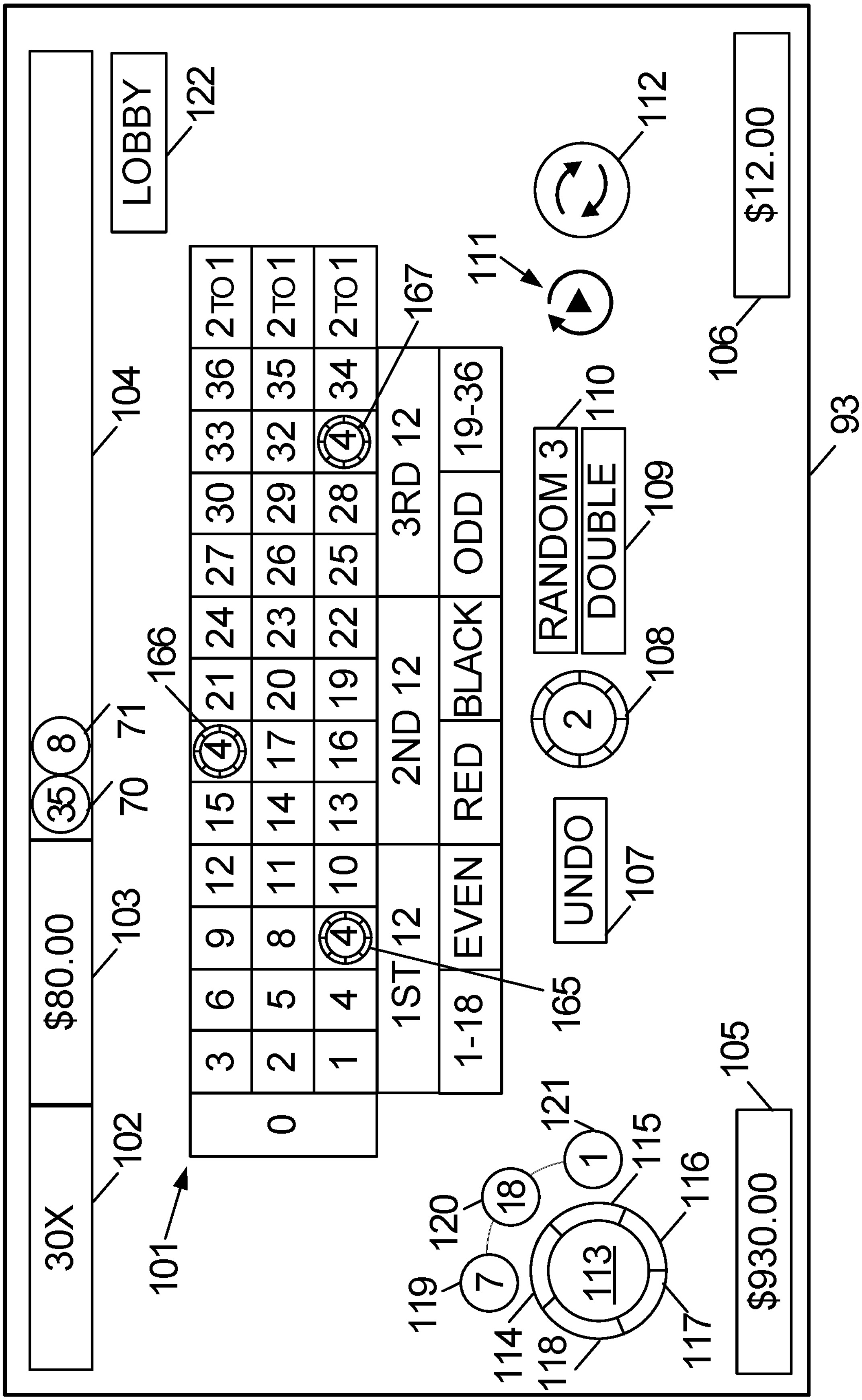

Next, FIG. 13 shows the GUI 93. In accordance with at least some embodiments, the GUI 93 can be output on the display in response to a selection of the USC 150 shown in FIG. 12. The GUI 93 can include a modified view of the GUI 92, based at least in part on the GUI 93 showing aspects for performing a subsequent instance of the roulette game. As shown in FIG. 13, the previous result indicator 104 includes a previous result number 70, 71 that corresponds to the roulette ball 154 landing in the roulette wheel pocket 153 as shown in FIG. 10 and the roulette ball 154 landing in the roulette wheel pocket 163 as shown in FIG. 12. Accordingly, a performance based on the wagers shown in FIG. 13 would be a third performance of the current session.

The balance indicator 105 indicates a quantity of credits that takes into account the quantity of credits in the balance indicator 105 as shown in FIG. 11 and the wager amount shown in the wager amount indicator 106 as shown in FIG. 13 (i.e., $942.00−$12.00=$930.00). The wager amount shown in the wager amount indicator 106 in FIG. 13 can be based on the casino chip 165, 166, 167 (e.g., four dollar casino chips) disposed on the roulette table layout 101. The casino chips 165, 166, 167 can be made four dollar casino chips by placing the casino chips 165, 166, 167 on the roulette table layout 101 and then selecting the USC 109.

As shown in FIG. 13, the multiplier indicator 102 indicates a 30× multiplier value. As shown in FIG. 13, the teaser bonus indicator 103 indicates a value of $80.00. The processor can determine that value based on the 30× multiplier value and a $2.67 average wager value (based on a sum of $24.00 based on nine wagers) as described elsewhere in this description.

Figure 14:
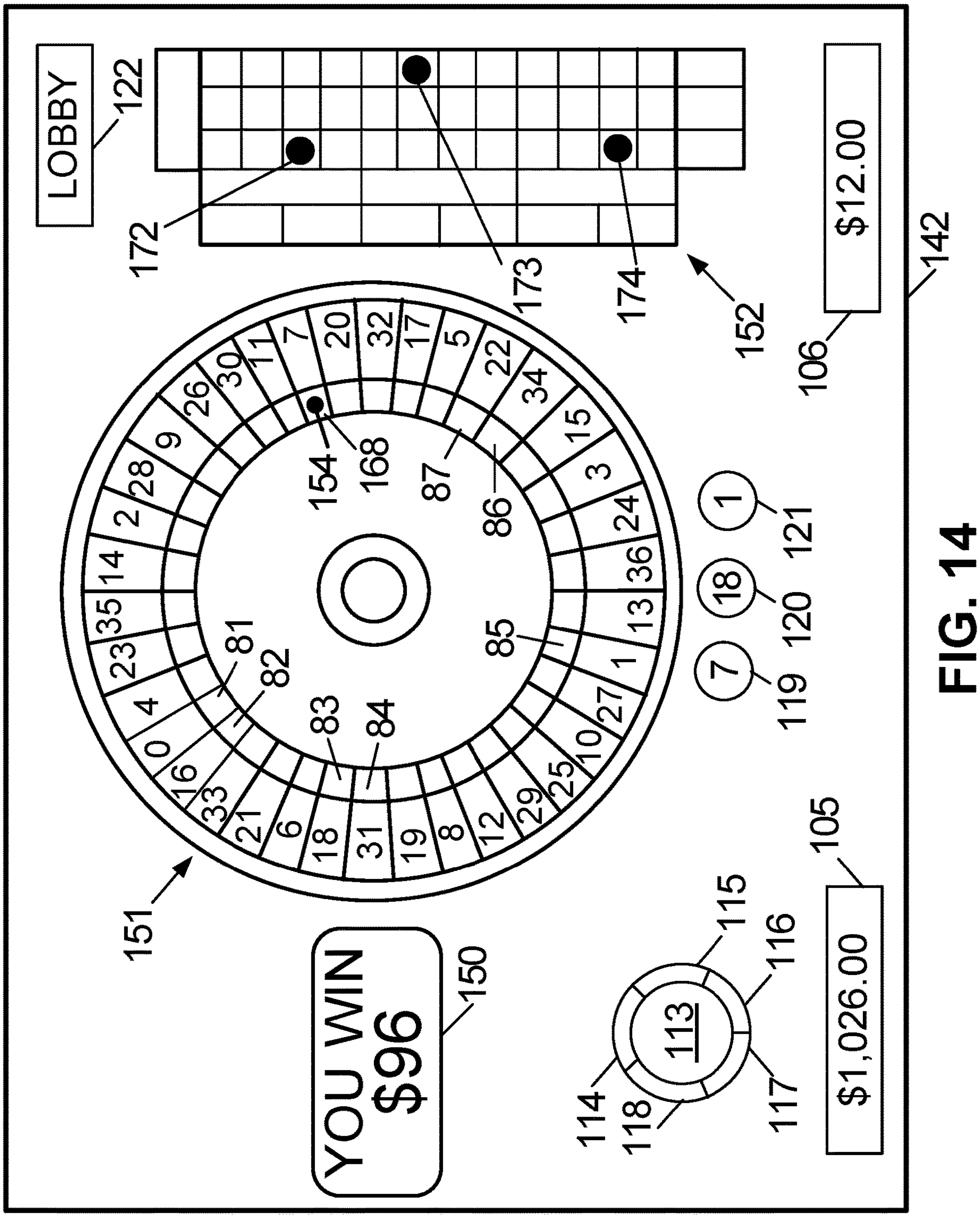

Next, FIG. 14 shows the GUI 142. In accordance with at least some embodiments, the GUI 142 shown in FIG. 14 can be output on a display in response to a selection of the USC 112 shown in FIG. 13. The aspects shown in FIG. 13 and FIG. 14 can be output on the display during a performance of the same instance of a roulette game (e.g., event #3 in Table I).

The GUI 142 includes the roulette wheel 151, the roulette table layout 152, the roulette wheel pocket 168, the roulette ball 154 disposed within the roulette wheel pocket 168, and a USC 150. The roulette wheel pocket 168 corresponds to a roulette wheel number "7." Among other roulette wheel pockets, the roulette wheel 151 includes a roulette wheel pocket 81, 82, 83, 84, 85, 86, 87.

The GUI 142 includes the balance indicator 105, the wager amount indicator 106, the status indicator 113, and the USC 122. As shown in FIG. 14, the stage indicator 114, 115, 116, 117, 118 is not active. The GUI 142 includes the bonus trigger number indicator 119, 120, 121. The numbers within the bonus trigger number indicator 119, 120, 121 shown in FIG. 14 are the same numbers as shown within the bonus trigger number indicator 119, 120, 121 in FIG. 9 to FIG. 13.

As shown in FIG. 14, the balance indicator 105 indicates a quantity of credits that takes into account the quantity of credits in the balance indicator 105 as shown in FIG. 13 and an award amount shown in the USC 150 as shown in FIG. 14 (i.e., $930.00+$96.00=$1,026.00). The wager amount shown in the wager amount indicator 106 in FIG. 14 can be based on the four dollar casino chip 172, 173, 174 disposed on the roulette table layout 152, which correspond to casino chip 165, 166, 167 in FIG. 13, respectively.

The USC 150 can include a USC selectable to generate a signal to notify the processor that performing a next event of the roulette game is desired. In accordance with at least some implementations, the USC 150 can indicate an amount awarded during a performance of the roulette game, such as the performance that resulted in the roulette ball 154 dropping into the roulette wheel pocket 168, as shown in FIG. 14. As an example, the $96 award can be based on the $4.00 wager entered on number "7" and the 24:1 reduced payout for a straight wager in accordance with Table D.

Next, FIG. 15 shows a GUI 175 in accordance with the example embodiments. In accordance with at least some embodiments, the GUI 175 shown in FIG. 15 can be output on a display in response to a selection of the USC 150 shown in FIG. 14. In accordance with at least some other embodiments, the GUI 175 shown in FIG. 15 can be output on the display after a particular amount of time has passed since the roulette wheel 151 stopped spinning with the roulette ball disposed the roulette wheel pocket 168 or after some other event that takes place during a roulette game is performed to show aspects shown in FIG. 13 or FIG. 14. As an example, the particular amount of time can be a time between one and five seconds, or a time within a different time range. The aspects shown in FIG. 13, FIG. 14, and FIG. 15 can pertain to a single performance of a roulette game (e.g., event #3 in Table I).

The GUI 175 includes a status indicator 100 including a stage indicator 177, 178, 179, 180, 181. The stage indicator 177 is active (e.g., unlocked). The stage indicator 178, 179, 180, 181 is inactive. The stage indicator 177 corresponds to a first barrier of five barriers being open. The GUI 175 includes a notification 183 indicating that "Barrier 1 opened."

The GUI 175 includes a USC 182 which is selectable to generate a signal to notify the processor that performing a next event of the roulette session is desired. The USC 182 can be referred to as a "next-game USC" and/or a "continue USC".

In accordance with at least some implementations, the GUI 175 can be a modified view of the GUI 142 shown in FIG. 14. In that regard, modifying the GUI 142 can include resizing and moving the status indicator 113 to be the status indicator 100. Modifying the GUI 142 to be arranged as the GUI 175 can include changing the USC 150 to be the USC 182. Modifying the GUI 142 can include removing or blurring the roulette wheel 151 and displaying the status indicator 100 and the notification 183 in some portion of the GUI 142, such as portion where the roulette wheel 151 is shown in FIG. 14.

Figure 16:
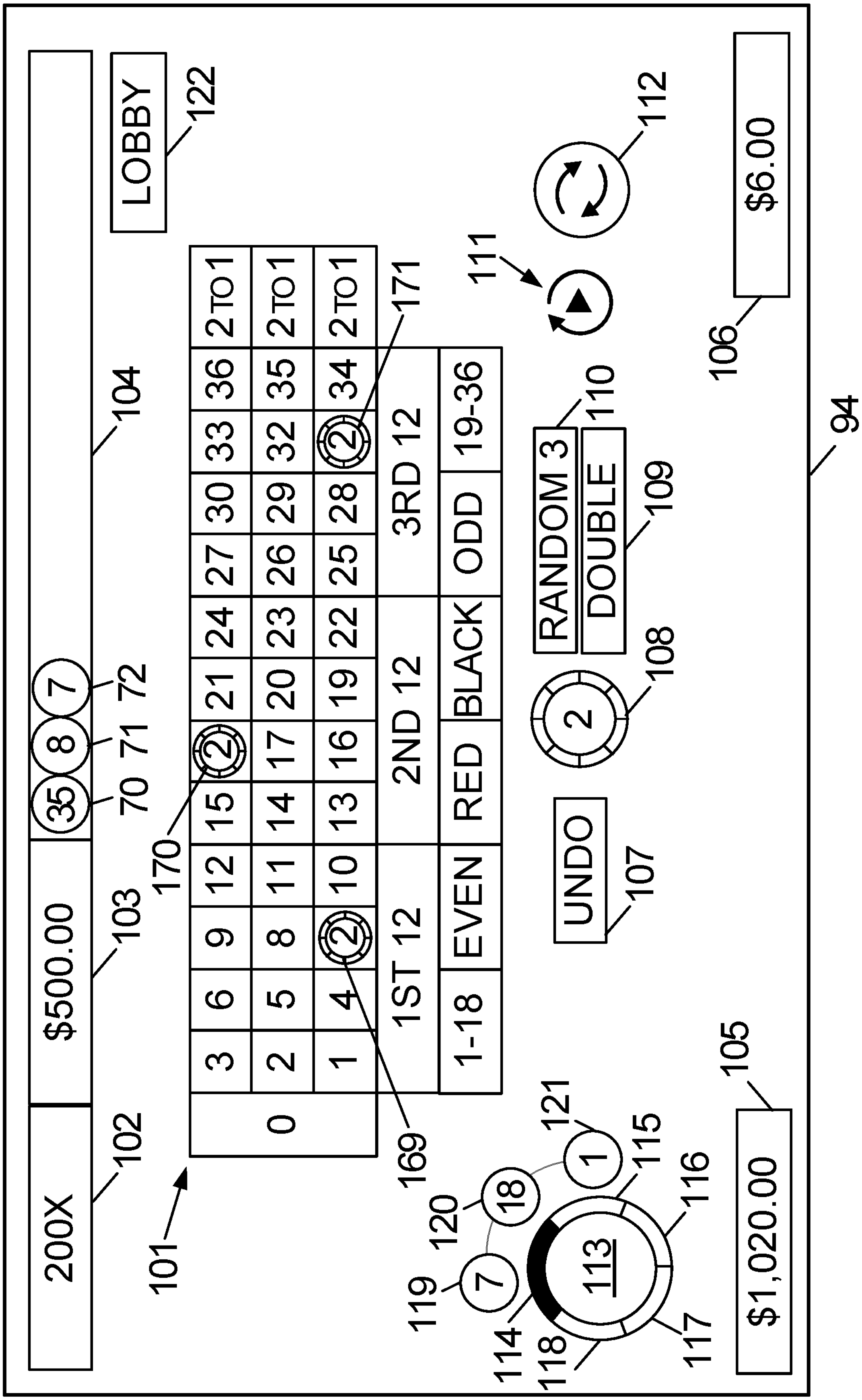

Next, FIG. 16 shows the GUI 94. In accordance with at least some embodiments, the GUI 94 can be output on the display in response to a selection of the USC 182 shown in FIG. 15. The GUI 94 can include a modified view of the GUI 93, based at least in part on the GUI 94 showing aspects for performing a subsequent instance of the roulette game.

As shown in FIG. 16, the previous result indicator 104 includes a previous result number 70, 71, 72 that corresponds to the roulette ball 154 landing in the roulette wheel pocket 153 as shown in FIG. 10, the roulette ball 154 landing in the roulette wheel pocket 163 as shown in FIG. 12, and the roulette ball 154 landing in the roulette wheel pocket 168 as shown in FIG. 14. Accordingly, a performance based on the wagers shown in FIG. 16 would be a fourth performance of the current session.

The balance indicator 105 indicates a quantity of credits that takes into account the quantity of credits in the balance indicator 105 as shown in FIG. 15 and the wager amount shown in the wager amount indicator 106 as shown in FIG. 15 (i.e., $1,026.00−$6.00=$1,020.00). The wager amount shown in the wager amount indicator 106 in FIG. 15 can be based on the two dollar casino chip 169, 170, 171 disposed on the roulette table layout 101.

As shown in FIG. 16, the multiplier indicator 102 indicates a 200× multiplier value. As shown in FIG. 16, the teaser bonus indicator 103 indicates a value of $500.00. The processor can determine that value based on the 200× multiplier value and a $2.50 average wager value as described elsewhere in this description.

Figure 17:
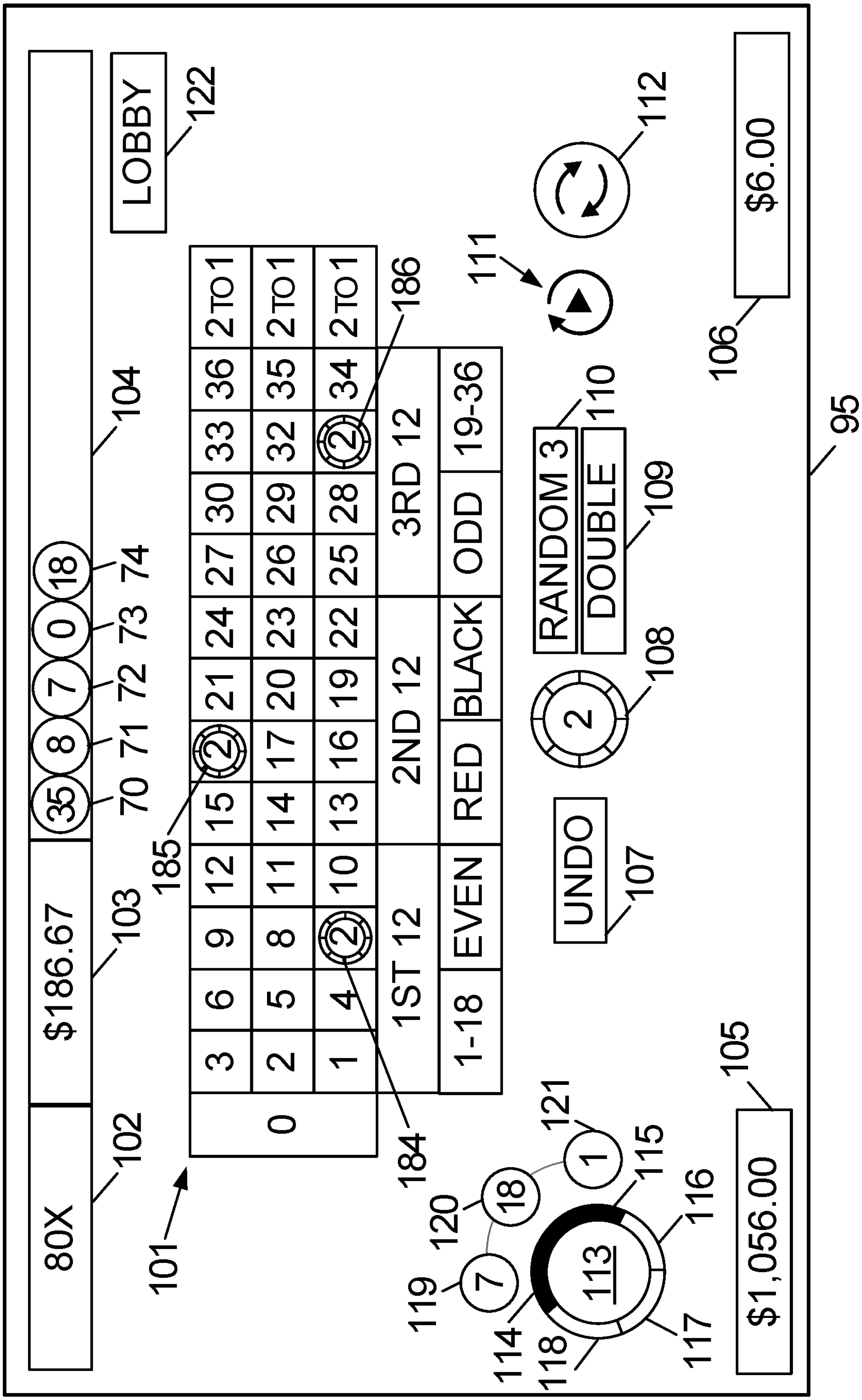

Next, FIG. 17 shows the GUI 95. The previous result indicator 104 includes a previous result number 70, 71, 72, 73, 74. The comments regarding the previous result number 70, 71, 72 in the description of FIG. 16 are applicable to the previous result number 70, 71, 72 shown in FIG. 17. The previous result number 73, 74 correspond to a roulette ball landing in the roulette wheel pocket 81, 83 (shown in FIG. 14), respectively. Accordingly, a performance based on the wagers shown in FIG. 17 would be a sixth performance of the current session.

The GUI 95 includes the status indicator 113. As shown in FIG. 17, the stage indicator 114, 115 is active and the stage indicator 116, 117, 118 is not active. Therefore, one of the previous results indicated by the previous result number 73, 74 matched a bonus trigger number selected for the performances that led to the previous results. Referring to Table I, a bonus trigger number was matched in the fifth event, which is the event occurring immediately before the event in which the GUI 95 is displayed. Referring to the status indicator 100 and the notification 183 shown in FIG. 15, a GUI showing the status indicator 100 within the stage indicator 177, 178 active and the stage indicator 179, 180, 181 inactive, and the notification 183 (except that the notification 183 indicates "Barrier 2 Opened" instead of "Barrier 1 Opened") can be displayed after a bonus trigger number was matched during the fifth event indicated in Table I and prior to the GUI 95 being displayed.

The GUI 95 includes the bonus trigger number indicator 119, 120, 121. The numbers within the bonus trigger number indicator 119, 120, 121 shown in FIG. 17 are the same numbers as shown within the bonus trigger number indicator 119, 120, 121 in FIG. 9 to FIG. 14 and FIG. 16.

The GUI 95 can be output in response to selection of a USC within a previously-displayed GUI. As an example, the USC can be configured like: the USC 182 shown in FIG. 15 if a bonus trigger number was matched in the most-recent performance of a roulette game, the USC 158 shown in FIG. 10 if the number selected in the most-recent performance of a roulette game did not match a bonus trigger number nor a number selected for a wager, or the USC 150 shown in FIG. 12 if the number selected in the most-recent performance of a roulette game did not match a bonus trigger number but did match a number selected for a wager. In accordance with embodiments in which the USC 111 was previously selected for a quantity of performances and at least one of those performances remains to be performed, the GUI 95 can be displayed after the most-recent performance of the roulette game without selecting a USC after performance of the most-recent performance of the roulette game.

The balance indicator 105 indicates a quantity of credits that takes into account the quantity of credits existing for the user after performance of the most-recent performance of the roulette game and the wager amount shown in the wager amount indicator 106 as shown in FIG. 17 (i.e., \$1,062.00-\$6.00=\$1,056.00). The wager amount shown in the wager amount indicator 106 in FIG. 17 can be based on the two dollar casino chip 184, 185, 186 disposed on the roulette table layout 101.

As shown in FIG. 17, the multiplier indicator 102 indicates an 80× multiplier value. As shown in FIG. 17, the teaser bonus indicator 103 indicates a value of \$186.67. The processor can determine that value based on the 80× multiplier value and a \$2.33 average wager value as described elsewhere in this description.

Figure 18:
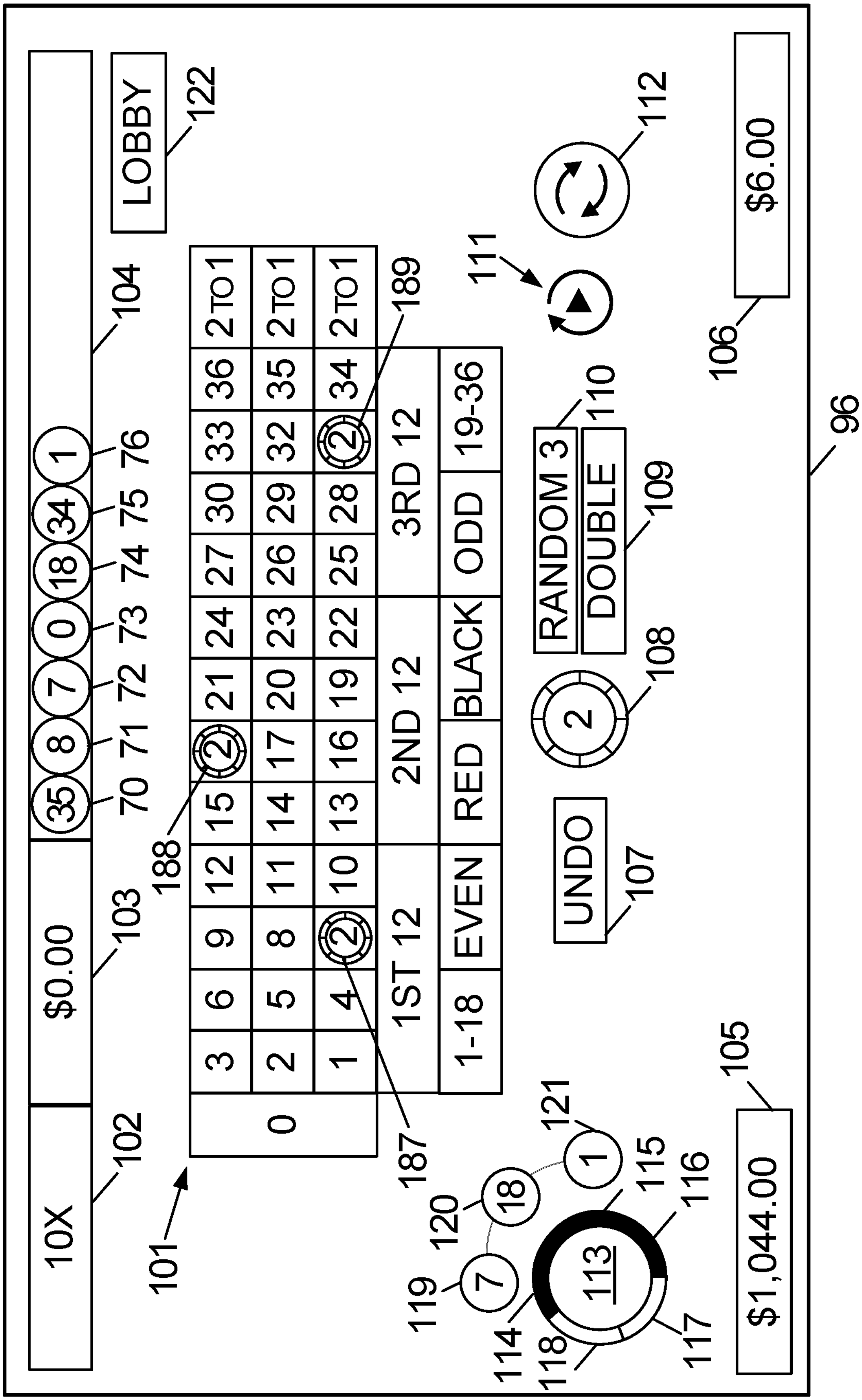

Next, FIG. 18 shows the GUI 96. The previous result indicator 104 includes a previous result number 70, 71, 72, 73, 74, 75, 76. The comments regarding the previous result number 70, 71, 72, 73, 74 in the description of FIG. 17 are applicable to the previous result number 70, 71, 72, 73, 74 shown in FIG. 18. The previous result number 75, 76 correspond to a roulette ball landing in the roulette wheel pocket 86, 85 (shown in FIG. 14), respectively.

The GUI 96 includes the status indicator 113. As shown in FIG. 18, the stage indicator 114, 115, 116 is active and the stage indicator 117, 118 is not active. Therefore, one of the previous results indicated by the previous result number 75, 76 matched a bonus trigger number selected for the performances that led to the previous results. Referring to Table I, a bonus trigger number was matched in the seventh event, which is the event occurring immediately before the event in which the GUI 96 is displayed. Referring to the status indicator 100 and the notification 183 shown in FIG. 15, a GUI showing the status indicator 100 within the stage indicator 177, 178, 179 active and the stage indicator 180, 181 inactive, and the notification 183 (except that the notification 183 indicates "Barrier 3 Opened" instead of "Barrier 1 Opened") can be displayed after a bonus trigger number was matched during the seventh event indicated in Table I and prior to the GUI 96 being displayed.

The GUI 96 includes the bonus trigger number indicator 119, 120, 121. The numbers within the bonus trigger number indicator 119, 120, 121 shown in FIG. 18 are the same numbers as shown within the bonus trigger number indicator 119, 120, 121 in FIG. 9 to FIG. 14, FIG. 16, and FIG. 17.

The GUI 96 can be output in response to selection of a USC within a previously-displayed GUI. As an example, the USC can be configured like: the USC 182 shown in FIG. 15 if a bonus trigger number was matched in the most-recent performance of a roulette game, the USC 158 shown in FIG. 10 if the number selected in the most-recent performance of a roulette game did not match a bonus trigger number nor a number selected for a wager, or the USC 150 shown in FIG. 12 if the number selected in the most-recent performance of a roulette game did not match a bonus trigger number but did match a number selected for a wager. In accordance with embodiments in which the USC 111 was previously selected for a quantity of performances and at least one of those performances remains to be performed, the GUI 96 can be displayed after the most-recent performance of the roulette game without selecting a USC after performance of the most-recent performance of the roulette game.

The balance indicator 105 indicates a quantity of credits that takes into account the quantity of credits existing for the user after performance of the most-recent performance of the roulette game and the wager amount shown in the wager amount indicator 106 as shown in FIG. 18 (i.e., \$1,050.00–\$6.00=\$1,044.00). The wager amount shown in the wager amount indicator 106 in FIG. 18 can be based on the two dollar casino chip 187, 188, 189 disposed on the roulette table layout 101.

Figure 19:
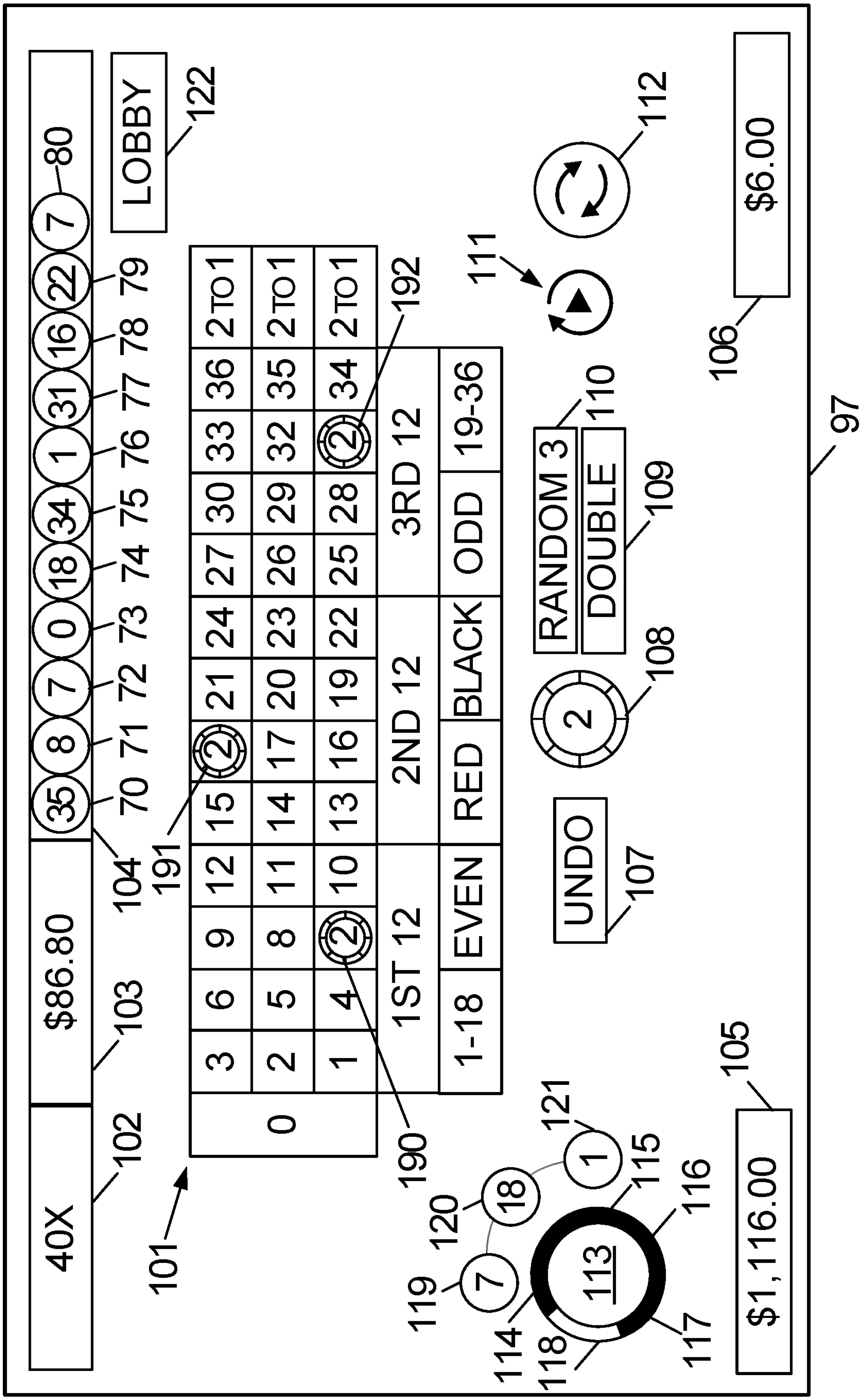

Next, FIG. 19 shows the GUI 97. The previous result indicator 104 includes a previous result number 70, 71, 72, 73, 74, 75, 76, 77, 78, 79, 80. The comments regarding the previous result number 70, 71, 72, 73, 74, 75, 76 in the description of FIG. 18 are applicable to the previous result number 70, 71, 72, 73, 74, 75, 76 shown in FIG. 19. The previous result number 77, 78, 79, 80 correspond to a roulette ball landing in the roulette wheel pocket 84, 82, 87, 168 (shown in FIG. 14), respectively.

The GUI 97 includes the status indicator 113. As shown in FIG. 19, the stage indicator 114, 115, 116, 117 is active and the stage indicator 118 is not active. Therefore, one of the previous results indicated by the previous result number 77, 78, 79, 80 matched a bonus trigger number selected for the performances that led to the previous results. Referring to Table I, a bonus trigger number was matched in the eleventh event, which is the event occurring immediately before the event in which the GUI 97 is displayed. Referring to the status indicator 100 and the notification 183 shown in FIG. 15, a GUI showing the status indicator 100 within the stage indicator 177, 178, 179, 180 active and the stage indicator 181 inactive, and the notification 183 (except that the notification 183 indicates "Barrier 4 Opened" instead of "Barrier 1 Opened") can be displayed after a bonus trigger number was matched during the eleventh event indicated in Table I and prior to the GUI 97 being displayed.

The GUI 97 includes the bonus trigger number indicator 119, 120, 121. The numbers within the bonus trigger number indicator 119, 120, 121 shown in FIG. 19 are the same numbers as shown within the bonus trigger number indicator 119, 120, 121 in FIG. 9 to FIG. 14, and FIG. 16 to FIG. 18.

The GUI 97 can be output in response to selection of a USC within a previously-displayed GUI. As an example, the USC can be configured like: the USC 182 shown in FIG. 15 if a bonus trigger number was matched in the most-recent performance of a roulette game, the USC 158 shown in FIG. 10 if the number selected in the most-recent performance of a roulette game did not match a bonus trigger number nor a number selected for a wager, or the USC 150 shown in FIG. 12 if the number selected in the most-recent performance of a roulette game did not match a bonus trigger number but did match a number selected for a wager. In accordance with embodiments in which the USC 111 was previously selected for a quantity of performances and at least one of those performances remains to be performed, the GUI 97 can be displayed after the most-recent performance of the roulette game without selecting a USC after performance of the most-recent performance of the roulette game.

The balance indicator 105 indicates a quantity of credits that takes into account the quantity of credits existing for the user after performance of the most-recent performance of the roulette game and the wager amount shown in the wager amount indicator 106 as shown in FIG. 19 (i.e., $1,122.00–$6.00=$1,116.00). The wager amount shown in the wager amount indicator 106 in FIG. 19 can be based on the casino chip 190, 191, 192 (e.g., two dollar casino chips) disposed on the roulette table layout 101.

As shown in FIG. 19, the multiplier indicator 102 indicates a 40× multiplier value. As shown in FIG. 19, the teaser bonus indicator 103 indicates a value of $86.80. The processor can determine that value based on the 40× multiplier value and a $2.17 average wager value as described elsewhere in this description.

Figure 20:
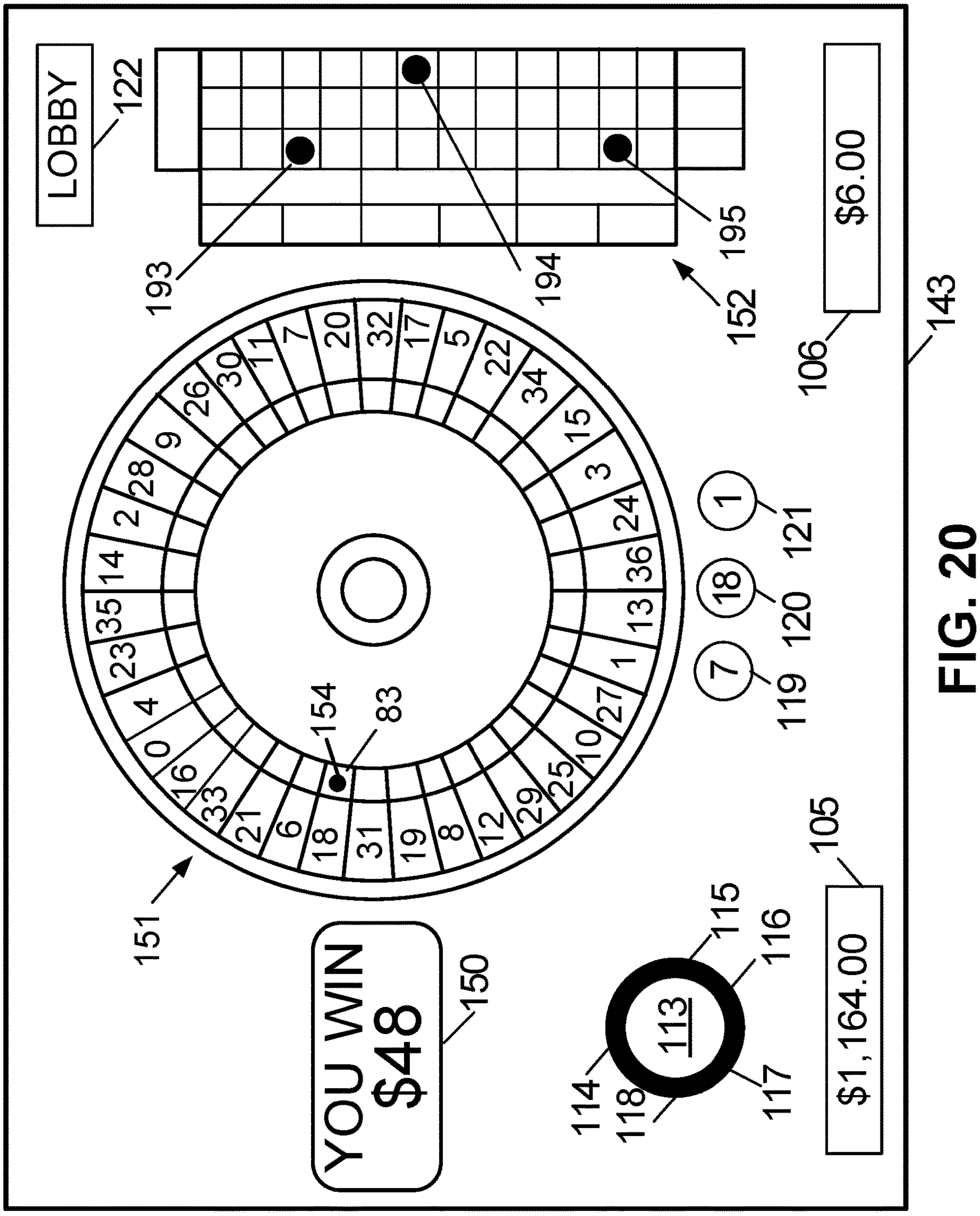

Next, FIG. 20 shows the GUI 143. In accordance with at least some embodiments, the GUI 143 shown in FIG. 20 can be output on a display in response to a selection of the USC 112 shown in FIG. 19 or selection of the USC 111 in a previously-displayed GUI. The aspects shown in FIG. 19 and FIG. 20 can be output on the display during a performance of the same instance of a roulette game (e.g., event #12 in Table I).

The GUI 143 includes the roulette wheel 151, the roulette table layout 152, the roulette wheel pocket 83, the roulette ball 154 disposed within the roulette wheel pocket 83, and a USC 150. The roulette wheel pocket 83 corresponds to a roulette wheel number “18.”

The GUI 143 includes the balance indicator 105, the wager amount indicator 106, the status indicator 113, and the USC 122. As shown in FIG. 20, the stage indicator 114, 115, 116, 117, 118 is active. Accordingly, unlike FIG. 14 which does not show the stage indicator 114 being active when a roulette ball has landed in a roulette wheel pocket corresponding to a number that matches a bonus trigger number (i.e., “7”), FIG. 20 shows the stage indicator 118 as active as a result a roulette ball landing in a roulette wheel pocket corresponding to a number that matches a bonus trigger number (i.e., “18”). In other words, in some implementations, a stage indicator appearing in a GUI showing the roulette wheel can become active as a result of a roulette ball landing in a roulette wheel pocket corresponding to a number matching a bonus trigger number while the stage indicator is active.

The GUI 143 includes the bonus trigger number indicator 119, 120, 121. The numbers within the bonus trigger number indicator 119, 120, 121 shown in FIG. 20 are the same numbers as shown within the bonus trigger number indicator 119, 120, 121 in FIG. 9 to FIG. 14 and FIG. 16 to FIG. 19. In at least implementations, the bonus trigger number(s) is/are selected anew for each instance of performing the roulette game.

As shown in FIG. 20, the balance indicator 105 indicates a quantity of credits that takes into account the quantity of credits in the balance indicator 105 as shown in FIG. 19 and an award amount shown in the USC 150 as shown in FIG. 20 (i.e., $1,116.00+$48.00=$1,164.00). The wager amount shown in the wager amount indicator 106 in FIG. 20 can be based on the two dollar casino chip 193, 194, 195 disposed on the roulette table layout 152, which correspond to casino chip 190, 191, 192 in FIG. 19, respectively. The wager amount shown in FIG. 20 is described as being deducted from the player’s account when the wager was entered via the GUI 97 shown in FIG. 19.

The USC 150 can include a USC selectable to generate a signal to notify the processor that performing a next event of the roulette session is desired. In accordance with at least some implementations, the USC 150 can indicate an amount awarded during a performance of the roulette game, such as the performance that resulted in the roulette ball 154 dropping into the roulette wheel pocket 83, as shown in FIG. 20.

Next, FIG. 21 shows a GUI 176. In accordance with at least some embodiments, the GUI 176 shown in FIG. 21 can be output on a display in response to a selection of the USC 150 shown in FIG. 20. In accordance with at least some other embodiments, the GUI 176 shown in FIG. 21 can be output on the display after a particular amount of time has passed since the roulette wheel 151 stopped spinning with the roulette ball disposed the roulette wheel pocket 83 or after some other event that takes place during a roulette game is performed to show aspects shown in FIG. 19 or FIG. 20. As an example, the particular amount of time can be a time between one and five seconds, or a time within a different time range. The aspects shown in FIG. 19, FIG. 20, and FIG. 21 can pertain to a single performance of a roulette game (e.g., event #12 in Table I).

The GUI 176 includes a status indicator 100 including the stage indicator 177, 178, 179, 180, 181. The stage indicator 177, 178, 179, 180, 181 is active, and corresponds to a first, second, third, fourth, and fifth barrier of five barriers being open. The GUI 176 includes a notification 183 indicating that “Barrier 5 opened.”

The GUI 176 includes a USC 182 which is selectable to generate a signal to notify the processor that performing a next event of the roulette session is desired. The USC 182 can be referred to as a “next-game USC” and/or a “continue USC”.

In accordance with at least some implementations, the GUI 176 can be a modified view of the GUI 143 shown in FIG. 20. In that regard, modifying the GUI 143 can include resizing and moving the status indicator 113 to be the status indicator 100. Modifying the GUI 143 to be arranged as the GUI 176 can include changing the USC 150 to be the USC 182. Modifying the GUI 143 can include removing or blurring the roulette wheel 151 and displaying the status indicator 100 and the notification 183 in some portion of the GUI 143, such as portion where the roulette wheel 151 is shown in FIG. 21.

Table I includes data regarding twelve events performed during a multi-stage session. Table I identifies the GUIs shown in FIG. 8 to FIG. 21. In accordance with at least some implementations, the wagers for event #3 to event #12 indicated in Table I can be identical wagers. The events discussed with respect to Table I can be events performed while a state machine of a processor and the computing system is in the first state. In response to the events of event #12 to cause the Barrier 5 being opened, the state machine can be changed to the second state.

TABLE I

| Event | GUI | Pre-wager balance | Wager | Post-wager balance | Result | Award | Ending balance |
|---|---|---|---|---|---|---|---|
| 1 | 91 | $ 906.00 | $ 6.00 | $ 900 | Null | Null | Null |
| 1 | 140 | Null | Null | Null | 35 | $ 0.00 | $ 900.00 |
| 2 | 92 | $ 900.00 | $ 6.00 | $ 894.00 | Null | Null | Null |
| 2 | 141 | Null | Null | Null | 8 | $48.00 | $ 942.00 |
| 3 | 93 | $ 942.00 | $12.00 | $ 930.00 | Null | Null | Null |
| 3 | 142 | Null | Null | Null | 7 | $96.00 | $1,026.00 |
| 3 | 175 | Null | Null | Null | Null | Barrier 1 opened | $1,026.00 |
| 4 | 94 | $1,026.00 | $ 6.00 | $1,020.00 | Null | Null | Null |
| 4 | Null | Null | Null | Null | 0 | $ 0.00 | $1,020.00 |
| 5 | Null | $1,020.00 | $ 6.00 | $1,014.00 | Null | Null | Null |
| 5 | Null | Null | Null | Null | 18 | $48.00 | $1,062.00 |
| 5 | Null | Null | Null | Null | Null | Barrier 2 opened | $1,062.00 |
| 6 | 95 | $1,062.00 | $ 6.00 | $1,056.00 | Null | Null | Null |
| 6 | Null | Null | Null | Null | 34 | $ 0.00 | $1,056.00 |
| 7 | Null | $1,056.00 | $ 6.00 | $1,050.00 | Null | Null | Null |
| 7 | Null | Null | Null | Null | 1 | $ 0.00 | $1,050.00 |
| 7 | Null | Null | Null | Null | Null | Barrier 3 opened | $1,050.00 |
| 8 | 96 | $1,050.00 | $ 6.00 | $1,044.00 | Null | Null | Null |
| 8 | Null | Null | Null | Null | 31 | $48.00 | $1,092.00 |
| 9 | Null | $1,092.00 | $ 6.00 | $1,086.00 | Null | Null | Null |
| 9 | Null | Null | Null | Null | 16 | $ 0.00 | $1,086.00 |
| 10 | Null | $1,086.00 | $ 6.00 | $1,080.00 | Null | Null | Null |
| 10 | Null | Null | Null | Null | 22 | $ 0.00 | $1,080.00 |
| 11 | Null | $1,080.00 | $ 6.00 | $1,074.00 | Null | Null | Null |
| 11 | Null | Null | Null | Null | 7 | $48.00 | $1,122.00 |
| 11 | Null | Null | Null | Null | Null | Barrier 4 opened | $1,122.00 |
| 12 | 97 | $1,122.00 | $ 6.00 | $1,116.00 | Null | Null | Null |
| 12 | 143 | Null | Null | Null | 18 | $48.00 | $1,164.00 |
| 12 | 176 | Null | Null | Null | Null | Barrier 5 opened | $1,164.00 |

Figure 22:
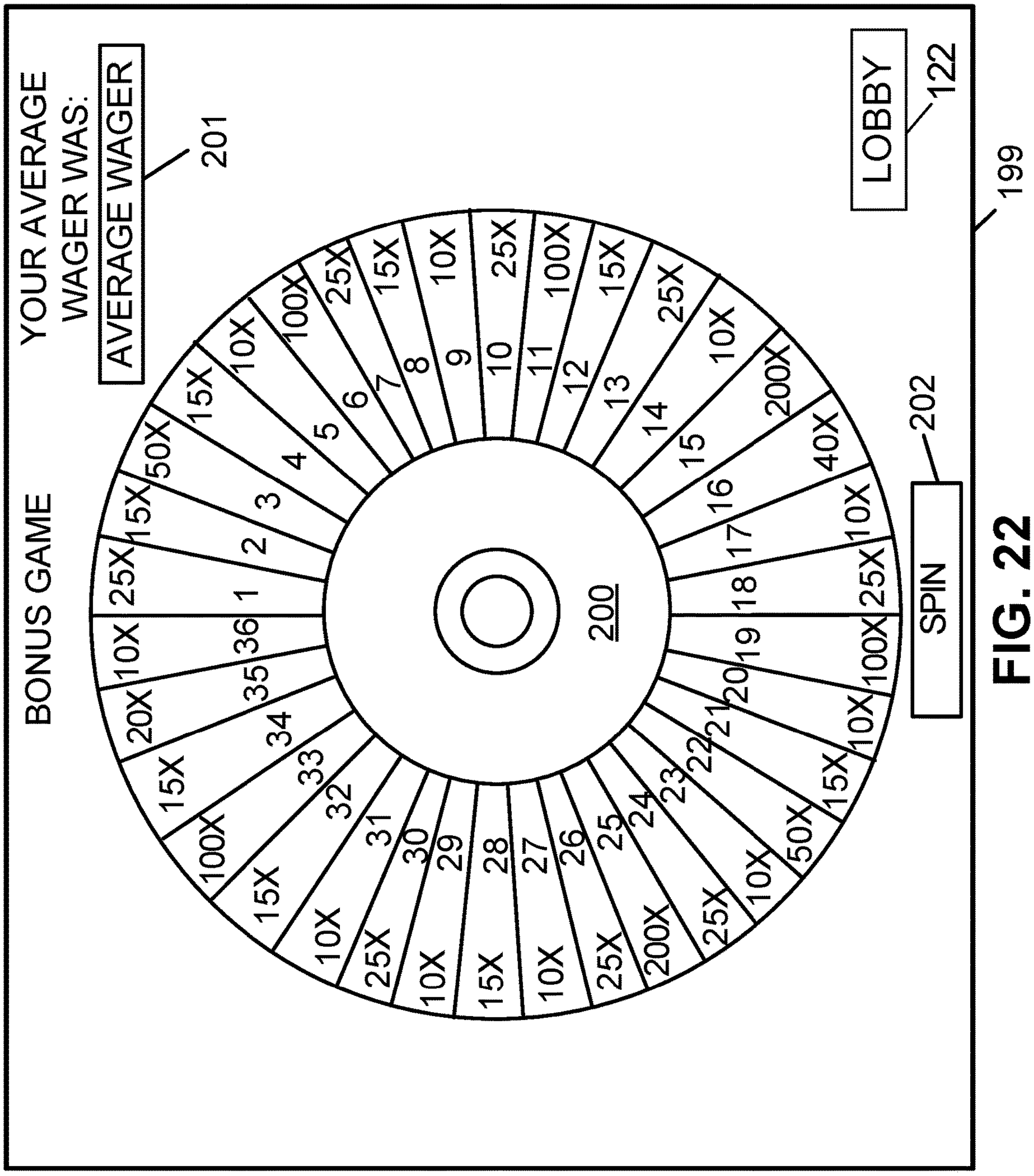

Next, FIG. 22 shows a GUI 199 in accordance with the example embodiments. The GUI 199 includes aspects for performing a computer-implemented bonus game while a state machine of a processor and computing system are operating in a second state. In particular, the GUI 199 includes a spinnable wheel 200 including award values. As an example, the award values can include multiplier values, amounts of credits, or amounts of currency. The GUI 199 includes award values in the form of a number and X. The number and X represent a multiplier value. Prior to being selected by a processor for awarding to a user, an award value shown in a GUI can be referred to as an "awardable award value."

The GUI 199 also includes an average wager indicator 201 and a USC 202. The USC 202 is selectable to cause a processor to spin the spinnable wheel 200 and to stop. Outputting the GUI 199 showing the spinnable wheel 200 spinning can include a processor can include the processor outputting an animation of the animation 43. The USC 202 can be referred to as a "spin USC."

The average wager indicator 201 can include an average wager determined by a processor based on wagers placed on the performance of computer-implemented roulette games during a session of the computer-implemented roulette games. The session of computer-implemented games can be performed while a state machine of the processor and the computing system is in a first state. In at least some implementation, an average wager indicated by the average wager indicator 201 can be an average wager equal to the mean value of the averages placed during the session. In at least some other implementations, an average wager indicated by the average wager indicator 201 can indicate an average wager based on the use of Equation A. In at least some implementations, an average wager indicated by the average wager indicator 201 can be an average wager based on the use of Equation A and Equation B.

FIG. 22 shows integers 1 to 36. Each of those integers corresponds to a segment of the spinnable wheel 200. In at least some embodiments, the integers 1 to 36 are not visible via the GUI 199, but are shown in FIG. 22 for explaining an example operation of the spinnable wheel. In accordance with that example operation, a processor selects a number from 1 to 36. The processor can select the number using a random number generator. The selected number corresponds to the segment of the spinnable wheel 200. The award value on the segment corresponding to the selected number can be the award value output to a user of the computing system.

In at least some implementations, the spinnable wheel 200 can have a quantity of segments other than thirty-six. Moreover, in at least some implementations, the spinnable wheel 200 can include a quantity of segments equal to the quantity of roulette wheel pockets on the roulette wheel 151. In accordance with those implementations, the processor can be configured to use the number selected for the most-recent spin of the roulette wheel 151 as the selected number corresponding to a segment of the spinnable wheel 200. Alternatively, the processor can be configured to select the number corresponding to a segment of the spinnable wheel 200 using a separate number selection.

Figure 23:
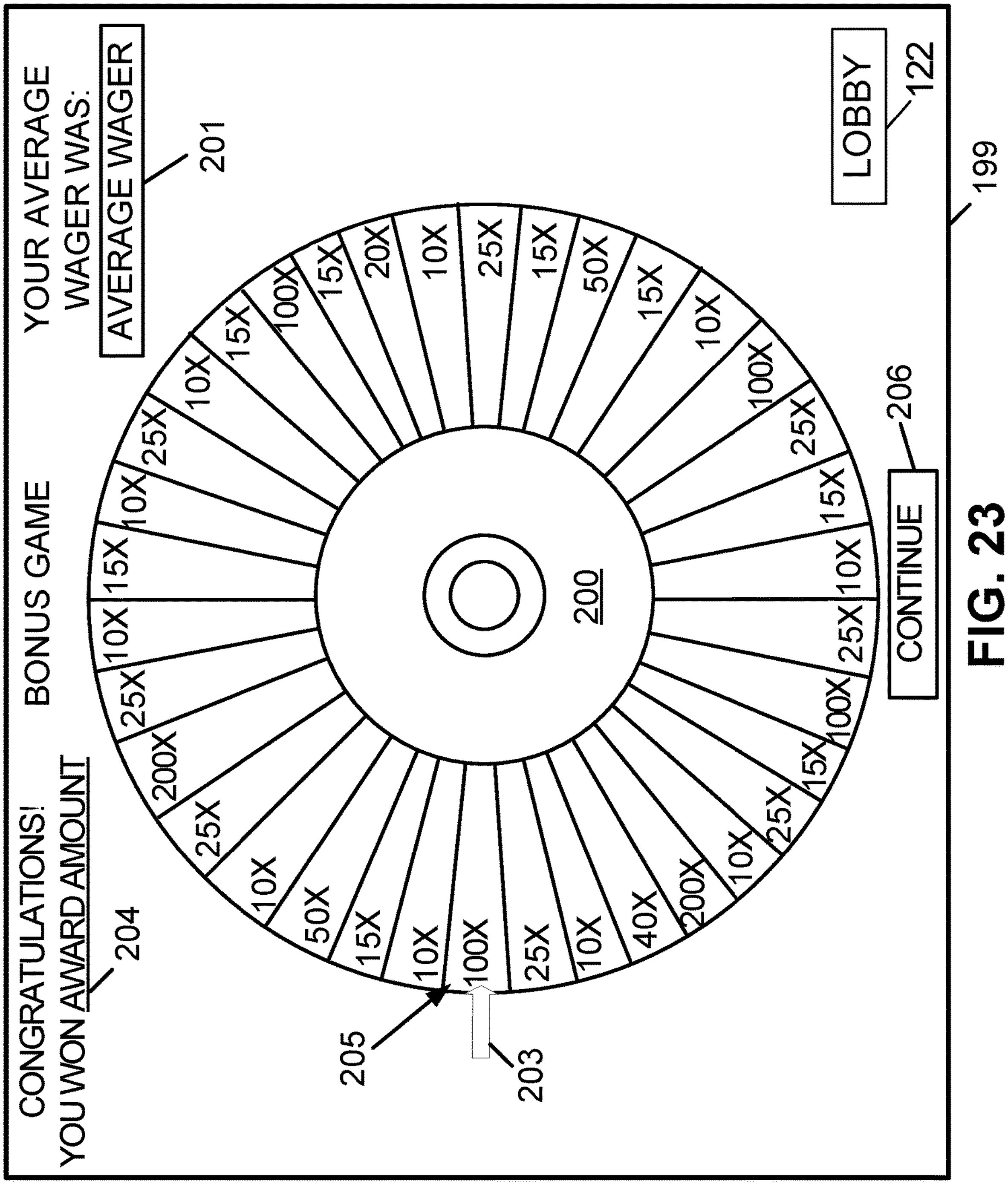

Next, FIG. 23 shows another view of the GUI 199 after the spinnable wheel 200 has spun and stopped with an award indicator 203 identifying an award value 205 (i.e., 100×) determined by the processor. In other words, the spinnable wheel 200 stops with the segment corresponding to the number "19" (shown in FIG. 22) stopping at the location of the award indicator 203. As noted, in at least some implementations, the spinnable wheel 200 can stop with the segment corresponding to the number "19" at the award indicator 203 based on a random selection of the number "19" from the numbers 1 to 36.

As shown in FIG. 23, the GUI 199 can include an award notification 204. In at least some embodiments, the award notification 204 appears on the GUI 199 after the spinnable wheel 200 has spun and stopped. In at least some embodiments, the award notification 204 indicates an award based on performing the multi-stage session of a first computer-implemented game (e.g., the roulette game). For example, the average wager for the multi-stage session can be $0.93 as shown in Table G. In accordance with this example, an award indicated by the award notification and output by the processor to a user and/or a user account can be based on:

award=average wager*selected multiplier value. Equation C:

In accordance with the example in which the selected multiplier value is 100×, the award to be output by the processor is $93.00 (i.e., $0.93*100). As another example in which the average wager is $1.02 as shown in Table F and the multiplier value is 100×, the award to be output by the processor is $102.00 (i.e., $1.02*100). As yet another example in which the average wager is $2.17 as described with respect to Table I and the multiplier value is 100×, the award to be output by the processor is $217.00 (i.e., $2.17*100). The award indicated by the award notification 204 can be referred to as a "session award."

As shown in FIG. 23, the GUI 199 can include a USC 206. In response to a selection of the USC 206, the processor and computing system can be configured to output a different GUI, such as the GUI 90 shown in FIG. 8 so that a new multi-stage session can be initiated at the computing system. As another example, the GUI displayed in response to a selection of the USC 206 can be the GUI displayed in response to a selection of the USC 122 shown in FIG. 8 and other drawings. The USC 206 can be referred to as a "continue USC." In at least some embodiments, the state machine can be changed from the second state back to the first state in response to selection of the USC 206 so that the new session can begin.

Figure 24:
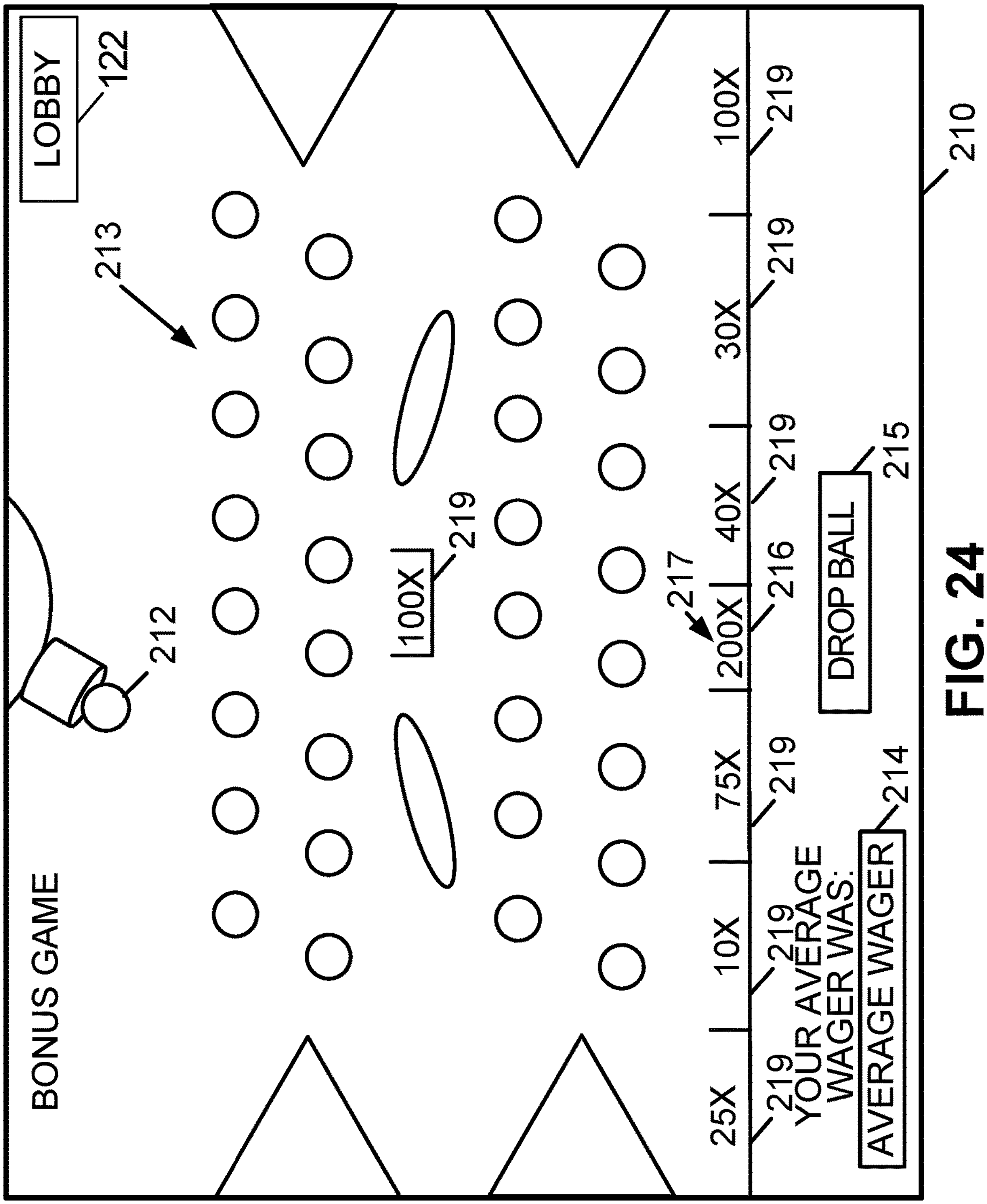

Next, FIG. 24 shows a GUI 210 in accordance with the example embodiments. The GUI 210 includes aspects for performing a computer-implemented bonus game while a state machine of a processor and computing system are operating in a second state. In particular, the GUI 210 includes a pachinko ball 212, a pachinko maze 213, an average wager indicator 214, a USC 215, an award box 216, and an award value 217. The GUI 210 shows other award boxes 219 similar to the award box 216, but at other positions within the GUI and showing different award values. The award value 217 includes a multiplier value "200×." In alternative arrangements, the award value 217 can be an amount of credits, an amount of currency, or some other award. The USC 215 is selectable to cause a processor to output an animation that shows the pachinko ball 212 being dropped and passing through at least a portion of the pachinko maze 213, and then landing in an award box.

In at least some implementation, an average wager indicated by the average wager indicator 214 can be an average wager equal to the mean value of the wagers placed during a multi-stage session of computer-implemented games (e.g., roulette games) before the GUI 210 is output on the display. In at least some other implementations, an average wager indicated by the average wager indicator 214 can be an average wager based on the use of Equation A. In at least some implementations, an average wager indicated by the average wager indicator 214 can be an average wager based on the use of Equation A and Equation B.

In accordance with at least some embodiments, the award box 216 and each of the other award boxes 219 can be associated with one or more numbers (e.g., integers) and the processor can select a particular award box based on a random selection of one or those number using a random number generator. The processor can predetermine how many numbers to associate with each award box as a way to achieve a desired average return to player amount (e.g., 92%). In at least some embodiments, the processor can be configured to use the number selected for the most-recent spin of the roulette wheel 151 as the selected number corresponding to an award box in the GUI 210. Alternatively, the processor can be configured to select the number corresponding to the award box using a separate number selection.

Figure 25:
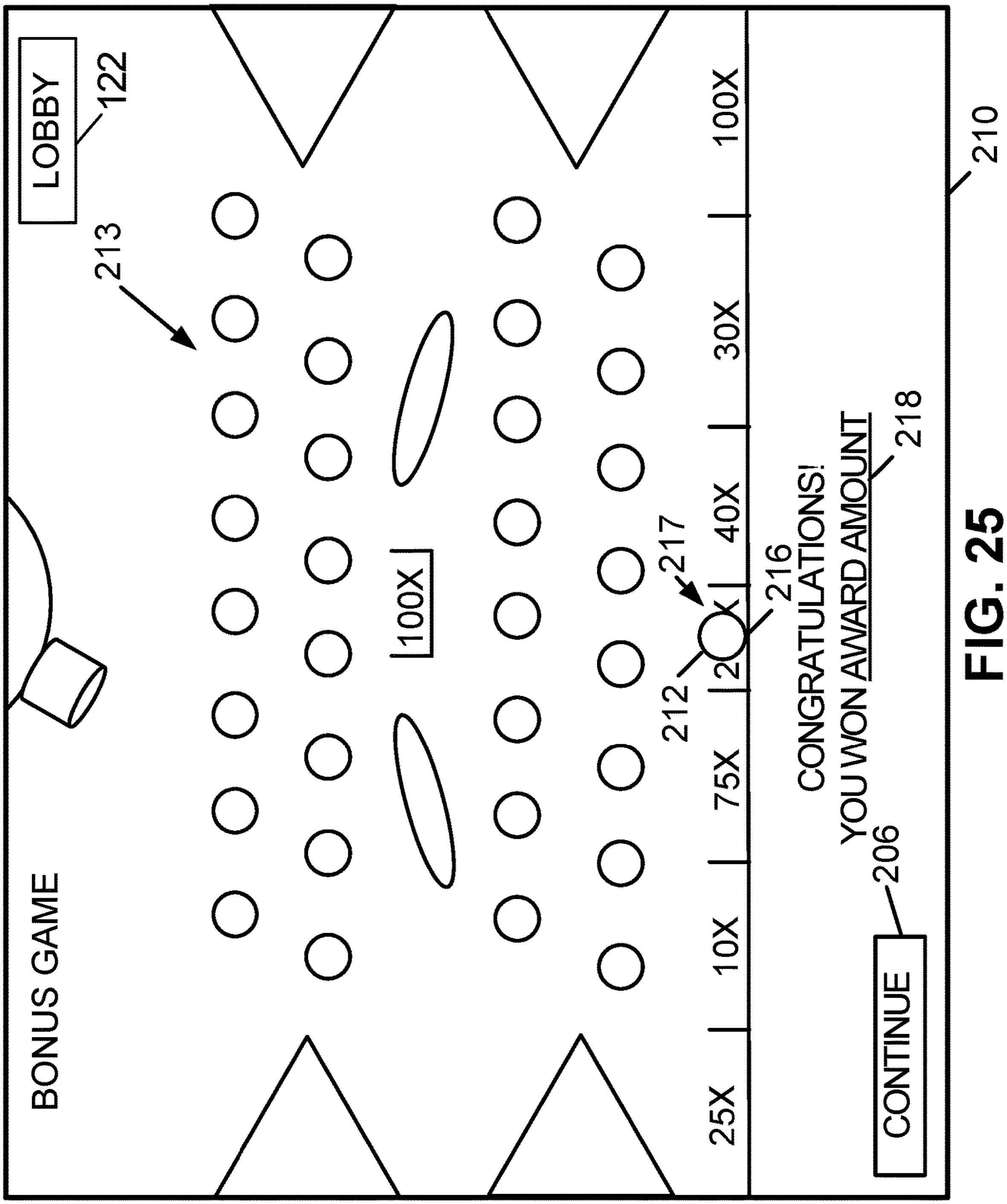

As shown in FIG. 25, the GUI 210 can include a USC 206. In response to a selection of the USC 206, the processor and computing system can be configured to output a different GUI, such as the GUI 90 shown in FIG. 8 so that a new multi-stage session can be initiated at the computing system. As another example, the GUI displayed in response to a selection of the USC 206 can be the GUI displayed in response to a selection of the USC 122 shown in FIG. 8 and other drawings. The USC 206 can be referred to as a "continue USC." In at least some embodiments, the state machine can be changed from the second state back to the first state in response to selection of the USC 206 so that the new session can begin.

Next, FIG. 25 shows another view of the GUI 210 after the pachinko ball 212 has dropped, passed through the pachinko maze 213, and landed with the award box 216 identifying the award value 217 (i.e., a multiplier 200×) as an award value determined by the processor. In at least some embodiments, the processor can select the award value 217 in advance of the USC 215 being selected to drop the pachinko ball 212 and the processor can then output an animation showing the pachinko ball 212 passing through the pachinko maze 213 before landing in the award box 216.

The GUI 210 can include an award notification 218. In at least some embodiments, the award notification 218 appears on the GUI 210 after the pachinko ball 212 lands in an award box (e.g., the award box 216 as shown in FIG. 25). In at least some embodiments, the award notification 218 indicates an award based on performing the multi-stage session of a first computer-implemented game (e.g., the roulette game). As an example, the award notification 218 can be based on the average wager indicated by the average wager indicator 214 (shown in FIG. 24) and Equation C. In accordance with the example in which the selected award value is 200× and the average wager is $0.93, the award notification is $186.00 (i.e., $0.93*200). In accordance with the example in which the selected award value is 200× and the average wager is $1.02, the award notification is $204.00 (i.e., $1.02*200). As yet another example in which the average wager is $2.17 as described with respect to Table I and the multiplier value is 200×, the award to be output by the processor is $434.00 (i.e., $2.17*200). The award indicated by the award notification 218 can be referred to as a "session award."

Figure 26:
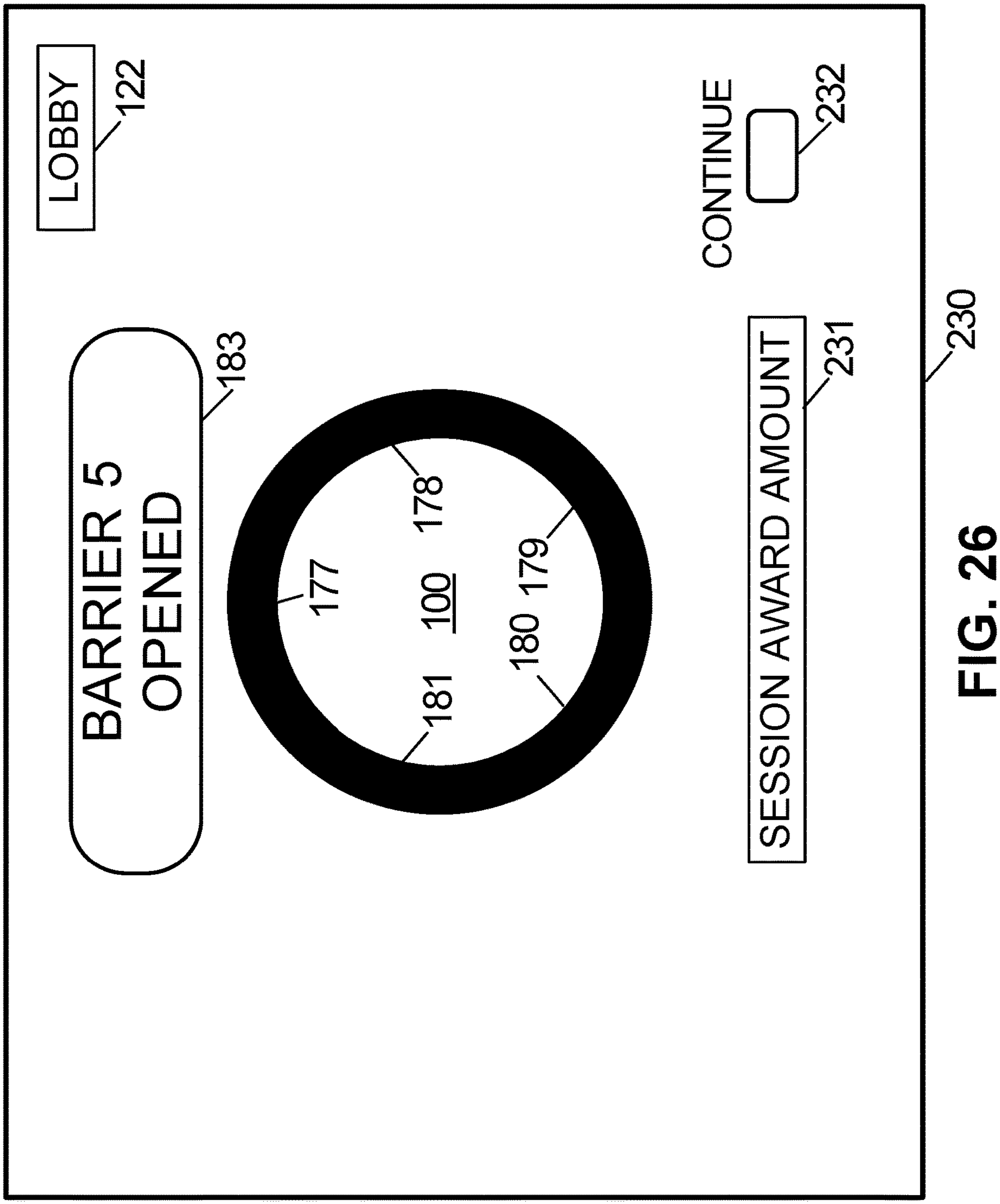

Next, FIG. 26 shows a GUI 230. The GUI 230 can be output in response to the state machine of the processor and the computing system changing to a second state after the multi-stage session performed during the first state is completed. As an example, the GUI 230 can be output after the GUI 176 shown in FIG. 21 is displayed. In accordance with at least some implementations, the GUI 176 can be modified to be the GUI 230. The GUI 176 and the GUI 230 both include the status indicator 100 and the notification 183 that indicates "Barrier 5 Opened."

Further, the GUI 230 includes a session award notification 231 that indicates a session award amount determined by the processor. Based on examples listed above, the session award amount indicated by the session award notification 231 can be $93.00, $102.00, $186.00, or $204.00, $217.00, or $434.00. Other examples of the session award amount are possible, some of which can indicate an award amount as some other amount of currency, a number of credits, a number of tokens or an amount of some other awardable value.

Furthermore, the GUI 230 includes a USC 232. In response to a selection of the USC 232, the processor and computing system can be configured to output a different GUI, such as the GUI 90 shown in FIG. 8 so that a new multi-stage session can be initiated at the computing system. As another example, the GUI displayed in response to a selection of the USC 232 can be the GUI displayed in response to a selection of the USC 122 shown in FIG. 8 and other drawings. The USC 232 can be referred to as a "continue USC."

Figure 27:
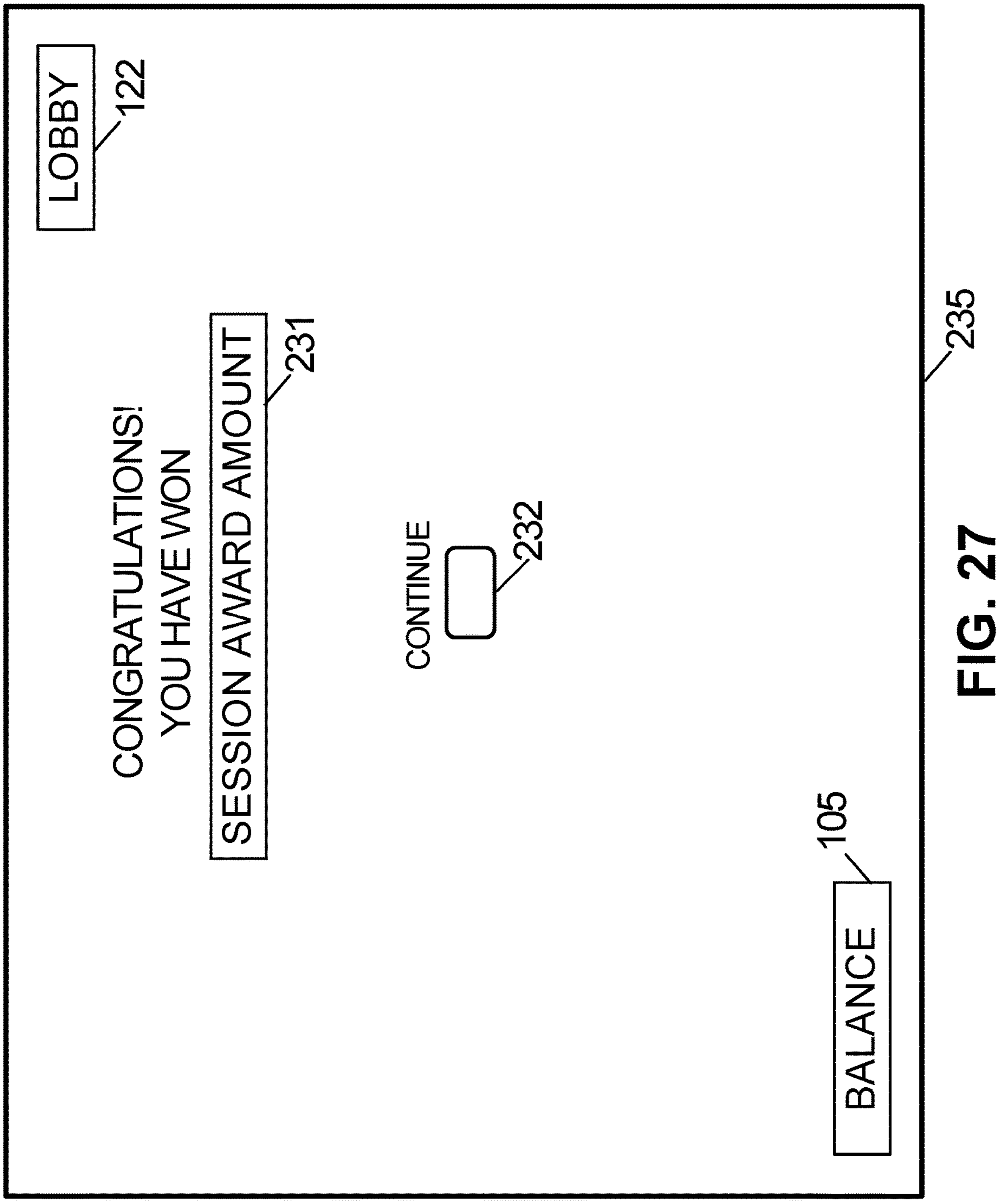

Next, FIG. 27 shows a GUI 235. The GUI 235 includes the session award notification 231 and the USC 232 discussed above. The GUI 235 also includes the USC 122 and the balance indicator 105. The GUI 235 can be output by the processor for implementations in which a different GUI is to be displayed after the processor determines to set the state machine to the second state based on a comparison of the counter and a threshold number greater than one, and a computer-implemented game does not have to be performed during the second state for an award to be output before the state machine is changed back to the first state.

Based on examples listed above, the session award amount indicated by the session award notification 231 in the GUI 235 can be $93.00, $102.00, $186.00, or $204.00, $217.00, or $434.00. Other examples of the session award amount are possible, some of which can indicate an award amount as some other amount of currency, a number of credits, a number of tokens or an amount of some other awardable value.

The balance indicator 105 can indicate a quantity of credits corresponding to a user of the computing system before or after being adjusted to include the session award amount indicated by the session award notification 231.

IV. Additional Example Architecture

Figure 28:
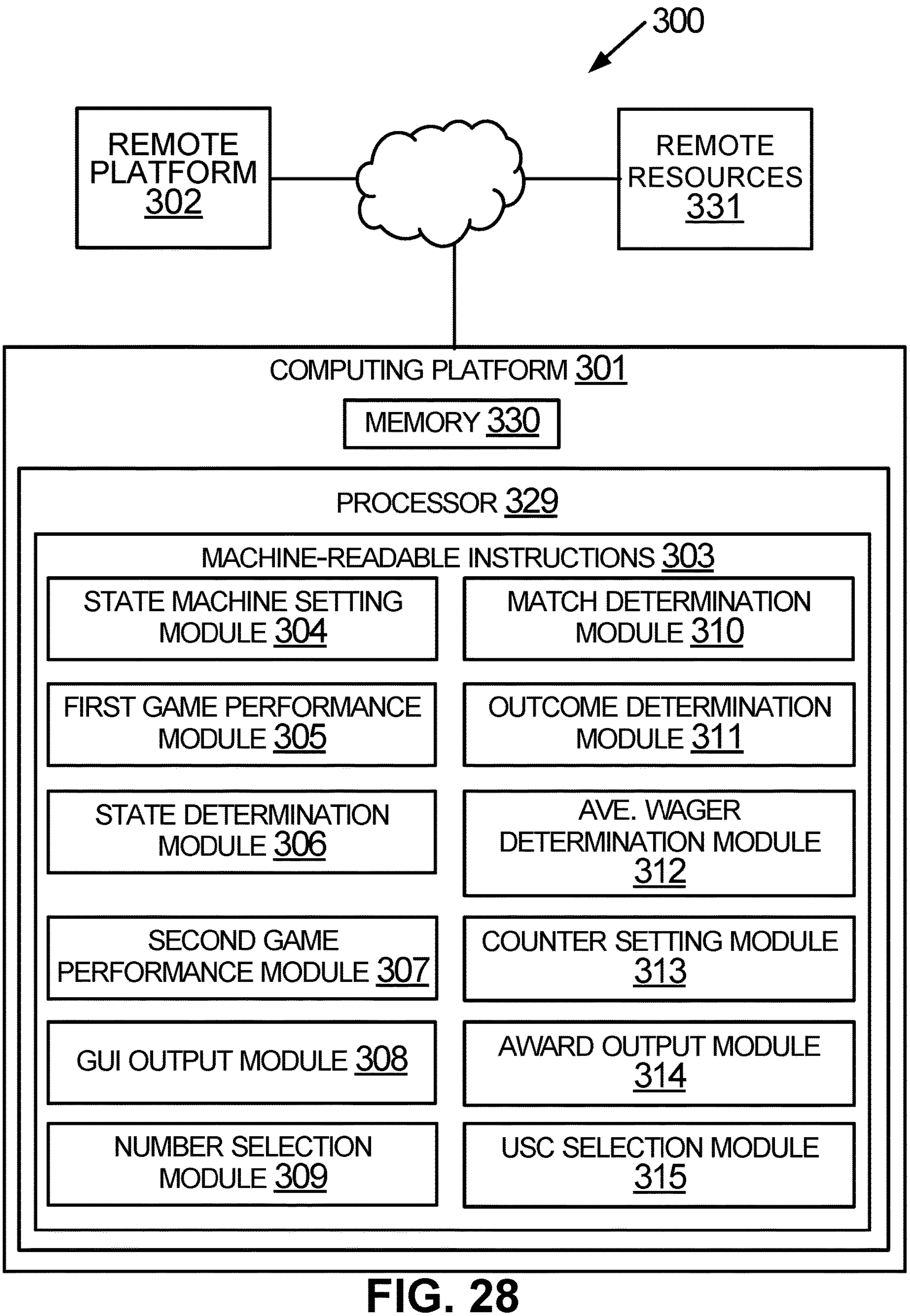
FIG. 28 is a block diagram of a computing system in accordance with the example embodiments.

Next, FIG. 28 is a block diagram of a computing system 300 configured for performing computer-implemented games in accordance with the example embodiments. The computing system 300 can include a computing platform 301 (e.g., one or more computing platforms). The computing platform 301 can be configured to communicate with a remote platform 302 (e.g., one or more remote platforms) according to a client/server architecture, a peer-to-peer architecture, and/or other architectures. The remote platform 302 can be configured to communicate with other remote platform(s) via the computing platform 301 and/or according to a client/server architecture, a peer-to-peer architecture, and/or other architectures. Users can access the computing system 300 directly or via the remote platform 302. According to some embodiments, one or more of the computing platform 301, the remote platform 302, and/or other components of computing system 300 can be the same as or similar to one or more components of the computing system 20, 20*a*, 20*b*, and/or other computing resources disclosed herein. The computing platform 301 can include one or more elements of the computing system 20, 20*a*, 20*b*. As an example, the computing platform 301 can include the communication interface 21, 21*a*, 21*b* and/or the user interface 22, 22*a*, 22*b*.

The computing platform 301 can be configured by machine-readable instructions 303. Machine-readable instructions 303 can include one or more instruction modules. The instruction modules can include computer program modules. The instruction modules can include one or more of a state machine setting module 304, a first game performance module 305, a state determination module 306, a second game performance module 307, a GUI output module 308, a number selection module 309, a match determination module 310, an outcome determination module 311, an average wager determination module 312, a counter setting module 313, an award output module 314, a USC selection module 315, and/or other instruction module(s). The processor 329 can be configured to execute any instruction module, any portion of the machine-readable instructions 303, or all of the machine-readable instructions 303.

The state machine setting module 304 can be configured to set a state machine having first and second states to the first state. In at least some embodiments, the first state can indicate a selected game is a first computer-implemented game and the second state can indicate the selected game is a second computer-implemented game. The first and second computer-implemented games can be different computer-implemented games. For example, the second computer-implemented game can include a computer-implemented prize wheel game or a computer-implemented pachinko game. As another example, the first computer-implemented game can include a computer-implemented roulette game. In at least some embodiments, the first state can indicate a selected game is a first computer-implemented game and the second state can provide for outputting an award based on the counter equaling the threshold number. In accordance with the embodiments, the processor can set the state machine to the first state after outputting the award.

The state machine setting module 304 can be configured to set the state machine to the second state when the counter equals the threshold number. The counter can equal the threshold number based on performing the instance of the first computer-implemented game or a subsequent instance of the first computer-implemented game. In at least some embodiments, the threshold number is greater than one. In at least some embodiments, the threshold number equals one.

The state machine setting module 304 can be configured to determine a selection of a next-game user-selectable control occurs. In at least some embodiments, setting the state machine to the first state is conditioned on the processor determining the selection of the next-game user-selectable control occurs. In at least some embodiments, a GUI output includes the next-game user-selectable control. In at least some of those embodiments, the GUI including the next-game user-selectable control can be output via execution of the GUI output module 308.

The state machine setting module 304 can be configured to set the state machine to a third state while the state machine is set to the first state or the second state. As an example, the state machine setting module 304 can be configured to make that state change in response to selection of a USC, such as the USC 122.

The state machine setting module 304 can be configured to set the state machine to a first state or the second state while the state machine is set to the third state. As an example, the state machine setting module 304 can be configured to change the state from the third state to the first state in response to selection of a USC, such as the USC 61.

As an example, the state machine setting module 304 can be configured to change the state from the third state to the second state in response to selection of a USC, such as the USC 62. While operating in the third state, the processor can output a GUI, such as the GUI 35, 60.

Figure 30:
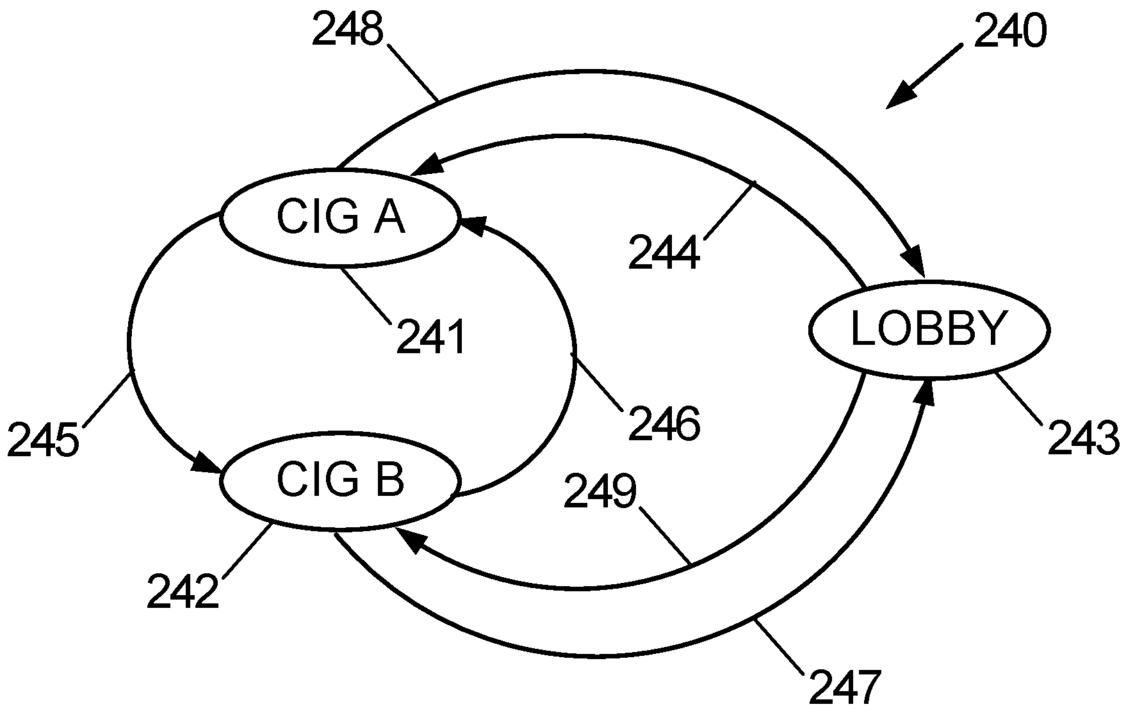
FIG. 30 and FIG. 31 show state diagrams.

Turning to FIG. 30, a state diagram 240 is shown. The state diagram 240 includes a first state 241, a second state 242, and a third state 243. The first state 241 includes a state in which a first computer-implemented game (e.g., a computer-implemented roulette game) can be performed one or more times. The second state 242 includes a state in which a second computer-implemented game (e.g., a computer-implemented prize wheel game) can be performed one or more times. The first computer-implemented game can correspond to "CIG A" which is shown in the USC 61 in FIG. 7 and the second computer-implemented game can correspond to "CIG B" which is shown in the USC 62 in FIG. 7.

The state diagram 240 includes a workflow 244. As an example, the workflow 244 includes actions to change a state machine from the third state 243 to the first state 241. As an example, actions of the workflow 244 can include detecting the USC 61 is selected from the GUI 60.

The state diagram 240 includes a workflow 245. As an example, the workflow 245 includes actions to change a state machine from the first state 241 to the second state 242. As an example, actions of the workflow 245 can include determining to set the state machine 240 to the second state 242 in response to determining a comparison of the counter (e.g., a counter that indicates a quantity of performances of the first computer-implemented game in which a bonus trigger number matches a game-selected number) matches a threshold number.

The state diagram 240 includes a workflow 246. As an example, the workflow 246 includes actions to change a state machine from the second state 242 to the first state 241. As an example, actions of the workflow 246 can include performing the second computer-implemented game and/or selecting the USC 206 shown in the GUI 199, 210.

The state diagram 240 includes a workflow 247. As an example, the workflow 247 includes actions to change a state machine from the second state 242 to the third state 243. As an example, actions of the workflow 247 can include detecting the USC 122 is selected from the GUI 199, 210.

The state diagram 240 includes a workflow 248. As an example, the workflow 248 includes actions to change a state machine from the first state 241 to the third state 243. As an example, actions of the workflow 248 can include detecting the USC 122 is selected from the GUI 90, 91, 92, 93, 94, 95, 96, 97, 140, 141, 142, 143, 175, 176.

The state diagram 240 includes a workflow 249. As an example, the workflow 249 includes actions to change a state machine from the third state 243 to the second state 242. As an example, actions of the workflow 249 can include detecting the USC 62 is selected from the GUI 60. In at least some embodiments, the USC 62 is unselectable unless the second state 242 was entered and a second computer-implemented game corresponding to the second state 242 was not performed while the computing system was in the second state 242. As an example, the second computer-implemented game can be deferred by performing the workflow 247.

Figure 31:
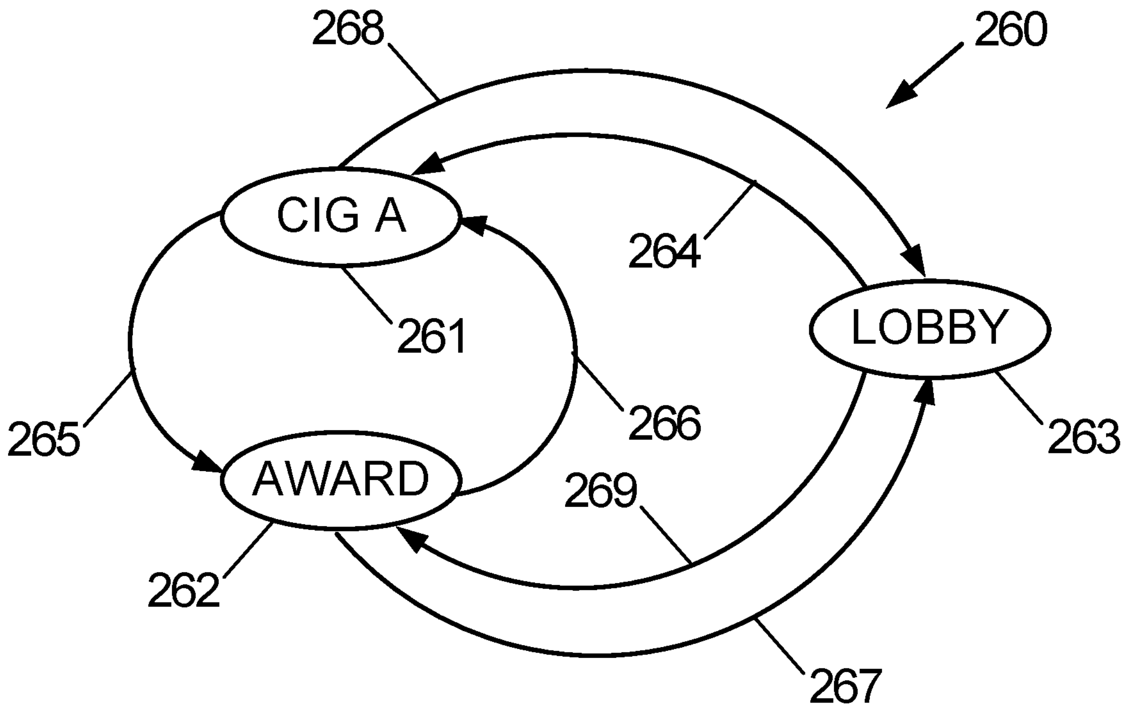

Next, FIG. 31 shows a state diagram 260. The state diagram 260 includes a first state 261, a second state 262, and a third state 263. The first state 261 includes a state in which a first computer-implemented game (e.g., a computer-implemented roulette game) can be performed one or more times. The second state 262 includes a state in which an award is output. The first computer-implemented game can correspond to "CIG A" which is shown in the USC 61 in FIG. 7.

The state diagram 260 includes a workflow 264. As an example, the workflow 264 includes actions to change a state machine from the third state 263 to the first state 261. As an example, actions of the workflow 264 can include detecting the USC 61 is selected from the GUI 60.

The state diagram 260 includes a workflow 265. As an example, the workflow 265 includes actions to change a state machine from the first state 261 to the second state 262. As an example, actions of the workflow 265 can include determining to set the state machine 260 to the second state 262 in response to determining a comparison of the counter (e.g., a counter that indicates a quantity of performances of the first computer-implemented game in which a bonus trigger number matches a game-selected number) matches a threshold number.

The state diagram 260 includes a workflow 266. As an example, the workflow 266 includes actions to change a state machine from the second state 262 to the first state 261. As an example, actions of the workflow 266 can include outputting an award and/or selecting the USC 206 shown in the GUI 199, 210.

The state diagram 260 includes a workflow 267. As an example, the workflow 267 includes actions to change a state machine from the second state 262 to the third state 263. As an example, actions of the workflow 267 can include detecting the USC 122 is selected from the GUI 199, 210.

The state diagram 260 includes a workflow 268. As an example, the workflow 268 includes actions to change a state machine from the first state 261 to the third state 263. As an example, actions of the workflow 268 can include detecting the USC 122 is selected from the GUI 90, 91, 92, 93, 94, 95, 96, 97, 140, 141, 142, 143, 175, 176.

The state diagram 260 includes a workflow 269. As an example, the workflow 269 includes actions to change a state machine from the third state 263 to the second state 262. As an example, actions of the workflow 269 can include detecting the USC 62 is selected from the GUI 60. In at least some embodiments, the USC 62 is unselectable unless the second state 262 was entered and an award was not output while the computing system was in the second state 262. As an example, outputting the award can be deferred by performing the workflow 267.

Turning back to FIG. 28, the first game performance module 305 can be configured to perform an instance of the first computer-implemented game while the state machine is in the first state.

Performing the instance of the first computer-implemented game can comprise outputting, to a display, a GUI to show a performance of the instance of the first computer-implemented game. A processor executing the first game performance module 305 can include executing the GUI output module 308 to output the performance of each instance of the first computer-implemented game. As an example, a processor executing the first game performance module 305 can include executing the GUI output module 308 to output a GUI, such as a GUI shown in one or more FIG. 6 to FIG. 21.

Performing the instance of the first computer-implemented game can comprise determining a first user-selected number indicating a first number selected from a set of multiple numbers. In accordance with at least some examples, the set of multiple numbers includes consecutive integers from 0 to 36, inclusive. In accordance with at least some of those examples, the set of multiple numbers further includes the number 00. As an example, selecting the first user-selected number can occur via use of a USC, such as the USC 108, 109. Selecting the first user-selected number can include selecting multiple numbers. The user-selected numbers can be selected once for multiple performances of the first computer implemented game via use of the USC 108, 109 and the USC 111.

Performing the instance of the first computer-implemented game can comprise determining a first game-selected number based on a random selection from the set of multiple numbers. A processor can use an RNG to make the random selection.

Performing the instance of the first computer-implemented game can comprise determining an outcome based on a comparison of the first user-selected number and the first game-selected number.

Performing the instance of the first computer-implemented game can comprise determining whether the first game-selected number matches the bonus trigger number, and responsively changing the counter if the first game-selected number matches the bonus trigger number. As an example, the counter can include the counter 55. In at least some embodiments, the bonus trigger number can include another number selected from the set of multiple numbers. Alternatively, the bonus trigger number can include a number selected from a different set of multiple numbers having the same numbers as the set of multiple numbers from which the first game-selected number is selected.

In at least some other embodiments, the bonus trigger number comprises a subset of numbers from the set of multiple numbers. The subset of numbers comprises multiple, different numbers. Accordingly, determining whether the first game-selected number matches the bonus trigger number can comprise determining whether the first game-selected number matches one number of the subset of numbers. In at least some embodiments, the processor can determine the subset of numbers based on user selections made via the GUI.

The first game performance module 305 can be configured to perform each other instance of the first computer-implemented game of each session including performing multiple instances of the first computer-implemented game. Those performances can occur while the state machine is in the first state.

In at least some embodiments, performing the instance of the first computer-implemented game is conditioned on the processor receiving a wager input. In accordance with at least some of those embodiments, receiving the wager input includes the processor receiving a signal from an acceptor operatively connected to the processor. As an example, the wager input includes an outside bet. As another example, the wager input includes an inside bet. Examples of the outside bet and the inside bet are described elsewhere in this description. As another example, each wager entered during the session can include a wager on a roulette game performed during the session.

The state determination module 306 can be configured to determine whether to set the state machine to the second state based on a comparison of the counter and a threshold number. The state determination module 306 can make that determination after determining whether the first game-selected number matches the bonus trigger number. The counter for that comparison can include a counter that indicates a quantity of performances of the first computer-implemented game in which a bonus trigger number matches a game-selected number during performance of one or more instances of the first computer-implemented game. As an example, the counter can include the counter 55 and/or the counter 56.

The second game performance module 307 can be configured to perform one or more instances of a second computer-implemented game after the state machine is set to the second state. The second computer-implemented game can include a computer-implemented prize wheel game. For example, the computer-implemented prize wheel game can include a spinnable wheel including awardable prizes, such as a multiplier value or a quantity of credits, tokens, or currency. The second computer-implemented game can include a computer-implemented pachinko game. As another example, the second computer-implemented game can include a roulette round where the user is allocated a "free wager" on at least one number of the roulette game. The second game performance module 307 can be configured for being performed after the state determination module 306 determines the processor and/or computing system enters the second state of a state machine.

The GUI output module 308 can be configured to output, to a display, a GUI to show a performance of the instance of the first computer-implemented game. In accordance with at least some implementations, the first computer-implemented game includes a computer-implemented roulette game. The graphical user interface can include a roulette layout to represent the first user-selected number. The graphical user interface can include a roulette wheel having multiple pockets. Outputting the graphical user interface to show performance of the instance of the first computer-implemented game can include outputting an animation that shows the roulette wheel spinning, a roulette ball landing on the roulette wheel while spinning, and the roulette wheel stopped with the roulette ball disposed in a particular pocket of the multiple pockets. The particular pocket corresponds to the game-selected number. The GUI output module 308 can be configured to output, to a display, a GUI to show performance of a game and/or outputting an award while the state machine is in the second state. The GUI output module 308 can be configured to output, to a display, a GUI to show aspects of the state machine set within a third state. As an example, that GUI can include the GUI 35, 60. Additionally, the GUI output module 308 can be configured to output, to a display, a GUI shown in any one or more FIG. 6 to FIG. 27 and/or a GUI within the GUI 42.

The number selection module 309 can be configured to select a number from a set of multiple numbers. In at least some implementations, the set of multiple numbers includes consecutive integers from 0 to 36, inclusive. In accordance with at least some of those implementations, the set of multiple numbers also includes the number 00. In at least some implementations, the number selection module 309 can select the number using a random number generator. The number selection module 309 can be used to select a number from the set of multiple numbers for each instance of performing the first computer-implemented game (e.g., a roulette game).

The match determination module 310 can be configured to determine whether a game-selected number (e.g., a first game-selected number) matches the bonus trigger number. In at least some embodiments, the first game performance module 305 can determine whether the game-selected number (e.g., a first game-selected number) matches the bonus trigger number by calling the match determination module 310 to make that determination.

The outcome determination module 311 can be configured to determine an outcome based on a comparison of a user-selected number and a game-selected number. For example, the outcome determination module 311 can be configured to determine an outcome based on a comparison of the first user-selected number and the first game-selected number. As another example, the first user-selected number can include a number selected by entering a wager. As yet another example, the first user-selected number can include a single number indicated on a roulette table layout 101. As still yet another example, the first user-selected number can include multiple numbers indicated on the roulette table layout 101 (e.g., all the even numbers, all the odd numbers, or all the consecutive numbers in one of the following ranges of numbers: 1 to 12, 13 to 24, 25 to 36, 1 to 18, or 19 to 36. The outcome determination module 311 can be configured to determine an outcome for each instance of performing the first computer-implemented game. The user-selected number selected for each of those instances of performing the first computer-implemented game can be identical for some or all of those instances. The user-selected number selected for each of those instances of performing the first computer-implemented game can be different for some or all of those instances. In at least some embodiments, the outcome is a winning outcome because the comparison indicates the first user-selected number matches the first game-selected number.

The outcome determination module 311 can be configured to determine an outcome for each instance of performing the second computer-implemented game.

The average wager determination module 312 can be configured to determine an average wager value for a session of the state machine being in the first state. In at least some implementations, the average wager value is based on a sum of wagers entered during the session divided by a quantity of performances of the first computer-implemented game during the session.

In at least some other implementations, the average wager value is based on a sum of wagers entered during the session divided by a quantity of the wagers entered during the session. As an example, each wager entered during the session can corresponds to a wager type, and the average wager value can further be based on a coefficient corresponding to the wager type. Additionally or alternatively, each wager entered during the session can correspond to a stage of the first state, and the average wager value can further be based on a scaling factor corresponding to the stage of the first state. The stage of the first state can include an initial stage, a final stage, or an initial stage of one or more intermediate stages occurring between the initial stage and the final stage. In at least some embodiments, the one or more intermediate stages includes one, two, or three intermediate stages. In at least some embodiments, the one or more intermediate stages includes more than three intermediate stages.

In at least some other implementations, the wagers entered during the session include multiple groups of wagers. Each group of wagers can correspond to a different wager type. The average wager value can further be based on a coefficient corresponding to each different wager type. Each wager entered during the session can correspond to a stage of the first state. The average wager value can further be based on a scaling factor corresponding to the stage of the first state. The stage of the first state includes an initial stage, a final stage, or an initial stage of one or more intermediate stages occurring between the initial stage and the final stage.

The average wager determination module 312 can be configured to clear the average wager value before beginning a next session of the state machine being in the first state. Clearing the average wager value can include resetting the average wager value to zero (e.g., $0.00). Clearing the average wager value can include and/or occur along with clearing a counter that indicates the average wager value.

In accordance with at least some implementations, the average wager for the session can be based on an average wager for one or more prior sessions of the state machine being in the first state and the wagers entered during the session. Determining the average wager for the session of the state machine being in the first state can occur after the state machine is switched to the second state. Alternatively, determining the average wager for the session of the state machine being in the first state can occur before the state machine is switched to the second state.

The counter setting module 313 can be configured to change a counter. As an example, changing a counter can include incrementing the counter. Such a counter can be referred to as a “count up counter.” As another example, changing the counter can include decrementing the counter. Such a counter can be referred to as a “count down counter.”

As yet another example, changing the counter can include clearing the counter (e.g., resetting the counter to 0), or setting the counter to a default value (e.g., 0 or a non-zero value, such as 5). In at least some embodiments, setting the counter to the default value can occur: after setting the state machine to the second state but before performing the one or more instances of the second computer-implemented game, while performing the one or more instances of the second computer-implemented game, or after performing the one or more instances of the second computer-implemented game.

The counter setting module 313 being configured to change a counter can include the counter setting module 313 being configured to change multiple counters. As an example, a first counter can include a counter to count how many times a game-selected number matches a bonus trigger number during a session of performing the first computer-implemented game. Based on that example, the counter setting module 313 can responsively change the first counter if a first game-selected number matches a bonus trigger number. In other words, the first counter can indicate a quantity of performances of the first computer-implemented game in which a bonus trigger number matches a game-selected number during performance of one or more instances of the first computer-implemented game.

As another example, a second counter corresponds to the first state having multiple stages, and the second counter indicates a stage of the multiple stages. As yet another example, a third counter corresponds to the first state having multiple stages, and the third counter indicates a quantity of bonus trigger numbers to use for the stage of multiple stages indicated by the second counter.

The counter setting module 313 can be configured to change a counter corresponding to an average wager. As an example, changing the counter corresponding to the average wager value can include changing a counter representing an amount of wagers entered during a session of performing the first computer-implemented game. As another example, changing the counter corresponding to the average wager value can include counting a quantity of wagers entered during a session of performing the first computer-implemented game. As yet another example, changing the counter corresponding to the average wager value can include changing the average wager value tracked by the counter to zero (e.g., $0.00).

The award output module 314 can be configured to output an award based on a winning outcome. As an example, the award based on the winning outcome can include an award based on a wager and an odds table defining odds for the wager.

The USC selection module 315 can be configured to perform function(s) corresponding to a USC of a user interface (e.g., the user interface 22, 22*a*, 22*b*). As an example, USC selection module can be configured to perform the function(s) described with respect to the USC 107, 108, 109, 110, 111, 112, 122, 150, 158, 182, 202, 206, 215, 232.

V. Example Operation

Figure 29B:
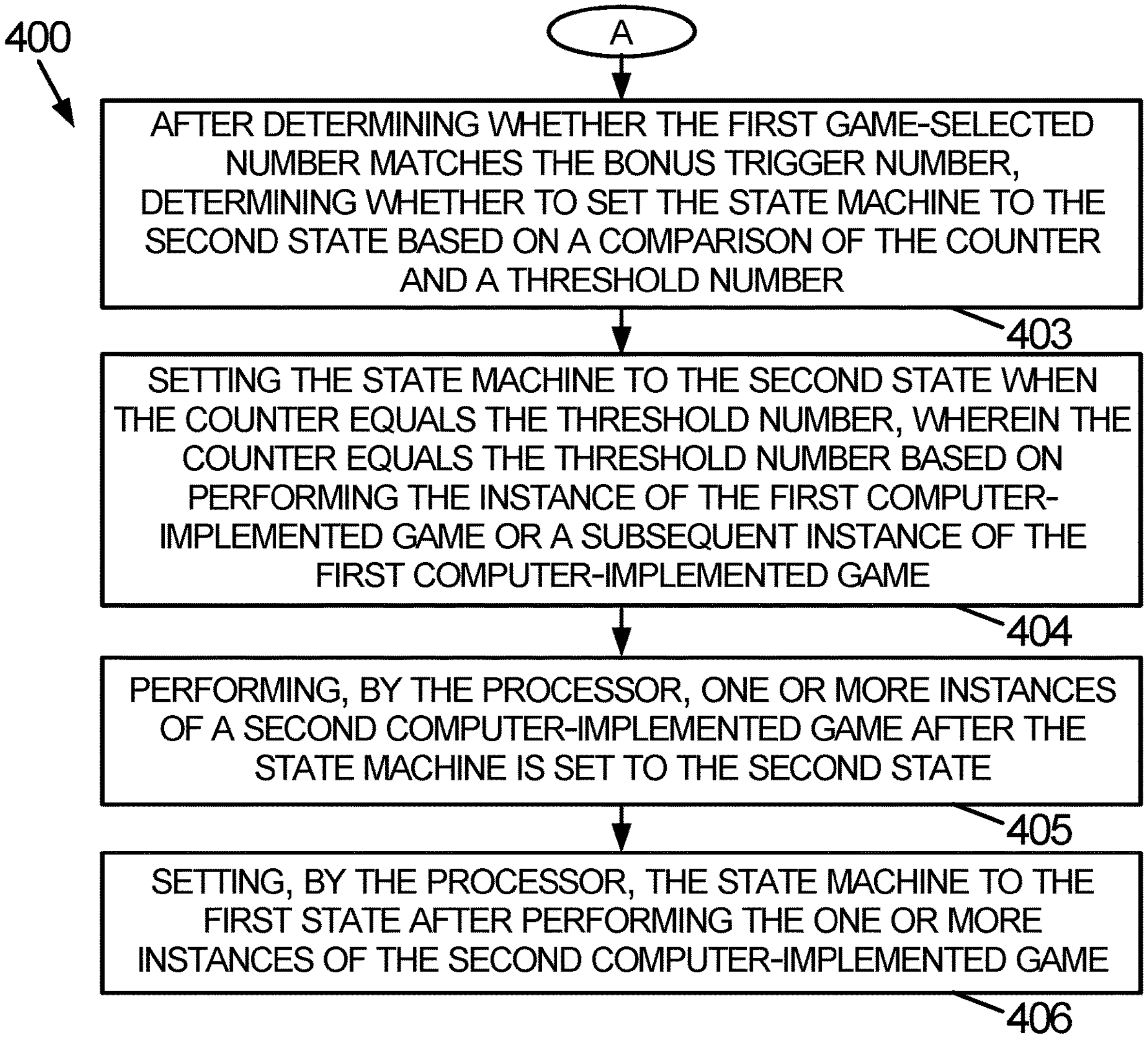

Next, FIG. 29A and FIG. 29B show a flow chart showing a set 400 of functions of that can be carried out using the machine, the computing system 12, the computing system 20, the computing system 20*a*, and/or the computing system 20*b*. A method of the example embodiments can include one or more functions of the set 400 and/or a portion of one or more functions of the set 400. An order in which the functions of the set 400 are illustrated in FIG. 29A and FIG. 29B and described below is not intended to be limiting.

Accordingly, a method based on one or more functions of the set 400 can include a computer-implemented method that includes the computing system 300 and/or the computing platform 301 executing a software application of the computing system 300, the computing platform 301, the remote platform 302, and/or other computing resources 331 with and/or in communication with a display screen. The computing system 12, 20, 20*a*, 20*b* can also be configured to execute a software application and/or machine-readable instructions of the machine-readable instructions 303.

In at least some implementations, the software application includes the machine-readable instructions 303 or a portion thereof, such as the state machine setting module 304, the first game performance module 305, the state determination module 306, the second game performance module 307, the GUI output module 308, the number selection module 309, the match determination module 310, the outcome determination module 311, the average wager determination module 312, the counter setting module 313, the award output module 314, the USC selection module 315, and/or other instruction module(s). In at least some implementations, execution of the software application includes graphically displaying, on a display screen, an animation that simulates spinning a roulette wheel and a roulette ball landing in a roulette wheel pocket on the roulette wheel. A memory 330 of the computing platform 301, and/or other memories can store some or all of the content of the memory 30 shown in FIG. 4.

Block 401 includes setting, by a processor, a state machine having first and second states to the first state. The first state indicates a selected game is a first computer-implemented game and the second state indicates the selected game is a second computer-implemented game. The first and second computer-implemented games are different computer-implemented games. A counter indicates a quantity of performances of the first computer-implemented game in which a bonus trigger number matches a game-selected number during performance of one or more instances of the first computer-implemented game.

The functions of block 401 can be performed by a processor (e.g., one or more hardware processors) configured by machine-readable instructions including a module that is the same or similar to the state machine setting module 304, in accordance with the example embodiments. The functions of the block 401 can include one or more functions described with respect to the state machine setting module 304. As an example, the processor can set a state machine having first and second states to the first state, as discussed in connection with the state machine setting module 304.

Next, block 402 includes performing, by the processor, an instance of the first computer-implemented game while the state machine is in the first state. Performing the instance of the first computer-implemented game comprises outputting, to a display, a graphical user interface to show a performance of the instance of the first computer-implemented game. Performing the instance of the first computer-implemented game also comprises determining a first user-selected number indicating a first number selected from a set of multiple numbers. Performing the instance of the first computer-implemented game further comprises determining a first game-selected number based on a random selection from the set of multiple numbers. Furthermore, performing the instance of the first computer-implemented game comprises determining an outcome based on a comparison of the first user-selected number and the first game-selected number. Furthermore, performing the instance of the first computer-implemented game comprises determining whether the first game-selected number matches the bonus trigger number, and responsively changing the counter if the first game-selected number matches the bonus trigger number. The bonus trigger number includes another number selected from the set of multiple numbers.

The function(s) of block 402 can be performed by a processor (e.g., one or more hardware processors) configured by machine-readable instructions including a module that is the same or similar to the GUI output module 308, the number selection module 309, the match determination module 310, and the counter setting module 313, in accordance with the example embodiments. The function(s) of the block 402 can include one or more functions described with respect to the GUI output module 308, the number selection module 309, the outcome determination module 311, the match determination module 310, and the counter setting module 313. As an example, the processor can output to a display, a graphical user interface to show a performance of the instance of the first computer-implemented game, as discussed in connection with the GUI output module 308. As another example, the processor can determine a first user-selected number indicating a first number selected from a set of multiple numbers, and determine a first game-selected number based on a random selection from the set of multiple numbers, as discussed in connection with the number selection module 309. As yet another example, the processor can determine an outcome based on a comparison of the first user-selected number and the first game-selected number, as discussed in connection with the outcome determination module 311. As still yet another example, the processor can determine whether the first game-selected number matches the bonus trigger number, as discussed in connection with the match determination module 310. As still yet another example, the processor can change the counter if the first game-selected number matches the bonus trigger number, as discussed in connection with the counter setting module 313.

Next, block 403 includes after determining whether the first game-selected number matches the bonus trigger number, determining whether to set the state machine to the second state based on a comparison of the counter and a threshold number. The function(s) of block 403 can be performed by a processor (e.g., one or more hardware processors) configured by machine-readable instructions including a module that is the same or similar to the state determination module 306, in accordance with the example embodiments. The function(s) of the block 403 can include one or more functions described with respect to the state determination module 306. As an example, the processor can determine whether to set the state machine to the second state based on a comparison of the counter and a threshold number, after determining whether the first game-selected number matches the bonus trigger number, as discussed in connection with the state determination module 306.

Next, block 404 includes setting the state machine to the second state when the counter equals the threshold number. The counter equals the threshold number based on performing the instance of the first computer-implemented game or a subsequent instance of the first computer-implemented game. The function(s) of block 404 can be performed by a processor (e.g., one or more hardware processors) configured by machine-readable instructions including a module that is the same or similar to the state machine setting module 304, in accordance with the example embodiments. The function(s) of the block 404 can include one or more functions described with respect to the state machine setting module 304. As an example, the processor can set the state machine to the second state when the counter equals the threshold number, as discussed in connection with the state machine setting module 304.

Next, block 405 includes performing, by the processor, one or more instances of a second computer-implemented game after the state machine is set to the second state. The function(s) of block 405 can be performed by a processor (e.g., one or more hardware processors) configured by machine-readable instructions including a module that is the same or similar to the second game performance module 307, in accordance with the example embodiments. The function(s) of the block 405 can include one or more functions described with respect to the second game performance module 307. As an example, the processor can perform one or more instances of a second computer-implemented game after the state machine is set to the second state, as discussed in connection with the second game performance module 307.

In at least some implementations, performing one or more instances of the second computer-implemented game after the state machine is set to the second state can include outputting a GUI, such as the GUI 199 shown in FIG. 22 and FIG. 23, or the GUI 210 shown in FIG. 24 and FIG. 25. Accordingly, the second computer implemented game can include a computer-implemented prize wheel or pachinko game. Other examples of the second computer-implemented game are also possible.

Next, block 406 includes setting, by the processor, the state machine to the first state after performing the one or more instances of the second computer-implemented game. The function(s) of block 406 can be performed by a processor (e.g., one or more hardware processors) configured by machine-readable instructions including a module that is the same or similar to the state machine setting module 304, in accordance with the example embodiments. The function(s) of the block 406 can include one or more functions described with respect to the state machine setting module 304. As an example, the processor can set the state machine to the first state after performing the one or more instances of the second computer-implemented game, as discussed in connection with the state machine setting module 304.

Next, FIG. 29C shows a block 407. In accordance with the example embodiments, a method including one or more functions of the set 400 and/or a function discussed with respect to FIG. 29D, FIG. 29E, FIG. 29F, FIG. 29G, and/or FIG. 29H can include performing one or more functions corresponding to the block 407.

Block 407 includes setting, by the processor, the counter to a default value. The functions of block 407 can be performed by a processor (e.g., one or more hardware processors) configured by machine-readable instructions including a module that is the same or similar to the counter setting module 313, in accordance with the example embodiments. The function(s) of the block 407 can include one or more functions described with respect to the counter setting module 313. As an example, the processor can set the counter to a default value, as discussed in connection with the counter setting module 313.

Next, FIG. 29D shows a block 408. In accordance with the example embodiments, a method including one or more functions of the set 400 and/or a function discussed with respect to FIG. 29C, FIG. 29E, FIG. 29F, FIG. 29G, and/or FIG. 29H can include performing one or more functions corresponding to the block 408.

Block 408 includes outputting, by the processor, an award based on the winning outcome. The functions of block 408 can be performed by a processor (e.g., one or more hardware processors) configured by machine-readable instructions including a module that is the same or similar to the award output module 314, in accordance with the example embodiments. The function(s) of the block 408 can include one or more functions described with respect to the award output module 314. As an example, the processor can output an award based on the winning outcome, as discussed in connection with the award output module 314.

Next, FIG. 29E shows a block 409. In accordance with the example embodiments, a method including one or more functions of the set 400 and/or a function discussed with respect to FIG. 29C, FIG. 29D, FIG. 29F, FIG. 29G, and/or FIG. 29H can include performing one or more functions corresponding to the block 409.

Block 409 includes determining, by the processor, an average wager for a session of the state machine being in the first state. The functions of block 409 can be performed by a processor (e.g., one or more hardware processors) configured by machine-readable instructions including a module that is the same or similar to the average wager determination module 312, in accordance with the example embodiments. The function(s) of the block 409 can include one or more functions described with respect to the average wager determination module 312. As an example, the processor can determine an average wager for a session of the state machine being in the first state, as discussed in connection with the average wager determination module 312.

Next, FIG. 29F shows a block 410. In accordance with the example embodiments, a method including one or more functions of the set 400 and/or a function discussed with respect to FIG. 29C, FIG. 29D, FIG. 29E, FIG. 29G, and/or FIG. 29H can include performing one or more functions corresponding to the block 410.

Block 410 includes clearing, by the processor, the average wager value before beginning a next session of the state machine to the first state. The functions of block 410 can be performed by a processor (e.g., one or more hardware processors) configured by machine-readable instructions including a module that is the same or similar to the average wager determination module 312, in accordance with the example embodiments. The function(s) of the block 410 can include one or more functions described with respect to the average wager determination module 312. As an example, the processor can clear the average wager value before beginning a next session of the state machine to the first state, as discussed in connection with the average wager determination module 312.

As an example, clearing the average wager value can include setting the average wager value to $0.00, setting a wager sum to $0.00 and a quantity of wagers to zero. In at least some embodiments, the functions of clearing the average wager value can be performed if a user exits a session of performing roulette games while the processor and computing system is operating in the first state before switching to the second state.

Next, FIG. 29G shows a block 411. In accordance with the example embodiments, a method including one or more functions of the set 400 and/or a function discussed with respect to FIG. 29C, FIG. 29D, FIG. 29E, FIG. 29F, and/or FIG. 29H can include performing one or more functions corresponding to the block 411.

Block 411 includes determining, by the processor, a selection of the next-game user selectable control occurs. The functions of block 411 can be performed by a processor (e.g., one or more hardware processors) configured by machine-readable instructions including a module that is the same or similar to the USC selection module 315, in accordance with the example embodiments. The function(s) of the block 411 can include one or more functions described with respect to the USC selection module 315. As an example, the processor can determine a selection of the next-game user selectable control occurs, as discussed in connection with the USC selection module 315.

Next, FIG. 29H shows a block 412. In accordance with the example embodiments, a method including one or more functions of the set 400 and/or a function discussed with respect to FIG. 29C, FIG. 29D, FIG. 29E, FIG. 29F, and/or FIG. 29G can include performing one or more functions corresponding to the block 412.

Block 412 includes outputting, by the processor, an award based on the counter equalling threshold number. The functions of block 412 can be performed by a processor (e.g., one or more hardware processors) configured by machine-readable instructions including a module that is the same or similar to the award output module 314, in accordance with the example embodiments. The function(s) of the block 412 can include one or more functions described with respect to the award output module 314. As an example, the processor can output, by the processor, an award based on the counter equalling threshold number, as discussed in connection with the award output module 314.

VI. Conclusions

While one or more disclosed functions have been described as being performed by a machine (e.g., the machine 11) or a computing system (e.g., the computing system 12, 20, 20*a*, 20*b*, 300), one or more of the functions can be performed by any entity, including but not limited to those described herein. As such, while this disclosure includes examples in which the computing system 20*a* performs select functions and sends data to the computing system 20*b*, such that the computing system 20*b* can perform complementing functions and receive the data, variations to those functions can be made while adhering to the general server-client dichotomy and the scope of the disclosed machines, computing systems, and methods.

For example, rather than the computing system 20*a* sending select data (e.g., a symbol set) to the computing system 20*b*, such that the computing system 20*b* can generate and display appropriate images, the computing system 20*a* can generate the images, animations, or GUIs and send them to the computing system 20*b* for display. Indeed, it will be appreciated by one of ordinary skill in the art that the "break point" between the server computing system's functions and the client computing system's functions can be varied.

Furthermore, the functions described throughout this can be performed in an order different than an order of functions (if any) described herein or shown in the drawings. Additionally, embodiments in the form of a method can include one or more of the functions described herein or shown in the drawings.

Furthermore still, while examples have been described in terms of select embodiments, alterations and permutations of these embodiments will be apparent to those of ordinary skill in the art. Other changes, substitutions, and alterations are also possible without departing from the disclosed machines, computing systems, and methods in their broader aspects as set forth in the claims below.

Finally, one or more embodiments described above may relate to one or more of the following enumerated example embodiments (EEE).

EEE 1 is a method comprising: setting, by a processor, a state machine having first and second states to the first state, wherein the first state indicates a selected game is a first computer-implemented game and the second state indicates the selected game is a second computer-implemented game, wherein the first and second computer-implemented games are different computer-implemented games, and wherein a counter indicates a quantity of performances of the first computer-implemented game in which a bonus trigger number matches a game-selected number during performance of one or more instances of the first computer-implemented game; performing, by the processor, an instance of the first computer-implemented game while the state machine is in the first state, wherein performing the instance of the first computer-implemented game comprises: outputting, to a display, a graphical user interface to show a performance of the instance of the first computer-implemented game; determining a first user-selected number indicating a first number selected from a set of multiple numbers; determining a first game-selected number based on a random selection from the set of multiple numbers, determining an outcome based on a comparison of the first user-selected number and the first game-selected number; and determining whether the first game-selected number matches the bonus trigger number, and responsively changing the counter if the first game-selected number matches the bonus trigger number, wherein the bonus trigger number includes another number selected from the set of multiple numbers; after determining whether the first game-selected number matches the bonus trigger number, determining whether to set the state machine to the second state based on a comparison of the counter and a threshold number; setting the state machine to the second state when the counter equals the threshold number, wherein the counter equals the threshold number based on performing the instance of the first computer-implemented game or a subsequent instance of the first computer-implemented game; performing, by the processor, one or more instances of a second computer-implemented game after the state machine is set to the second state; and setting, by the processor, the state machine to the first state after performing the one or more instances of the second computer-implemented game.

EEE 2 is a method comprising: setting, by a processor, a state machine having first and second states to the first state, wherein the first state indicates a computer-implemented game is selected to be performed, and wherein a counter indicates a quantity of performances of the computer-implemented game in which a bonus trigger number matches a game-selected number during performance of one or more instances of the computer-implemented game; performing, by the processor, an instance of the computer-implemented game while the state machine is in the first state, wherein performing the instance of the computer-implemented game comprises: (i) outputting, to a display, a graphical user interface to show a performance of the instance of the computer-implemented game, (ii) determining a first user-selected number indicating a first number selected from a set of multiple numbers, (iii) determining a first game-selected number based on a random selection from the set of multiple numbers, (iv) determining an outcome based on a comparison of the first user-selected number and the first game-selected number, and (v) determining whether the first game-selected number matches the bonus trigger number, and responsively changing the counter if the first game-selected number matches the bonus trigger number, wherein the bonus trigger number includes another number selected from the set of multiple numbers; after determining whether the first game-selected number matches the bonus trigger number, determining whether to set the state machine to the second state based on a comparison of the counter and a threshold number greater than one; setting the state machine to the second state when the counter equals the threshold number, wherein the counter equals the threshold number based on performing the instance of the computer-implemented game or a subsequent instance of the computer-implemented game; outputting, by the processor, an award based on the counter equaling the threshold number; and setting, by the processor, the state machine to the first state after outputting the award.

EEE 3 is the method of any one of EEE 1 or 2, wherein the threshold number is greater than one.

EEE 4 is the method of any one of EEE 1 or 2, wherein the threshold number equals one.

EEE 5 is the method of any one of EEE 1 to 4, wherein the set of multiple numbers includes consecutive integers from 0 to 36, inclusive.

EEE 6 is the method of EEE 5, wherein the set of multiple numbers includes the number 00.

EEE 7 is the method of any one of EEE 1, or 3 to 6, further comprising setting, by the processor, the counter to a default value, wherein setting the counter to the default value occurs: after setting the state machine to the second state but before performing the one or more instances of the second computer-implemented game, while performing the one or more instances of the second computer-implemented game, or after performing the one or more instances of the second computer-implemented game.

EEE 8 is the method of EEE 7, wherein the default value is zero.

EEE 9 is the method of EEE 7 wherein the default value is non-zero.

EEE 10 is the method of any one of EEE 2, further comprising setting, by the processor, the counter to a default value, wherein setting the counter to the default value occurs: after setting the state machine to the second state but before outputting the award, while outputting the award, or after outputting the award.

EEE 11 is the method of EEE 10, wherein the default value is zero.

EEE 12 is the method of EEE 10 wherein the default value is non-zero.

EEE 13 is the method of any one or EEE 1 to 12, wherein the outcome is a winning outcome because the comparison indicates the first user-selected number matches the first game-selected number, and the method further comprises outputting, by the processor, an award based on the winning outcome.

EEE 14 is the method of any one of EEE 1, 3 to 9, or 13, wherein the first computer-implemented game includes a computer-implemented roulette game, wherein the graphical user interface includes a roulette layout to represent the first user-selected number, wherein the graphical user interface includes a roulette wheel having multiple pockets, wherein outputting the graphical user interface to show performance of the instance of the first computer-implemented game includes outputting an animation that shows the roulette wheel spinning, a roulette ball landing on the roulette wheel while spinning, and the roulette wheel stopped with the roulette ball disposed in a particular pocket of the multiple pockets, and wherein the particular pocket corresponds to the game-selected number.

EEE 15 is the method of any one of EEE 1, 3 to 9, or 13 to 14, wherein the second computer-implemented game includes a computer-implemented prize wheel game or a computer-implemented pachinko game.

EEE 16 is the method of any one of EEE 2 or 10 to 12, wherein the computer-implemented game includes a computer-implemented roulette game, wherein the graphical user interface includes a roulette layout to represent the first user-selected number, wherein the graphical user interface includes a roulette wheel having multiple pockets, wherein outputting the graphical user interface to show performance of the instance of the computer-implemented game includes outputting an animation that shows the roulette wheel spinning, a roulette ball landing on the roulette wheel while spinning, and the roulette wheel stopped with the roulette ball disposed in a particular pocket of the multiple pockets, and wherein the particular pocket corresponds to the game-selected number.

EEE 17 is the method of any one of EEE 1 to 16, wherein: the bonus trigger number comprises a subset of numbers from the set of multiple numbers, the subset of numbers comprises multiple, different numbers, and determining whether the first game-selected number matches the bonus trigger number comprises determining whether the first game-selected number matches one number of the subset of numbers.

EEE 18 is the method of EEE 17, wherein the processor determines the subset of numbers based on user selections made via the graphical user interface.

EEE 19 is the method of any one of EEE 1 to 18, wherein the counter is a first counter, wherein second and third counters corresponds to the first state, wherein the first state includes multiple stages, wherein the second counter indicates a stage of the multiple stages, and third counter indicates a quantity of bonus trigger numbers to use for the stage of multiple stages indicated by the second counter.

EEE 20 is the method of any one of EEE 1 to 15, wherein performing the instance of the first computer-implemented game is conditioned on the processor receiving a wager input.

EEE 21 is the method of any one of EEE 2 or 10 to 12, wherein performing the instance of the computer-implemented game is conditioned on the processor receiving a wager input.

EEE 22 is the method of any one of EEE 20 or 21, wherein receiving the wager input includes the processor receiving a signal from an acceptor operatively connected to the processor.

EEE 23 is the method of any one of EEE 20 to 22, wherein the wager input includes an outside bet.

EEE 24 is the method of any one of EEE 20 to 23, wherein the wager input includes an inside bet.

EEE 26 is the method of any one of EEE 1 to 25, further comprising: determining, by the processor, an average wager value for a session of the state machine being in the first state.

EEE 27 is the method of EEE 26, wherein the average wager value is based on a sum of wagers entered during the session divided by a quantity of performances of the first computer-implemented game during the session.

EEE 28 is the method of EEE 27, wherein each wager entered during the session corresponds to a wager type, and wherein the average wager value is further based on a coefficient corresponding to the wager type.

EEE 29 is the method of any one of EEE 27 to 28, wherein each wager entered during the session corresponds to a stage of the first state, and wherein the average wager value is further based on a scaling factor corresponding to the stage of the first state.

EEE 30 is the method of EEE 29 wherein the stage of the first state includes an initial stage, a final stage, or an initial stage of one or more intermediate stages occurring between the initial stage and the final stage.

EEE 31 is the method of EEE 27, wherein the wagers entered during the session include multiple groups of wagers, wherein each group of wagers corresponds to a different wager type, and wherein the average wager value is further based on a coefficient corresponding to each different wager type.

EEE 32 is the method of any one of EEE 27 or 31, wherein each wager entered during the session corresponds to a stage of the first state, and wherein the average wager value is further based on a scaling factor corresponding to the stage of the first state.

EEE 33 is the method of EEE 32, wherein the stage of the first state includes an initial stage, a final stage, or an initial stage of one or more intermediate stages occurring between the initial stage and the final stage.

EEE 34 is the method of EEE 26, wherein the average wager value is based on a sum of wagers entered during the session divided by a quantity of the wagers entered during the session.

EEE 35 is the method of EEE 34, wherein each wager entered during the session corresponds to a wager type, and wherein the average wager value is further based on a coefficient corresponding to the wager type.

EEE 36 is the method of any one of EEE 34 to 35, wherein each wager entered during the session corresponds to a stage of the first state, and wherein the average wager value is further based on a scaling factor corresponding to the stage of the first state.

EEE 37 is the method of EEE 36, wherein the stage of the first state includes an initial stage, a final stage, or an initial stage of one or more intermediate stages occurring between the initial stage and the final stage.

EEE 38 is the method of EEE 34, wherein the wagers entered during the session include multiple groups of wagers, wherein each group of wagers corresponds to a different wager type, and wherein the average wager value is further based on a coefficient corresponding to each different wager type.

EEE 39 is the method of any one of EEE 34 or 38, wherein each wager entered during the session corresponds to a stage of the first state, and wherein the average wager value is further based on a scaling factor corresponding to the stage of the first state.

EEE 40 is the method of EEE 39, wherein the stage of the first state includes an initial stage, a final stage, or an initial stage of one or more intermediate stages occurring between the initial stage and the final stage.

EEE 41 is the method of any one of EEE 27 to 40, wherein each wager entered during the session includes a wager on a roulette game performed during the session.

EEE 42 is the method of any one of EEE 26 to 41, wherein the average wager for the session is based on an average wager for one or more prior sessions of the state machine being in the first state and the wagers entered during the session.

EEE 43 is the method of any one of EEE 26 to 42, wherein determining the average wager for the session of the state machine being in the first state occurs after the state machine is switched to the second state.

EEE 44 is the method of any one of EEE 26 to 42, wherein determining the average wager for the session of the state machine being in the first state occurs before the state machine is switched to the second state.

EEE 45 is the method of any one of EEE 26 to 44, further comprising clearing, by the processor, the average wager value before beginning a next session of the state machine being in the first state.

EEE 46 is the method of any one of EEE 1 to 45, wherein the graphical user interface includes a next-game user-selectable control, wherein the method further comprises determining, by the processor, a selection of the next-game user-selectable control occurs, and wherein setting the state machine to the first state is conditioned on the processor determining the selection of the next-game user-selectable control occurs.

EEE 47 is the method of any one of EEE 1 to 46, further comprising: outputting a user-selectable control corresponding to a third state of the state machine, and setting, by the processor, the state machine to the third state in response to a selection of the user-selectable control corresponding to a third state of the state machine.

EEE 48 is the method of EEE 47, further comprising outputting, by the processor, a graphical user interface with a user-selectable control to select performing the first computer-implemented game and/or a user-selectable control to select performing the second computer-implemented game.

EEE 49 is the method of EEE 48, further comprising: setting, by the processor, the state machine to the first state in response to a selection of the user-selectable control to select performing the first computer-implemented game.

EEE 50 is the method of EEE 48, further comprising: setting, by the processor, the state machine to the second state in response to a selection of the user-selectable control to select performing the second computer-implemented game.

EEE 51 is the method of any one of EEE 1 to 50, wherein the processor includes one or more processors.

EEE 52 is a computing system comprising: a processor, and a non-transitory computer-readable memory storing executable instructions, wherein execution of the executable instructions by the processor causes a computing system to perform the method of any one of EEE 1 to 51.

EEE 53 is the computing system of EEE 52, wherein the executable instructions include one or more of the following: a state machine setting module, a first game performance module, a state determination module, a second game performance module, a GUI output module, a number selection module, a match determination module, an outcome determination module, an average wager determination module, a counter setting module, an award output module, or a USC selection module.

EEE 54 is a non-transitory computer-readable memory having stored therein instructions executable by a processor to cause a computing system to perform the method of any one of EEE 1 to 51.

EEE 55 is the non-transitory computer-readable memory of EEE 54, wherein the executable instructions include one or more of the following: a state machine setting module, a first game performance module, a state determination module, a second game performance module, a GUI output module, a number selection module, a match determination module, an outcome determination module, an average wager determination module, a counter setting module, an award output module, or a USC selection module.

The invention claimed is:

1. A method of using a state machine at a server, the state machine operable in first, second, and third states, to cause display of first, second, and third graphical user interfaces at a client communicatively coupled to the server via a communication network, the method comprising:

switching, by a processor at the server, operation of the state machine from the third state to the first state in response to a computer-implemented roulette game being selected for auto-play during a new session initiated via the client, wherein:

the server is operable to serve the computer-implemented roulette game to the client while the state machine operates in the first state, the server is configured to switch the state machine to operate in the second state and then serve to the client a second computer-implemented game that differs from the computer-implemented roulette game;

the server is operable to cause the first, second, and third graphical user interfaces to begin being displayed at the client in response to switching the state machine to operate in the first, second, and third states, respectively, and the server is configured to switch the state machine to operate in the third state from the first state or the second state;

clearing a first counter stored in a computer-readable memory at the server for the new session, wherein the first counter tracks how many performances of the computer-implemented roulette game have occurred in which a bonus trigger number matched a game-selected number;

selecting, via a random number generator, the bonus trigger number from a set of multiple numbers and responsively writing the bonus trigger number into the computer-readable memory for use during the new session;

performing, by the processor, multiple instances of the computer-implemented roulette game while the state machine operates in the first state during the new session, wherein performing each instance of the computer-implemented roulette game comprises:

transmitting, over a communication network from the server to the client, data to cause the client to output the first graphical user interface on a display to show a performance of each instance of the computer-implemented roulette game;

determining a user-selected number indicating a first number selected from a set of multiple numbers via the first graphical user interface at the client;

selecting, via the random number generator, a single game-selected number from the set of multiple numbers, determining a first outcome based on a comparison of the user-selected number and the single game-selected number;

determining a second outcome based on a comparison of the bonus trigger number and the single game-selected number, and responsively changing the first counter if the single game-selected number matches the bonus trigger number; and after determining the first and second outcomes, determining whether the first counter has become equal to a threshold number;

after determining the first counter has become equal to the threshold number based on a most-recent auto-play performance of the computer-implemented roulette game, deferring switching the state machine to operate in the second state to perform the second computer-implemented game triggered by the first counter becoming equal to the threshold number, because a second counter tracked by the server indicates one or more auto-play performances of the computer-implemented roulette game remain to be played;

switching, by the processor, the state machine from operating in the first state to operating in the second state after all of the auto-play performances of the computer-implemented roulette game have been played;

performing, by the processor, one or more instances of the second computer-implemented game after the state machine is switched to operating in the second state; and switching, by the processor, the state machine from operating in the second state to operating in the first state or the third state after performing the one or more instances of the second computer-implemented game.

2. The method of claim 1, wherein the threshold number is greater than one.

3. The method of claim 1, wherein the set of multiple numbers includes consecutive integers from 0 to 36, inclusive.

4. The method of claim 1, further comprising setting, by the processor, the first counter to a default value, wherein setting the first counter to the default value occurs:

after setting the state machine to the second state but before performing the one or more instances of the second computer-implemented game, while performing the one or more instances of the second computer-implemented game, or after performing the one or more instances of the second computer-implemented game.

5. The method of claim 1, wherein the first outcome is a winning outcome because the comparison indicates the user-selected number matches the single game-selected number, and the method further comprises outputting, by the processor, an award based on the winning outcome.

6. The method of claim 1, wherein:

the first graphical user interface includes a roulette layout to represent the user-selected number, the first graphical user interface includes a roulette wheel having multiple pockets, outputting the first graphical user interface to show performance of each instance of the computer-implemented roulette game includes outputting an animation that shows the roulette wheel spinning, a roulette ball landing on the roulette wheel while spinning, and the roulette wheel stopped with the roulette ball disposed in a particular pocket of the multiple pockets, and the particular pocket corresponds to the single game-selected number.

7. The method of claim 1, wherein the second computer-implemented game includes a computer-implemented prize wheel game or a computer-implemented pachinko game.

8. The method of claim 1, wherein:

the bonus trigger number comprises a subset of numbers from the set of multiple numbers, the subset of numbers comprises multiple, different numbers, and determining whether the single game-selected number matches the bonus trigger number comprises determining whether the single game-selected number matches one number of the subset of numbers.

9. The method of claim 8, wherein the processor determines the subset of numbers anew for each instance of the computer-implemented roulette game.

10. The method of claim 1, further comprising: determining, by the processor, an average wager value for the new session of the state machine being in the first state.

11. The method of claim 10, wherein the average wager value is based on a sum of wagers entered during the new session divided by a quantity of performances of the computer-implemented roulette game during the new session, or the average wager value is based on the sum of wagers entered during the new session divided by a quantity of the wagers entered during the new session.

12. The method of claim 11, wherein each wager entered during the new session corresponds to a wager type, and wherein the average wager value is further based on a coefficient corresponding to the wager type.

13. The method of claim 12, wherein each wager entered during the new session corresponds to a stage of the first state, and wherein the average wager value is further based on a scaling factor corresponding to the stage of the first state.

14. The method of claim 13, wherein the stage of the first state includes an initial stage, a final stage, or an initial stage of one or more intermediate stages occurring between the initial stage and the final stage.

15. The method of claim 1, wherein performing each instance of the computer-implemented roulette game is conditioned on the processor receiving a respective wager input.

16. The method of claim 15, wherein receiving the respective wager input includes the processor receiving a signal from an acceptor operatively connected to the processor.

17. The method of claim 1, wherein:

third and fourth counters corresponds to the first state, the first state includes multiple stages, the third counter indicates a stage of the multiple stages, and the fourth counter indicates a quantity of bonus trigger numbers to use for the stage of the multiple stages indicated by the second counter.

18. The method according to claim 1, wherein the third graphical user interface includes a first user-selectable control selectable to cause the state machine to operate in the first state for playing the computer-implemented roulette game and a second user-selectable control selectable to cause the state machine to operate in the second state for playing the second computer-implemented game.

19. A computing system configured to use a state machine, the state machine operable in first, second, and third states, to cause display of first, second, and third graphical user interfaces at a client communicatively coupled to the computing system via a communication network, the computing system comprising:

a processor; and a non-transitory computer-readable memory containing executable instructions, wherein execution of the executable instructions by the processor causes the computing system to perform functions comprising:

switching, operation of the state machine from the third state to the first state in response to a computer-implemented roulette game being selected for auto-play during a new session initiated via the client, wherein:

the computing system is operable to serve the computer-implemented roulette game to the client while the state machine operates in the first state, the computing system is configured to switch the state machine to operate in the second state and then serve to the client a second computer-implemented game that differs from the computer-implemented roulette game;

the computing system is operable to cause the first, second, and third graphical user interfaces to begin being displayed at the client in response to switching the state machine to operate in the first, second, and third states, respectively, and the computing system is configured to switch the state machine to operate in the third state from the first state or the second state;

clearing a first counter stored in a computer-readable memory at the computing system for the new session, wherein the first counter tracks how many performances of the computer-implemented roulette game have occurred in which a bonus trigger number matched a game-selected number;

selecting, via a random number generator, the bonus trigger number from a set of multiple numbers and responsively writing the bonus trigger number into the computer-readable memory for use during the new session;

performing multiples instances of the computer-implemented roulette game while the state machine operates in the first state during the new session, wherein performing each instance of the computer-implemented roulette game comprises:

transmitting, over a communication network from the computing system to the client, data to cause the client to output the first graphical user interface on a display to show a performance of each instance of the computer-implemented roulette game;

determining a user-selected number indicating a first number selected from a set of multiple numbers via the first graphical user interface at the client;

selecting, via the random number generator, a single game-selected number from the set of multiple numbers, determining a first outcome based on a comparison of the user-selected number and the single game-selected number;

determining a second outcome based on a comparison of the bonus trigger number and the single game-selected number, and responsively changing the first counter if the single game-selected number matches the bonus trigger number; and after determining the first and second outcomes, determining whether the first counter has become equal to a threshold number;

after determining the first counter has become equal to the threshold number based on a most-recent auto-play performance of the computer-implemented roulette game, deferring switching the state machine to operate in the second state to perform the second computer-implemented game triggered by the first counter becoming equal to the threshold number, because a second counter tracked by the computing system indicates one or more auto-play performances of the computer-implemented roulette game remain to be played;

switching, by the processor, the state machine from operating in the first state to operating in the second state after all of the auto-play performances of the computer-implemented roulette game have been played;

performing one or more instances of the second computer-implemented game after the state machine is switched to operating in the second state; and switching the state machine from operating in the second state to operating in the first state or the third state after performing the one or more instances of the second computer-implemented game.

20. A non-transitory computer-readable memory having stored therein instructions executable by a processor to cause a computing system to perform functions, the computing system being configured to use a state machine, the state machine operable in first, second, and third states, to cause display of first, second, and third graphical user interfaces at a client communicatively coupled to the computing system via a communication network, the functions comprising:

switching, operation of the state machine from the third state to the first state in response to a computer-implemented roulette game being selected for auto-play during a new session initiated via the client, wherein:

the computing system is operable to serve the computer-implemented roulette game to the client while the state machine operates in the first state, the computing system is configured to switch the state machine to operate in the second state and then serve to the client a second computer-implemented game that differs from the computer-implemented roulette game;

the computing system is operable to cause the first, second, and third graphical user interfaces to begin being displayed at the client in response to switching the state machine to operate in the first, second, and third states, respectively, and the computing system is configured to switch the state machine to operate in the third state from the first state or the second state;

clearing a first counter stored in a computer-readable memory at the computing system for the new session, wherein the first counter tracks how many performances of the computer-implemented roulette game have occurred in which a bonus trigger number matched a game-selected number;

selecting, via a random number generator, the bonus trigger number from a set of multiple numbers and responsively writing the bonus trigger number into the computer-readable memory for use during the new session;

performing multiple instances of the computer-implemented roulette game while the state machine operates in the first state during the new session, wherein performing each instance of the computer-implemented roulette game comprises:

transmitting, over a communication network from the computing system to the client, data to cause the client to output the first graphical user interface on a display to show a performance of each instance of the computer-implemented roulette game;

determining a user-selected number indicating a first number selected from a set of multiple numbers via the first graphical user interface at the client;

selecting, via the random number generator, a single game-selected number from the set of multiple numbers, determining a first outcome based on a comparison of the user-selected number and the single game-selected number;

determining a second outcome based on a comparison of the bonus trigger number and the single game-selected number, and responsively changing the first counter if the single game-selected number matches the bonus trigger number; and after determining the first and second outcomes, determining whether the first counter has become equal to a threshold number;

after determining the first counter has become equal to the threshold number based on a most-recent auto-play performance of the computer-implemented roulette game, deferring switching the state machine to operate in the second state to perform the second computer-implemented game triggered by the first counter becoming equal to the threshold number, because a second counter tracked by the computing system indicates one or more auto-play performances of the computer-implemented roulette game remain to be played;

switching, by the processor, the state machine from operating in the first state to operating in the second state after all of the auto-play performances of the computer-implemented roulette game have been played;

performing one or more instances of the second computer-implemented game after the state machine is switched to operating in the second state; and switching the state machine from operating in the second state to operating in the first state or the third state after performing the one or more instances of the second computer-implemented game.

* * * * *